(12) United States Patent
Kato

(10) Patent No.: US 7,400,685 B2
(45) Date of Patent: *Jul. 15, 2008

(54) DECODING METHOD AND APPARATUS AND RECORDING METHOD AND APPARATUS FOR MOVING PICTURE DATA

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 654 days.

This patent is subject to a terminal disclaimer.

(21) Appl. No.: 11/086,210

(22) Filed: Mar. 22, 2005

(65) Prior Publication Data

US 2005/0163231 A1 Jul. 28, 2005

Related U.S. Application Data

(60) Continuation of application No. 09/904,320, filed on Jul. 12, 2001, now Pat. No. 6,934,339, which is a division of application No. 09/189,483, filed on Nov. 10, 1998, now Pat. No. 6,396,874.

(30) Foreign Application Priority Data

| Nov. 12, 1997 | (JP) | 9-310719 |
| Nov. 12, 1997 | (JP) | 9-310720 |
| May 13, 1998 | (JP) | 10-130643 |
| May 13, 1998 | (JP) | 10-130645 |

(51) Int. Cl.
*H04N 7/12* (2006.01)
*G06K 9/36* (2006.01)

(52) U.S. Cl. .................. 375/240.28; 386/109; 710/263

(58) Field of Classification Search ............ 375/240.28, 375/240.25; 386/109, 91, 124; 710/263
See application file for complete search history.

(56) References Cited

U.S. PATENT DOCUMENTS

| 5,621,840 | A | 4/1997 | Kawamura et al. |
| 5,754,729 | A * | 5/1998 | Fujinami ..................... 386/124 |
| 5,907,658 | A | 5/1999 | Murase et al. |
| 5,945,931 | A | 8/1999 | Tahara et al. |
| 5,959,690 | A | 9/1999 | Toebes, VIII et al. |
| 5,999,694 | A | 12/1999 | Yasuda et al. |
| 6,084,637 | A | 7/2000 | Oku et al. |
| 6,108,281 | A | 8/2000 | Tozaki et al. |
| 6,253,018 | B1 | 6/2001 | Moriyama et al. |
| 6,263,396 | B1 * | 7/2001 | Cottle et al. ................ 710/263 |

* cited by examiner

*Primary Examiner*—Gims S Philippe
(74) *Attorney, Agent, or Firm*—Frommer Lawrence & Haug LLP; William S. Frommer

(57) ABSTRACT

A method and apparatus for recording moving picture data encoded using a prediction encoding system, in which the playback control information is recorded along with moving picture data encoded using the MPEG system. The playback control information includes the information specifying a program decoding starting picture and a display starting picture and the information specifying the program decoding terminating picture and a display terminating picture. During reproduction, the playback control information is first read out and moving picture data are decoded based on this information. This enables seamless reproduction from a pre-skipping picture to a post-skipping picture.

1 Claim, 28 Drawing Sheets

```
AV_program_File( ){
    do (
            pack( )
    while(nextbits( )==pack_start_code)
}
```

```
pack( ) {
    pack_header( )
    PES_packet( )
}
```

```
PES_packet( ){
    packet_header( )
    PTS
    DTS
    packet_payload( )
}
```

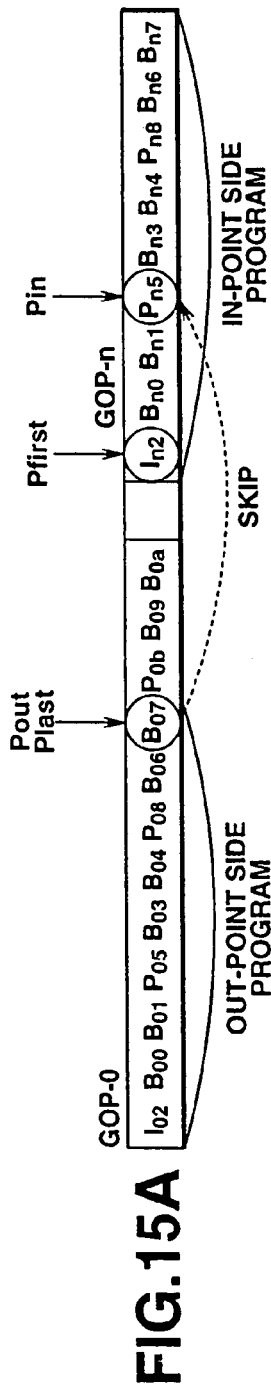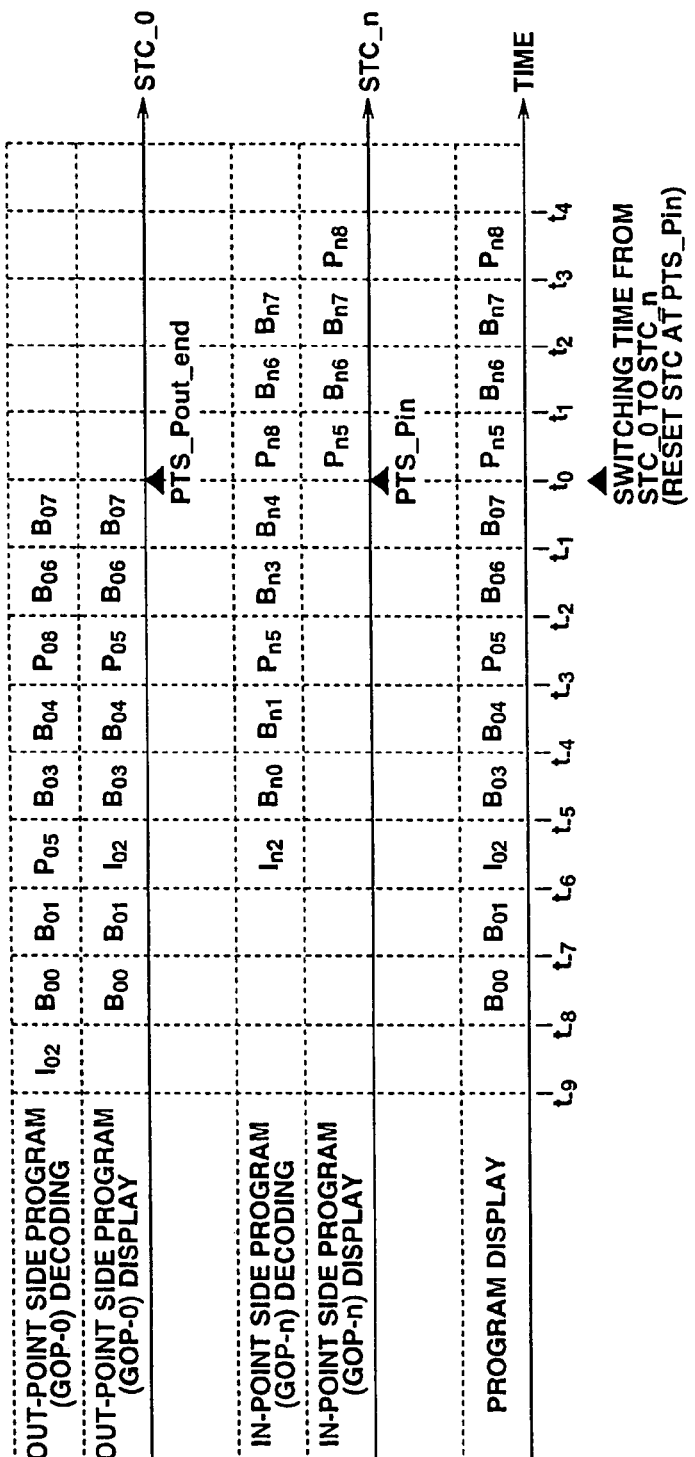

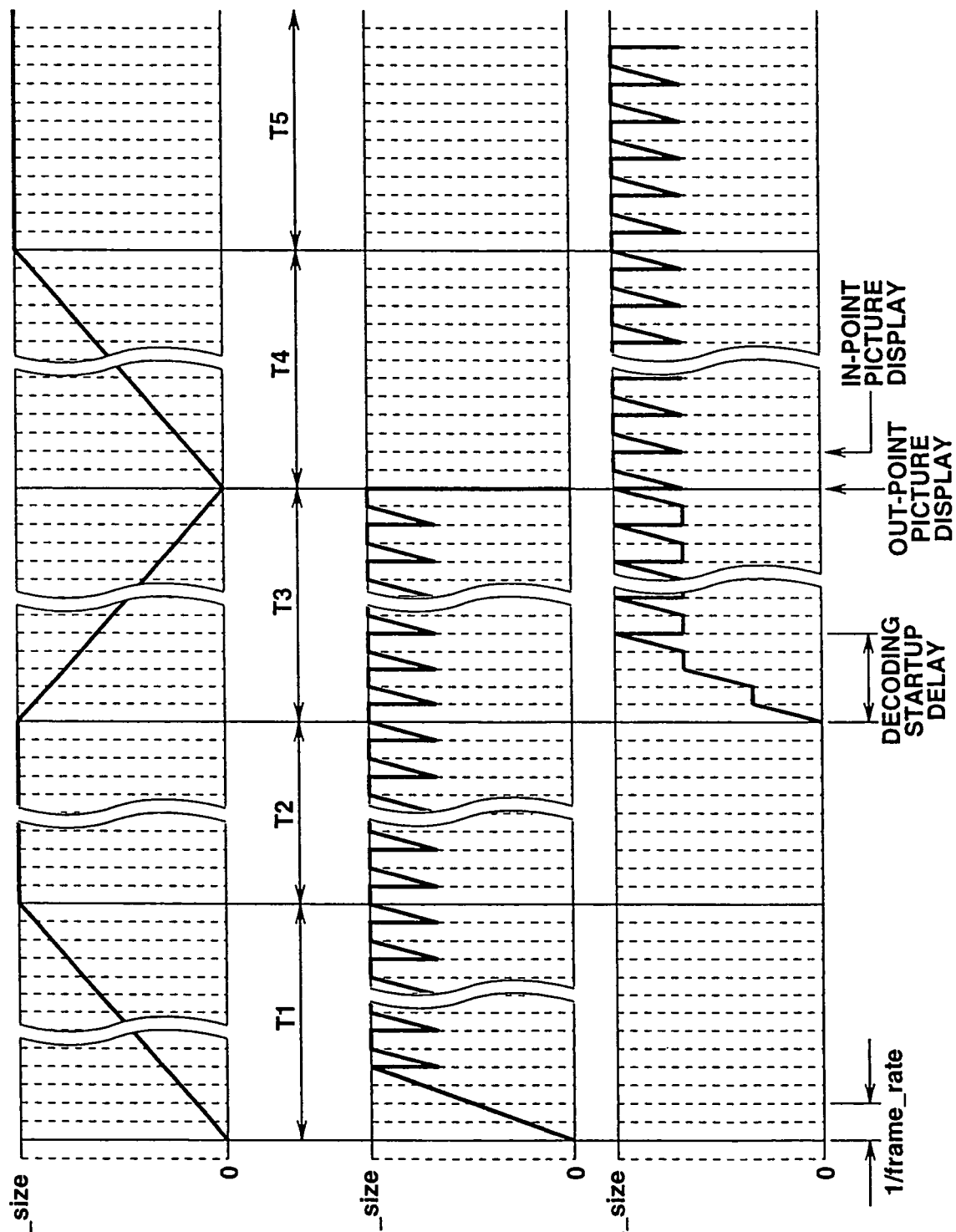

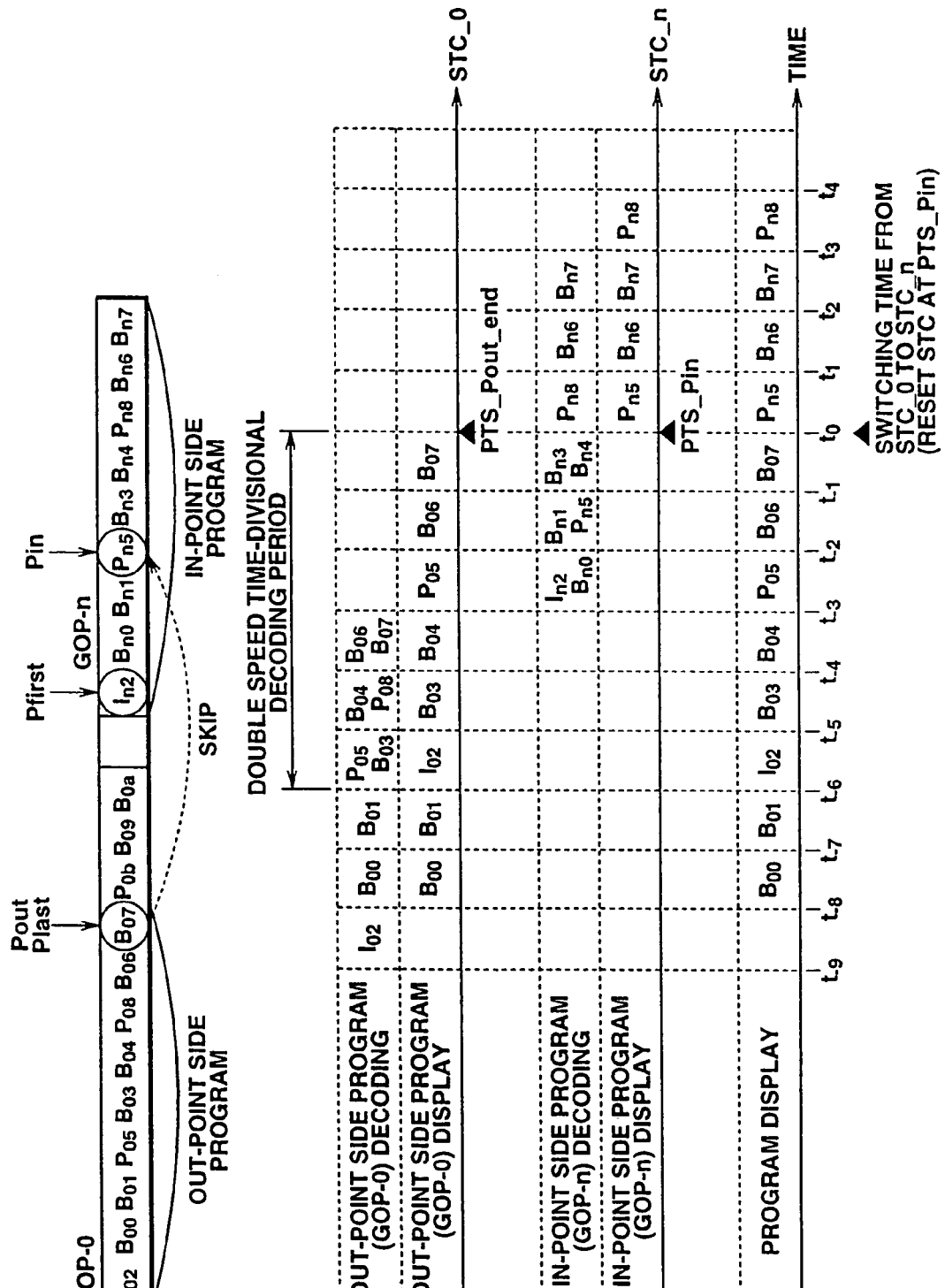

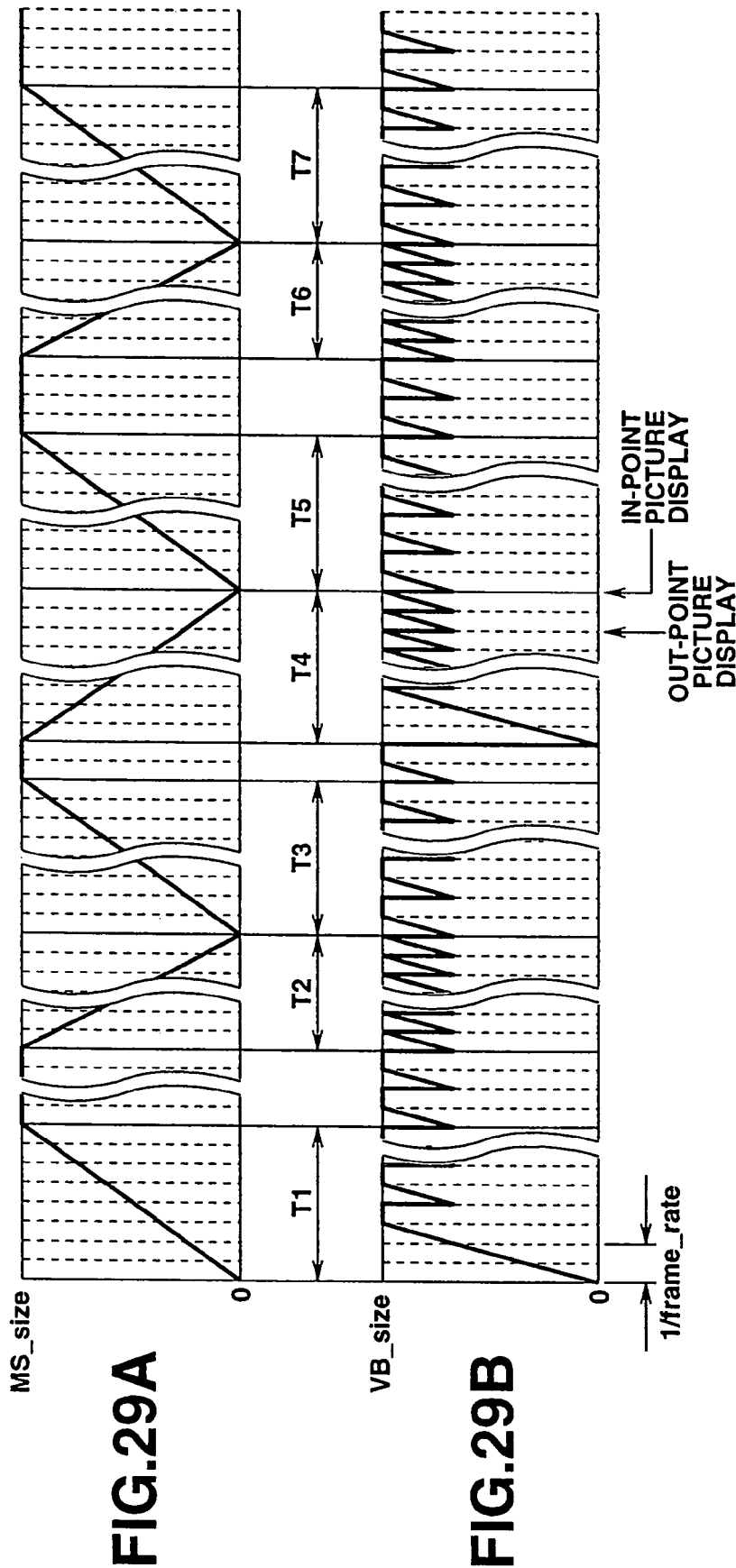

DECODING METHOD AND APPARATUS AND RECORDING METHOD AND APPARATUS FOR MOVING PICTURE DATA

This is a continuation of U.S. patent application Ser. No. 09/904,320, filed Jul. 12, 2001 now U.S. Pat. No. 6,934,339, which is a divisional of U.S. patent application Ser. No. 09/189,483, filed Nov. 10, 1998 now U.S. Pat. No. 6,396,874, the entirety of which is incorporated herein by reference.

BACKGROUND OF THE INVENTION

1. Field of the Invention

This invention relates to a method and apparatus for recording moving picture data encoded using a prediction encoding system, a recording medium having recorded thereon the moving picture data encoded using the prediction encoding system and a method and apparatus for decoding moving picture data encoded using the predictive encoding method. This invention also relates to a method and apparatus for judging continuous reproducibility of data encoded using the prediction encoding system.

2. Description of the Related Art

The conventional recording/reproducing apparatus for an optical disc generally includes an encoding unit and a decoding unit for companding a picture in accordance with an MPEG (Moving Picture Experts Group) system. Picture signals are recorded/reproduced as the picture is compressed or expanded using this MPEG system.

In this MPEG system, a picture constituting a moving picture (picture of a field or a frame) is encoded in accordance with a picture type of one of I-, P- and B-pictures, by way of compressing the picture.

The I-picture is in which encoding is completed within one picture, is encoded independently of other pictures. Thus, the I-picture is used as an entry point for random accessing or error restoration.

The P-picture is obtained on predictive coding from a temporally past I- or P-picture. Thus, for decoding this P-picture, the temporally past I- or P-pictures need to be already decoded.

The B-picture is obtained on predictive coding in the forward direction, backward direction or in both directions from a temporally future I- or P-picture. Thus, for decoding this B-picture, temporally past and future I- or P-pictures need to be already decoded.

Thus, in the MPEG system, pictures are compressed efficiently by inter-picture predictive coding, while random accessing can be had to the compressed moving pictures.

Also, in the MPEG system, these different sorts of pictures are compressed into a data stream made up of an optional number of pictures grouped together (group-of-pictures or GOP). The MPEG system provides that at least one I-picture be present in each GOP. This renders possible random accessing to moving pictures compressed on the GOP basis.

It is now assumed that, in the above-described conventional recording/reproducing apparatus, signals compressed in accordance with the MPEG system are to be reproduced.

On a recording medium, encoded data of a datastream shown for example in FIG. 1 is recorded. In the conventional recording/reproducing apparatus, the datastream recorded as shown in FIG. 1A is decoded to display the decoded datastream in the picture sequence shown in FIG. 1B. In FIG. 1, symbols affixed to the pictures "I", "P" and "B" denote I-, P- and B-pictures, respectively, each suffix number indicating the display order in the GOP, that is the so-called temporal reference.

For reproducing the encoded data of the datastream shown in FIG. 1A by the conventional recording/reproducing apparatus, a picture $I_0$ is decoded first. Since the I-picture is complete in itself, the conventional recording/reproducing apparatus can decode $I_0$ by itself without decoding other pictures. The conventional recording/reproducing apparatus then proceeds to decode forwardly predictive-coded $P_2$, based on the decoded $I_0$. Since the P-picture is predictive-coded from the temporally previous I- or P-picture, it is necessary for the conventional recording/reproducing apparatus to decode $I_0$ prior to decoding this $P_2$. The conventional recording/reproducing apparatus then proceeds to decode the bidirectionally coded $B_1$ based on the decoded $!_0$ and $P_2$. Since the B-picture is bidirectionally coded from the temporally forward and backward I- or P-pictures, it is necessary for the conventional recording/reproducing apparatus to decode $I_0$ and $P_2$ prior to decoding this $B_1$. Thus, the conventional recording/reproducing apparatus decodes the encoded data of the datastream shown in FIG. 1A in the sequence of $I_0 \rightarrow P_2 \rightarrow B_1 P_4 \rightarrow B_3 \rightarrow P_6 \rightarrow B_5 \rightarrow I_8 \rightarrow B_7 \rightarrow P_{10} \rightarrow B_9 \rightarrow \ldots$.

If, in the conventional recording/reproducing apparatus, the pictures decoded in the above sequence are to be displayed, the picture sequence is interchanged as shown in FIG. 1B to make a display in the sequence of $I_0 \rightarrow B_1 \rightarrow P_2 \rightarrow B_3 \rightarrow P_4 \rightarrow B_5 \rightarrow P_6 \rightarrow B_7 \rightarrow I_8 \rightarrow B_9 \rightarrow P_{10} \rightarrow \ldots$.

Meanwhile, in the conventional recording/reproducing apparatus, if the recording medium is random-accessible, it is possible to have random access to the encoded data recorded by the MPEG system. Thus, it is possible with the conventional recording/reproducing apparatus to skip certain pictures by first reproducing pictures up to the P-picture shown at $S_A$ and skipping the ensuing pictures to reinitiate reproduction at the B-picture shown at a point $S_B$ (picture $B_3$). This skipping of certain pictures is hereinafter termed skipping and picture reproduction from a certain picture to a different distant picture by skipping intermediate pictures is termed skip reproduction. Also, a picture directly previous to the start of the skipping, for example, a picture $S_A$ shown in FIG. 2, is termed an out-point picture, while a picture at which reproduction is initiated after the end of the skipping, for example, a picture $S_B$ shown in FIG. 2, is termed an in-point picture.

However, if this skip reproduction is performed on the conventional recording/reproducing apparatus, there are occasions wherein temporal continuity of reproduced pictures is interrupted and lost.

If, for example, the in-point picture is a B-picture, it is necessary to previously decode an I- or a P-picture required for decoding this B-picture, in which case temporal continuity of reproduced pictures is interrupted and lost. More specifically, with reference to an instance shown in FIG. 2, since the in-point picture is $B_3$ with the conventional recording/reproducing apparatus, at least $I_0$, $P_2$ and $P_4$ need to be decoded in order to decode this $B_3$. Thus, with the conventional recording/reproducing apparatus, no picture can be displayed while $I_0$, $P_2$ and $P_4$ are decoded, such that the picture continuity is interrupted and lost.

As described above, it is not possible with the conventional recording/reproducing apparatus to achieve seamless reproduction of pictures ahead and at back of skipping on the occasion of skipping reproduction.

Although the above example is pertinent to picture compression in accordance with the MPEG system, temporal continuity in skipping reproduction is similarly interrupted and lost even in case of inter-picture predictive coding in which the difference between pictures is found in order to exploit the inter-picture correlation and the difference thus found is encoded.

SUMMARY OF THE INVENTION

It is therefore an object of the present invention to provide a decoding method and apparatus for decoding moving picture data in which continuity of moving pictures before and after the skipping is maintained to enable skipping reproduction.

It is another object of the present invention to provide a recording method and apparatus for recording moving pictures in such a manner that a reproduction starting picture and a reproduction termination picture can be decoded and outputted correctly at the thine of reproducing moving picture data, and that, at the time of skipping reproduction, skipping from the reproduction termination picture to the reproduction starting picture can be effected seamlessly.

It is a further object of the present invention to provide a recording medium on which moving picture data are recorded thereon so that the reproduction starting picture and the reproduction termination picture can be correctly decoded and outputted at the time of reproducing moving picture data, and so that, at the time of skipping reproduction, skipping from the reproduction termination picture to the reproduction starting picture can be effected seamlessly.

It is a further object of the present invention to provide a method and apparatus for decoding moving picture data so that the reproduction starting picture and the reproduction termination picture can be decoded and outputted correctly and so that, at the time of skipping reproduction, skipping from the reproduction termination picture to the reproduction starting picture can be effected seamlessly.

It is yet another object of the present invention to provide a method and apparatus for judging feasibility of continuous reproduction of moving picture data at the time of skipping reproduction.

In one aspect, the present invention provides a decoding apparatus for data of moving pictures for decoding encoded data of moving pictures encoded using a predictive encoding system, including decoding means for decoding first encoded data made up of moving pictures up to a preset moving picture and second encoded data made up of moving pictures beginning from a moving picture displayed next to the preset moving picture at a speed faster than the display speed of the encoded data, and output control means for controlling the outputting of decoded moving pictures based on the time management information of each moving picture of the encoded data.

With the decoding apparatus for multiplexed data according to the present invention, the decoding means time-divisionally decoding the first encoded data and the second encoded data.

Also, with the decoding apparatus for multiplexed data according to the present invention, there is provided storage means for temporarily storing decoded moving picture data.

With the present moving picture data decoding apparatus, the first encoded data and the second encoded data are decoded at a decoding speed faster than the display speed.

In another aspect, the present invention provides a decoding method for data of moving pictures for decoding encoded data of moving pictures encoded using a predictive encoding system including a decoding step for decoding first encoded data made up of moving pictures up to a preset moving picture and second encoded data made up of moving pictures beginning from a moving picture displayed next to the preset moving picture at a speed faster than the display speed of the encoded data, and an output control step for controlling the outputting of decoded moving pictures based on the time management information of each moving picture of the encoded data.

In the present moving picture data decoding method, the decoding step time-divisionally decodes the first and second encoded data during the decoding step.

In the present moving picture data decoding method, there is provided a storage step for temporarily storing decoded moving picture data.

In the present moving picture data decoding method, the first and second encoded data are decoded at a decoding speed higher than the display speed.

In a further aspect, the present invention provides a decoding apparatus for data of moving picture for decoding encoded data of moving pictures encoded using a predictive encoding system, including first decoding means for decoding encoded data up to a moving picture whose display is completed at a first time point corresponding to a preset display time point, second decoding means for decoding encoded data beginning from a moving picture which starts to be displayed at a second time point skipped a preset time interval from the first time point, output control means for controlling the outputting of a moving picture decoded by the first decoding means or the second decoding means when the time management information of the encoded data coincides with reference synchronization signals, and switching means for changing the reference synchronization signals to the second time point when the reference synchronization signals are equal to the first time point for switching the moving picture output-controlled by the output control means to the picture decoded by the second decoding means.

In the present moving picture data decoding apparatus, a picture decoded by the first decoding means and whose display is terminated at a first time point and a picture decoded by the second decoding means and whose display is started at a second time point are switched and outputted simultaneously with switching of the reference synchronization signal.

In a further aspect, the present invention provides a decoding method for data of moving picture for decoding encoded data of moving pictures encoded using a predictive encoding system, including a first decoding step for decoding encoded data up to a moving picture whose display is completed at a first time point corresponding to a preset display time point, a second decoding step for decoding encoded data beginning from a moving picture which starts to be displayed at a second time point skipped a preset time interval from the first time point, an output control step for generating a reference synchronization signal and for controlling the outputting of a moving picture decoded by the first decoding step or the second decoding step when the time management information coincides with reference synchronization signals and a switching step for changing the reference synchronization signal to the second time point when the reference synchronization signal is equal to the first time point for switching the moving picture output-controlled by the output control step to the picture decoded by the second decoding step.

In the present moving picture data decoding method, a picture decoded by the first decoding means and whose display is terminated at a first time point and a picture decoded by the second decoding means and whose display is started at a second time point are switched and outputted simultaneously with switching of the reference synchronization signal.

In a further aspect, the present invention provides a recording apparatus for moving picture data including encoding means for encoding moving picture data using a predictive encoding system, designation information supplying means for supplying the information designating a decoding starting picture and a display starting picture in the moving picture data and for supplying the information designating a decoding terminating picture and a display terminating picture in the moving picture data and recording means for recording moving picture data encoded by the encoding means and the designation information supplied by the designation information supplying means.

In the present moving picture data recording apparatus, the information specifying a decoding starting picture and a display starting picture in moving picture data and the information specifying the decoding terminating picture and the display terminating picture in the moving picture data are recorded on the recording medium.

In a further aspect, the present invention provides a recording method for moving picture data including encoding means for encoding moving picture data using a predictive encoding system, supplying the information designating a decoding starting picture and a display starting picture in the moving picture data and for supplying the information designating a decoding terminating picture and a display terminating picture in the moving picture data, and recording encoded moving picture data and the supplied designation information.

In the present moving picture data recording method, the information specifying a decoding starting picture and a display starting picture in moving picture data and the information specifying the decoding terminating picture and the display terminating picture in the moving picture data are recorded on the recording medium.

In a further aspect, the present invention provides a recording medium on which there are recorded the information designating a decoding starting picture and a display starting picture in moving picture data and the information designating a decoding terminating picture and a display terminating picture in moving picture data along with encoded data of moving pictures encoded using the predictive encoding system.

On the present recording medium, there are recorded the information specifying a decoding starting picture and a display starting picture in moving picture data and the information specifying the decoding terminating picture and the display terminating picture in the moving picture data.

In a further aspect, the present invention provides a decoding apparatus for moving picture data including decoding means for decoding encoded data of moving pictures encoded using a predictive encoding system, and control means for controlling the decoding and the outputting of moving picture data by the decoding means based on the information designating a decoding start picture and a display start picture in moving picture data and on the information designating a decoding terminating picture and a display terminating picture in the moving picture data.

In the present moving picture data decoding apparatus, encoded data of a moving picture encoded using the inter-picture predictive encoding system are decoded based on the information specifying the decoding starting picture and the display starting picture in moving picture data and on the information specifying the decoding terminating picture and the display terminating picture in the moving picture data and the decoded data are outputted.

In a further aspect, the present invention provides a decoding method for moving picture data including decoding encoded data of a moving picture encoded using a predictive encoding system based on the information specifying a decoding starting picture and a display starting picture in moving picture data and on the information specifying a decoding terminating picture and a display terminating picture in moving picture data, and outputting the decoded data.

In the present moving picture data decoding method, encoded data of a moving picture encoded using the inter-picture predictive encoding system are decoded based on the information specifying the decoding starting picture and the display starting picture in moving picture data and on the information specifying the decoding terminating picture and the display terminating picture in the moving picture data and the decoded data are outputted.

In yet another aspect, the present invention provides a continuous reproduction possibility verifying method and apparatus for encoded data wherein, in reproducing a series of encoded data encoded using a predictive encoding system by decoding pictures of the encoded data from a first display starting point picture of the encoded data to a first display terminating point picture of the encoded data, designated as an out-point picture in skipping processing of the encoded data, then skipping the decoding from the first display terminating point picture to a second display starting point picture designated as an in-point picture in the skipping processing, and by decoding pictures from the second display starting point picture to a second display terminating point picture, it is verified, based on the time difference between a display time point of the first display starting point picture and a display time point of the first display terminating point picture, whether or not continuous display of the first display terminating point picture and the second display starting point picture is possible.

BRIEF DESCRIPTION OF THE DRAWINGS

FIG. 15A illustrates an example of the picture sequence of the out-point side program and the in-point side program for illustrating the decoding and display timing of the decoding device of the optical disc recording and/or reproducing apparatus according to the first embodiment.

FIG. 15B shows the decoding timing of the out-point side program shown in FIG. 15A.

FIG. 15C shows the display timing of the in-point side program shown in FIG. 15A.

FIG. 15D shows the decoding timing of the in-point side program shown in FIG. 15A.

FIG. 15E shows the display timing of the in-point side program shown in FIG. 15A.

FIG. 15F shows the display timing of the out-point side program and the in-point side program shown in FIG. 15A.

FIG. 16A illustrates the amount of bits occupying a main buffer of the decoding device of the recording/reproducing apparatus of an optical disc of the first embodiment of the present invention.

FIG. 16B illustrates the amount of bits occupying a first video buffer of the decoding device of the recording/reproducing apparatus of an optical disc of the first embodiment of the present invention.

FIG. 16C illustrates the amount of bits occupying a second video buffer of the decoding device of the recording/reproducing apparatus of an optical disc of the first embodiment of the present invention.

FIG. 28A illustrates an instance of picture sequence of an out-point side program and an in-point side program for illustrating the decoding timing and the display timing of the decoding device of the optical disc recording/reproducing apparatus according to the third embodiment of the present invention.

FIG. 28B shows the decoding timing of the out-point side program shown in FIG. 28A.

FIG. 28C shows the display timing of the out-point side program shown in FIG. 28A.

FIG. 28D shows the decoding timing of the in-point side program shown in FIG. 28A.

FIG. 28E shows the display timing of the in-point side program shown in FIG. 28A.

FIG. 28F shows the display timing of the out-point side program and the out-point side program shown in FIG. 28A.

FIG. 29A shows the amount of bits occupying a main buffer of the decoding device of the recording/reproducing apparatus of an optical disc of the third embodiment of the present invention.

FIG. 29B shows the amount of bits occupying a video buffer of the decoding device of the recording/reproducing apparatus of an optical disc of the third embodiment of the present invention.

DESCRIPTION OF THE PREFERRED EMBODIMENTS

Figures 1A, 1B:
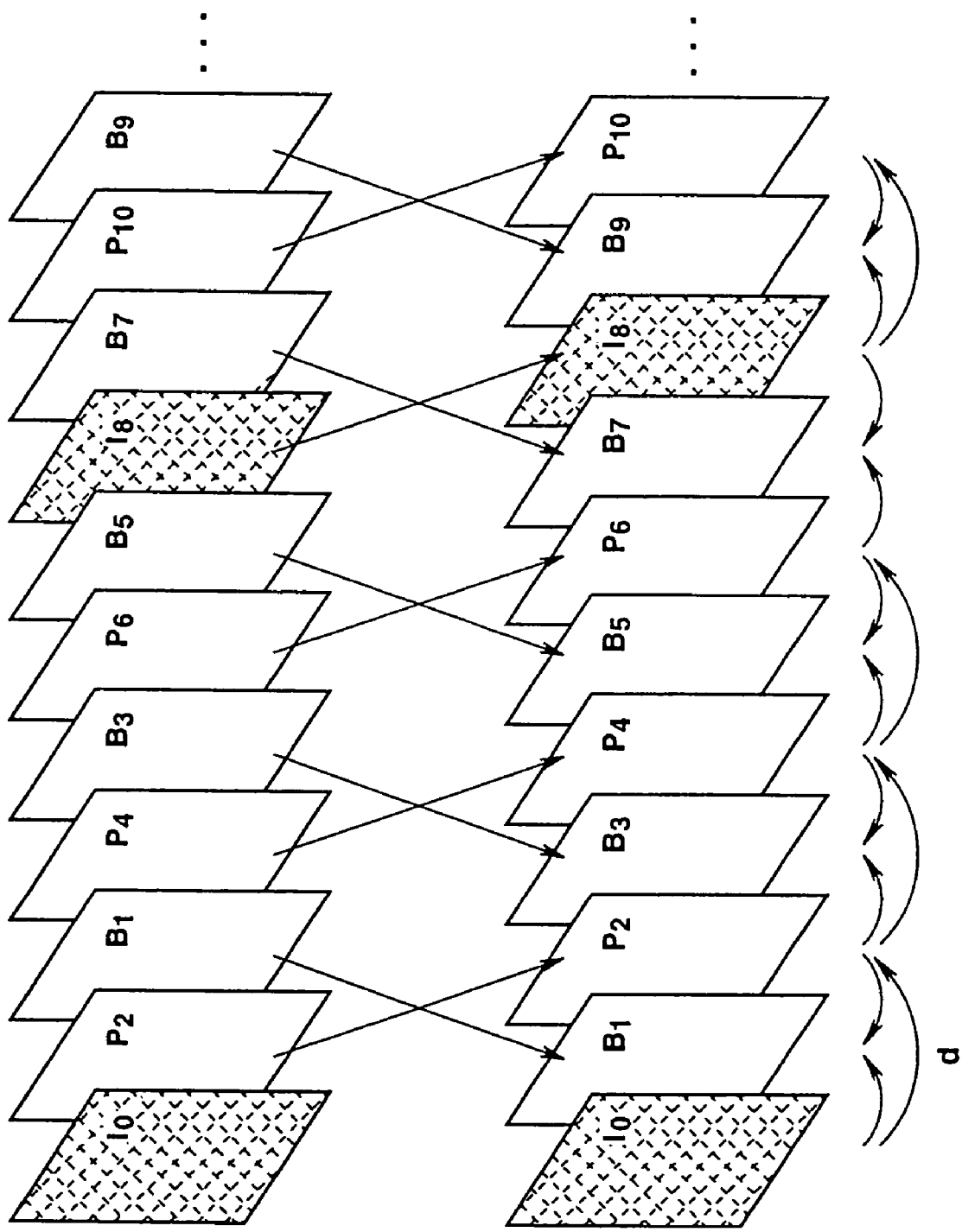
FIG. 1 illustrates pictures encoded in accordance with the MPEG system.
Figure 2:
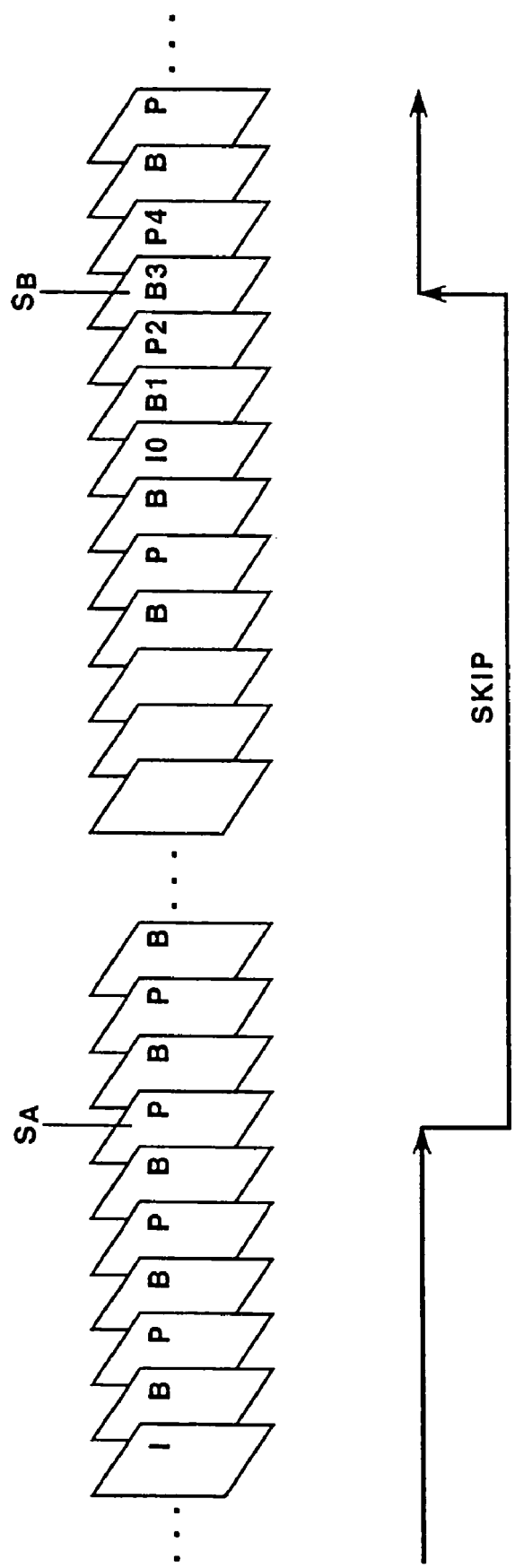
FIG. 2 illustrates skipping reproduction of encoded data encoded in accordance with the MPEG system.

Referring to the drawings, preferred embodiments of an optical disc recording/reproducing apparatus embodying the present invention will be explained in detail.

First Embodiment

First, a recording/reproducing apparatus according to a first embodiment of the present invention will be explained.

Figure 3:
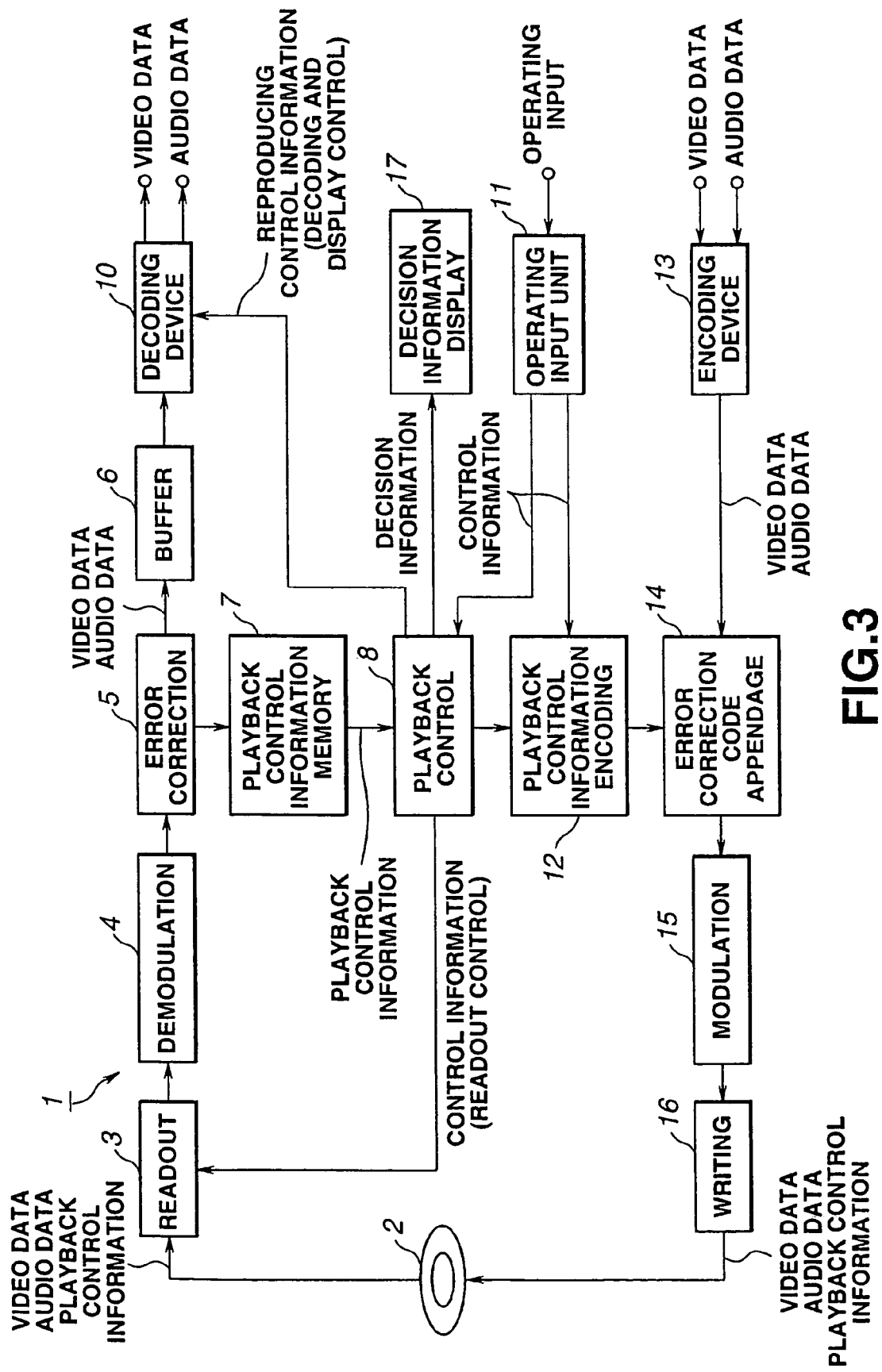
FIG. 3 is a block diagram of an optical disc recording/reproducing apparatus according to a first embodiment of the present invention.

FIG. 3 shows a block diagram of an optical disc recording/reproducing apparatus embodying the present invention.

An optical disc recording/reproducing apparatus 1 reproduces video and audio data, encoded for signal compression in accordance with the MPEG 2 (Moving Picture Exerts Group 2) system from a random-accessible optical disc 2, and encodes video and audio data on a random-accessible optical disc 2 in accordance with the MPEG 2 system to record the encoded data on the optical disc 2.

The recording/reproducing apparatus 1 includes a readout unit 3 for reading out video data, audio data and the playback control information compressed by the MPEG system and recorded in this compressed form on the optical disc 2, a demodulating unit 4 for demodulating the read-out video data, audio data and the playback control information, an error correction and coding unit 5 for correcting the video data, audio data and the playback control information for errors based on the error correction code, and a buffer 6 for transiently storing the error-corrected video and audio data. The optical disc recording/reproducing apparatus 1 also includes a playback control information memory 7 for storage of the read-out playback control information, a playback controller 8 for controlling the readout unit 3 in accordance with the playback control information to control the reproduction of the optical disc 2 and a decoding device 10 for decoding the read-out video and audio data. The optical disc recording/reproducing apparatus 1 also includes a an operating input unit 11, fed with the operating input information from a user, a playback control information encoding unit 12 for encoding the video and audio data recorded on the optical disc 2 and an error correction code device 13 for encoding the video and audio data in accordance with MPEG system. The optical disc recording/reproducing apparatus 1 also includes an error correction code appendage unit 14 for appending the error correction code to the encoded video data, audio data and the playback control information and a demodulation unit 15 for demodulating the video data, audio data and playback control information to which has been appended the error correction code. The optical disc recording/reproducing apparatus 1 further includes a writing unit 16 for writing on the optical disc 2 the modulated video data, audio data and playback control information, and a decision information display unit 17 for displaying the discriminating information as discriminated by the playback controller 8.

When encoding the input video and audio data in accordance with the MPEG system and recording the encoded data on the optical disc 2, the optical disc recording/reproducing apparatus 1 executes the following processing:

First, uncompressed video and audio data are entered from an external device to an encoding device 13. The encoding device 13 encodes the input video and audio data in accordance with MPEG 2 system for data compression. The encoded video data and the encoded audio data are packaged independently of each other. This encoding device 13 multiplexes the packaged video and audio data to send the multiplexed data to the error correction code appendage unit 14.

The error correction code appendage unit 14 appends an error correction code to the video and audio data entered from the encoding device 13 to send the resulting data to the modulation unit 15. The modulation unit 15 modulates the video and audio data entered form the error correction code appendage unit 14 to send the resulting data to the writing unit 16, which then records the video and audio data entered from the modulation unit 15 on the optical disc 2.

When reproducing the video and audio data recorded on the optical disc 2, the optical disc recording/reproducing apparatus 1 executes the following processing. It is noted that the present optical disc recording/reproducing apparatus 1 reproduces video and audio data recorded on the optical disc 2 in terms of an AV program as a series of data reproducing units from a pre-set playback start point up to a pre-set playback end point.

First, the readout unit 3 reads out from the optical disc 2 the playback control information specifying the control information on the decoding and display of the AV program and on the readout of the AV program to send the read-out information to the demodulating unit 4, which then demodulates the playback control information entered from the readout unit 3 to send the demodulated information to the error correction and coding unit 5. The error correction and coding unit 5 corrects the playback control information sent from the readout unit 3 for errors to store the error-corrected playback control information in the memory 7. The operating input unit 11 is responsive to the operating input by the user to generate the control information specifying the playback sequence or the reproducing route of the AV program to send the generated control information to the playback controller 8. The playback controller 8 then retrieves the playback control information of the reproduced AV program, responsive to the operating input by a user, to send the playback control information of the reproduced AV program to the playback controller 8. The playback controller 8 then controls the readout unit 3 responsive to the retrieved playback control information to start reproduction of the video and audio data based on the retrieved playback control information on the AV program basis and sends the retrieved playback control information to the decoding device 10.

When the playback operation is started on the AV program basis, the readout unit 3 reads out the video and audio data, recorded on the optical disc 2 after compression encoding by the MPEG system 2, under control by the playback controller 8. The video and audio data, read out at this time, are formed into packages and multiplexed on the package basis. The demodulating unit 4 demodulates the video and audio data, entered from the readout unit 3, to send the demodulated data to the error correction and coding unit 5. The error correction and coding unit 5 corrects the video and audio data, entered from the demodulating unit 4, for errors, and sends the error-corrected data to the buffer 6. The buffer 6 transiently stores the furnished video and audio data. At this time, the playback controller 8 monitors the data storage quantity of the buffer 6 and performs control to read out data from the optical disc 2 as long as there is any available vacant area in the buffer 6. The buffer 6 sends the video and audio data stored therein to the decoding device 10. This buffer 6 absorbs the readout interrupt time caused by readout errors during the pickup movement time or until the servo state is restored to the steady state in order to supply the video and audio data to the decoding device 10 as a continuous stream. The decoding device 10 decodes the video and audio data to output the decoded vide and audio data to outside.

If the AV program recorded on the optical disc 2 is edited to change the reproduction starting point or the reproduction termination point for the video or audio data, the playback sequence of the AV program is changed or the new AV program is formulated, the above-described optical disc recording/reproducing apparatus 1 executes the following processing:

First, to the operating input unit 11 are entered the reproduction starting point and the reproduction termination point of the new AV program responsive to the editing operation by the user. The playback controller 8 reads out from the optical disc 2 data required for reproducing and decoding the new AV program and for reading out the new AV program, based on the above information entered responsive to the editing actuation by the user, and causes the read-out data to be stored in the playback control information memory 7. The playback control information encoding unit 12 generates the playback control information for the new AV program based on the data stored in the playback control information memory 7. An error correction code is appended to the playback control information by the error correction code appendage unit 14. The resulting data is modulated by the modulation unit 15 so as to be recorded on the optical disc 2.

The processing during skipping reproduction of the recording/reproducing application programs for the optical disc is now explained.

The AV program containing an out-point picture Pout during skipping reproduction is termed an out-point side program. A picture on the out-point side program decoded last during skipping reproduction is termed the last picture Plast. The AV program containing the in-point picture Pin during skipping reproduction is termed an in-point side program. The first picture on the in-point side program decoded first during skipping reproduction is termed a leading picture Pfirst.

Figure 4:
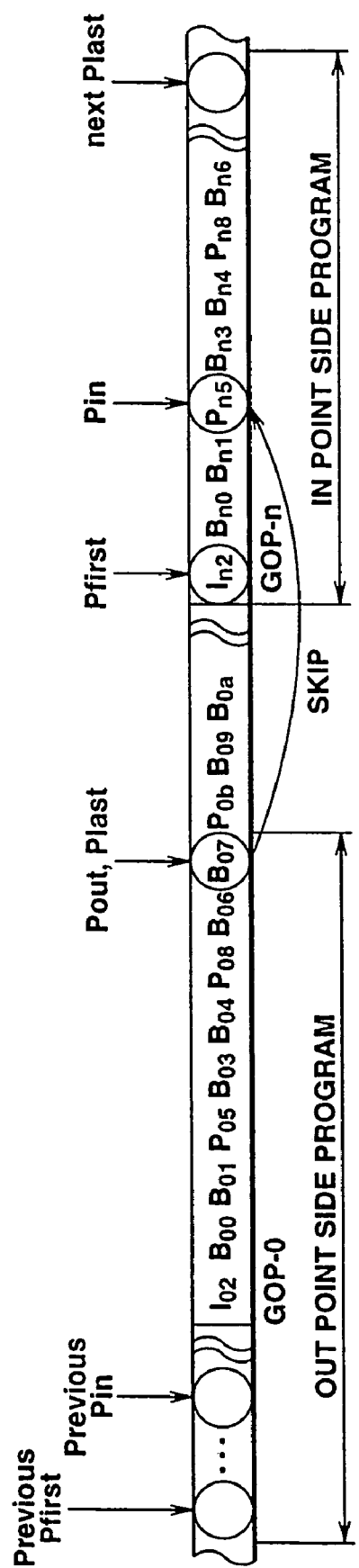
FIG. 4 illustrates the relation between an out-point side program and an in-point side program at the time of skipping reproduction.

The out-point side program and the in-point side program are explained specifically with reference to FIG. 4. If, for example, $B_{07}$ of a GOP-0 is an out-point picture Pout, $B_{07}$ of a GOP-0 represents the last picture Plast, with data up to this $B_{07}$ representing the out-point side program. Similarly, if $P_{05}$ of GOP-n, skipped from $B_{07}$ of GOP-0, is an in-point picture Pin, $I_{n2}$ of the GOP-n is the leading picture Pfirst, with data downstream of $I_{n2}$ representing the in-point side program. The i'th GOP in the display sequence is specified as GOP-i. Also, an j'th I-picture of the i'th GOP in the display sequence is specified as Iij, and a j'th P-picture in the display sequence of the i'th GOP is specified as Pij, while the j'th B-picture in the display sequence is specified as Bij.

If skipping reproduction is to be performed by the optical disc recording/reproducing apparatus 1, the playback control information, such as the out-point side program or the in-point side program, are entered from outside, responsive to the actuating input by the user. Alternatively, the playback control information pre-recorded on the optical disc 2, such as the out-point side program or the in-point side program, is read out and sent to the playback controller 8. The playback controller 8 controls the readout unit 3, based on the playback control information of the out-point side program and the in-point side program, and sends the playback control information of the out-point side program and the in-point side program to the decoding device 10.

In the playback control information, there are contained the information required for controlling the decoding and display of the AV program, and the control information for reading out the AV program from the optical disc 2. The playback controller 8 sends to the decoding device 10 the portion of the playback control information that is required for controlling the decoding and display of the AV program. The playback controller 8 also sends the portion of the playback control information that is required for reading out the AV program from the optical disc 2 to the readout unit 3.

In the playback control information, there are contained, as the information required for controlling the decoding and display of the AV program, the following information items:

P_last_index: Position information of the last picture Plast (the picture position information is sometimes referred to hereinafter as index).

The picture index can be represented for example by the display sequence of the GOP containing the picture and the display sequence of the picture in the GOP. In an example shown in FIG. 4, for example, the index of the last picture Plast is specified by the display sequence of the GOP containing $B_{07}$ and temporal_reference of $B_{07}$. That is, in the example shown in FIG. 4, the index of the last picture Plast is "07". Meanwhile, temporal_reference specifies the display sequence of the picture in the GOP by a number.

P_in_index: Position information of the in-point picture Pin

The index of the in-point picture Pin is represented in the example shown in FIG. 4 by, for example, the display sequence of the GOP containing $P_{n5}$ and temporal_reference of this $P_{n5}$. That is, in the example shown in FIG. 4, the index of the in-point picture Pin is "n5".

P_in_type: Picture type of the in-point picture Pin

In the example shown in FIG. 4, for example, the picture type of the in-point picture Pin is a P-picture.

P_out_last_field_parity: Parity of the field represented at the trailing end of the out-point picture Pout The parity of this field is the information provided in consideration of 2-3 pull-down provided in MPEG 2 system (for correcting the number of frames per second between the television broadcasting and cinema).

P_in_first_field_parity: Parity of the field represented first in the in-point picture Pin PTS_Pin: A value corresponding to PTS of the out-point picture Pout added to with the display time of the out-point picture Pout, that is the PTS of the time point of termination of display of the out-point picture Pout (this is sometimes referred to hereinafter as PTS_Pout_end).

The playback control information required for controlling the decoding and display of the AV program is read out from the optical disc 2 by the playback controller 8 and subsequently sent to the decoding device 10.

In the playback control information, there are contained, as the information required in reading out the AV program from the optical disc 2, the following information items:

decode_start_address: An address of initial data required for reproducing the AV Program beginning at a time point indicated by PTS of the in-point picture Pin (PTS_Pin)

For example, this information item is the address of the first byte of the in-point side program on the optical disc 2 (byte offset from the leading end of the file of the AV program containing the in-point side program up to the first byte of the in-point side program).

decode_end_address: An address specifying last data required for reproducing the AV program up to a time point PTS_Pout_end.

For example, this information item is an address of the last byte of the out-point side program on the optical disc 2 (byte offset from the leading end of the file of the AV program file containing the out-point side program up to the last byte of the out-point side program).

The playback control information, required for controlling the readout of the AV program, is read out from the optical disc 2 by the playback controller 8 and sent as the readout control information to the readout unit 3.

The recording/reproducing apparatus 1 for the optical disc can read out data up to the out-point picture Pout of the out-point side program from the optical disc 2, by using the playback control information specifying the above contents in performing the skipping reproduction, while it can read out data from in-point picture Pin of the in-point side program from the optical disc 2.

Also, the optical disc recording/reproducing apparatus can specify a picture denoting the decoding end based on decode_end_address of the playback control information, and also can specify a picture denoting the end of display based on PTS_Pout_end of the playback control information, so that the decoding and display of the out-point side program can be performed correctly at the time of skipping reproduction. That is, decoding of the out-point side program is performed up to $B_{o7}$, as the last picture Plast, in the example shown in FIG. 4, by employing the playback control information. However, since the out-point picture Pout, displayed last, is $B_{o7}$, control can be performed so that decoded $P_{o8}$ will not be displayed.

On the other hand, the recording/reproducing apparatus for the optical disc 1 can specify a picture denoting the decoding start, based on decode_start_address of the playback control information, and also can specify a picture denoting start of display, based on PTS_Pin of the playback control information, so that the in-point side program can be decoded and displayed correctly during skipping reproduction. That is, the decoding of the in-point side program is started from $I_{n2}$ as the leading picture Pfirst, in the example shown in FIG. 4, by employing the playback control information. However, since the in-point picture Pin displayed first is $P_{n5}$, control can be performed so that decoded $I_{n2}$ will not be displayed.

Figure 5:
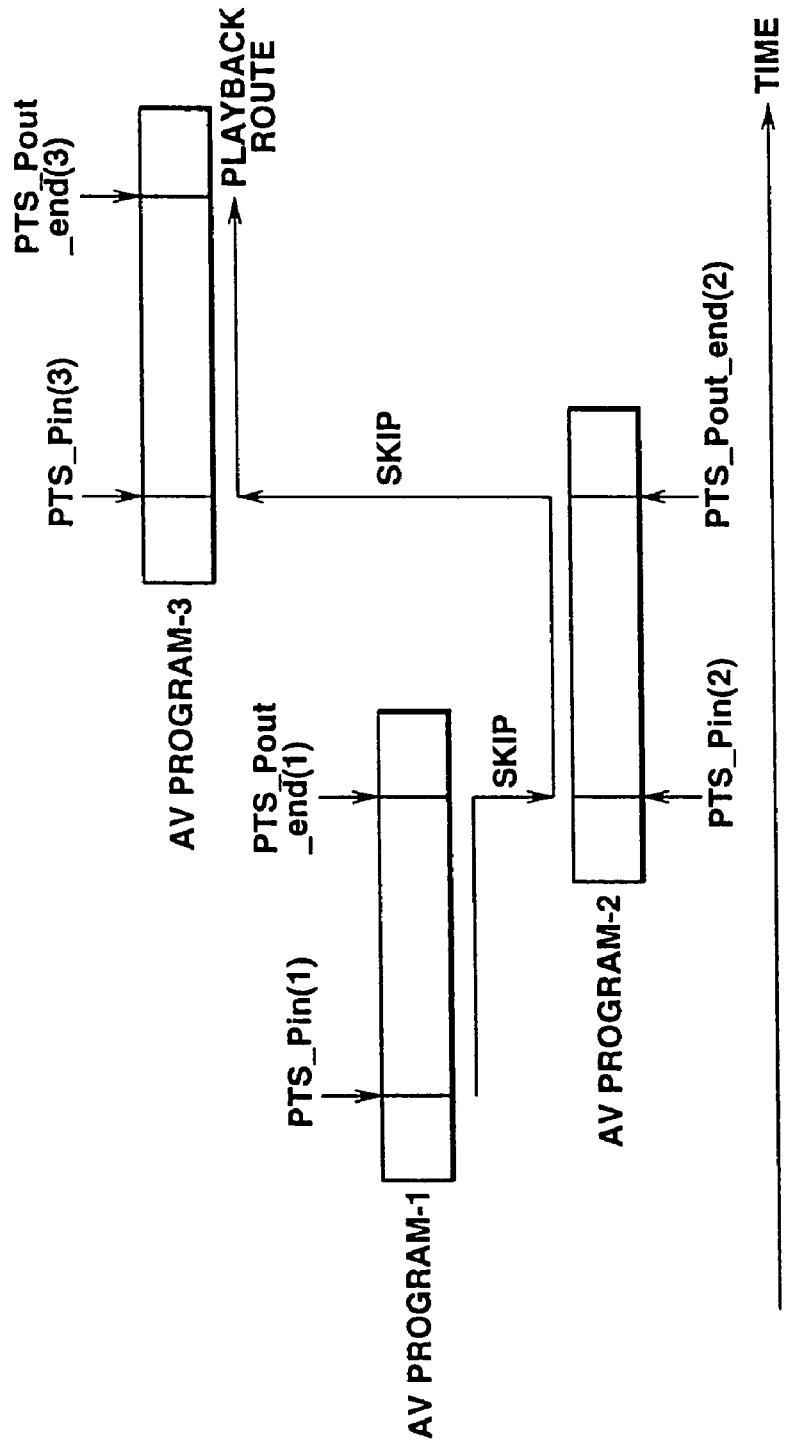
FIG. 5 shows the reproduction route for an AV program at the time of skipping reproduction for illustrating the relation between the display end time of the out-point side program (PTS_Pout_end) and the display start time of the in-point side program (PTS_Pin).

The relation between PTS_Pout_end of the out-point side program and PTS_Pin of the in-point side program during skipping reproduction is now explained. FIG. 5 shows the reproduction route in case video and audio data are sequentially reproduced across three AV programs of from AV program-1 to AV program-3.

In the AV programs of from AV program-1 to AV program-3, PTS_Pin and PTS_Pout_end are specified by the playback control information, and the respective programs are read out from the optical disc 2 based on PTS_Pin and PTS_P out. First, the AV program 1, as an AV program to be reproduced first, is read out from the optical disc 2, and is reproduced from the in-point picture started to be displayed at a time point PTS_P in(1) up to the out-point picture whose display is completed at a time point PTS_Pout_end (1). Reproduction is skipped from an out-point picture, whose display is completed at this time point PTS_Pout_end (1). The AV program-2, which is an AV program to be reproduced next, is read out from the optical disc 2, and reproduction proceeds from an in-point picture, which starts to be displayed at a time point PTS_Pout_end (2), up to an out-point picture whose display is completed at a time point PTS_Pout_end (2). Reproduction is skipped from an out-point picture, whose display is completed at this time point PTS_Pout_end (2). The AV program-3, which is an AV program to be reproduced next, is read out from the optical disc 2, and reproduction proceeds from an in-point picture, which starts to be displayed at a time point PTS_Pout_end (3), up to an out-point picture whose display is completed at a time point PTS_Pout_end (3).

It is noted that, in case of this skipping reproduction from the AV program-1 to the AV program-2, PTS_Pout_end (1), which is the display end time of the out-point picture of the AV program-1, is coincident in real-time with PTS_Pin (2), which is the display start time point of the in-point picture of the AV program-2. Similarly, in case of the skipping reproduction from the AV program-2 to the AV program-3, PTS_Pout_end (2), which is the display end time of the out-point picture of the AV program-2, is coincident in real-time with PTS_Pin (3), which is the display start time point of the in-point picture of the AV program-3. Thus, when the system time clock (STC), which manages the picture decoding timing and the picture display timing, is the display end time of the out-point picture, the display start time is switched to the display start time of the in-point picture of the next program. For example, if STC is PTS_Pout_end (1), an offset STC_offset (1) is subtracted from this STC to switch the display start time to PTS_in (2). Also, if STC is PTS_Pout_end (2), an offset STC_offset (2) is subtracted from this STC to switch the display start time to PTS_in (2). Meanwhile, this offset is obtained on subtraction of PTS_Pout_end indicated in the playback control information of the out-point side program and PTS_Pin indicated in the playback control information of the in-point side program.

By switching the system time clock (STC) during skipping reproduction from PTS_Pout_end indicated in the playback control information of the out-point side program to PTS_Pin indicated in the playback control information of the in-point side program, it is possible to perform seamless reproduction of plural AV programs.

By the editing by the user of the reproducing route of the AV programs recorded on the optical disc 2, new reproducing routes can be prepared. The information on the reproducing routes is generated by the playback control information encoding unit 12 responsive to an actuating input by the user and recorded on the optical disc 2 as the ancillary information for the AV program. By preparing the new reproducing routes in this manner, the reproducing routes can be easily re-edited without decoding and re-encoding video and audio data.

Figure 6:
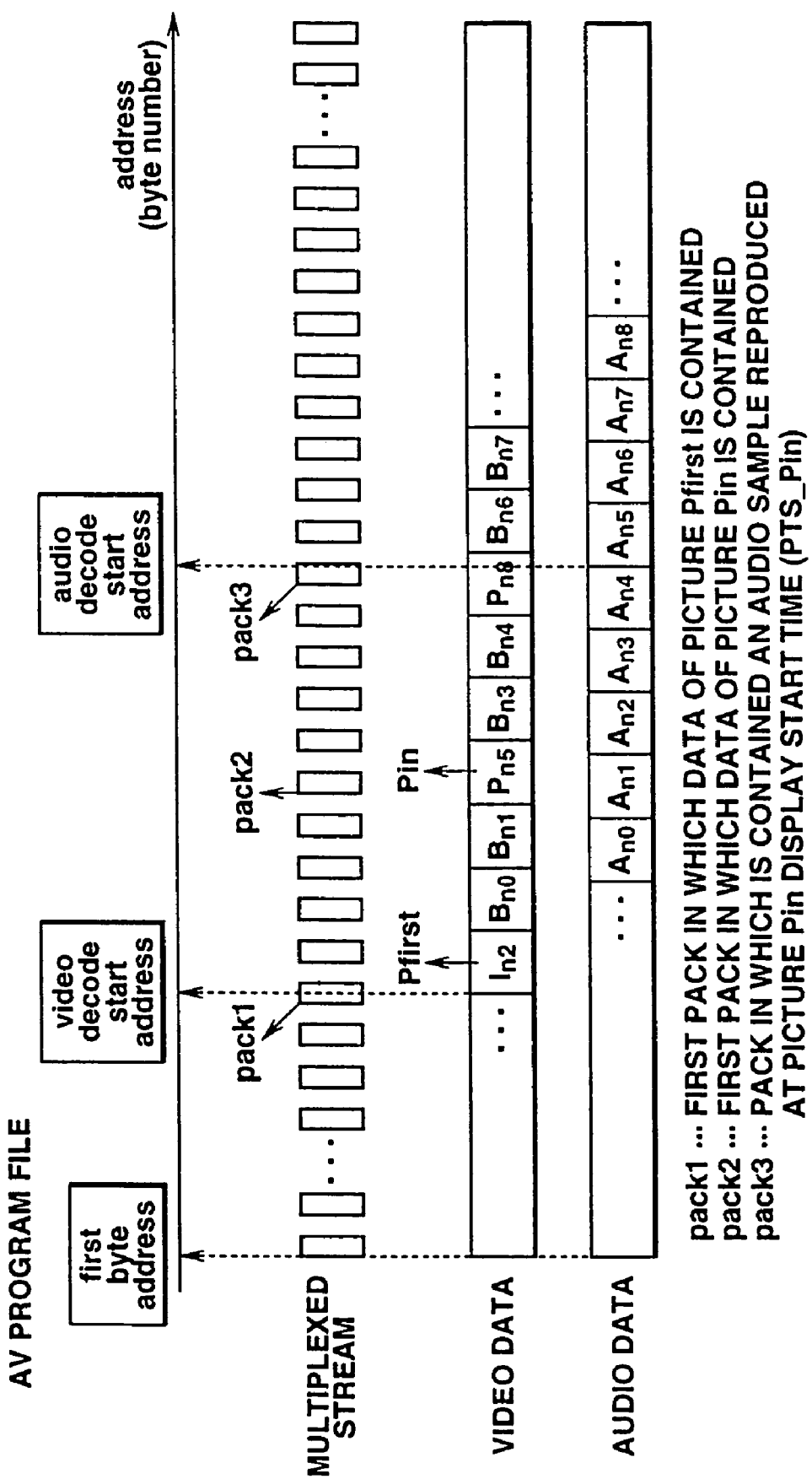
FIG. 6 shows the relation between the multiplexed stream of the AV program file containing the in-point side program and the byte address of the multiplexed stream.
Figure 7:
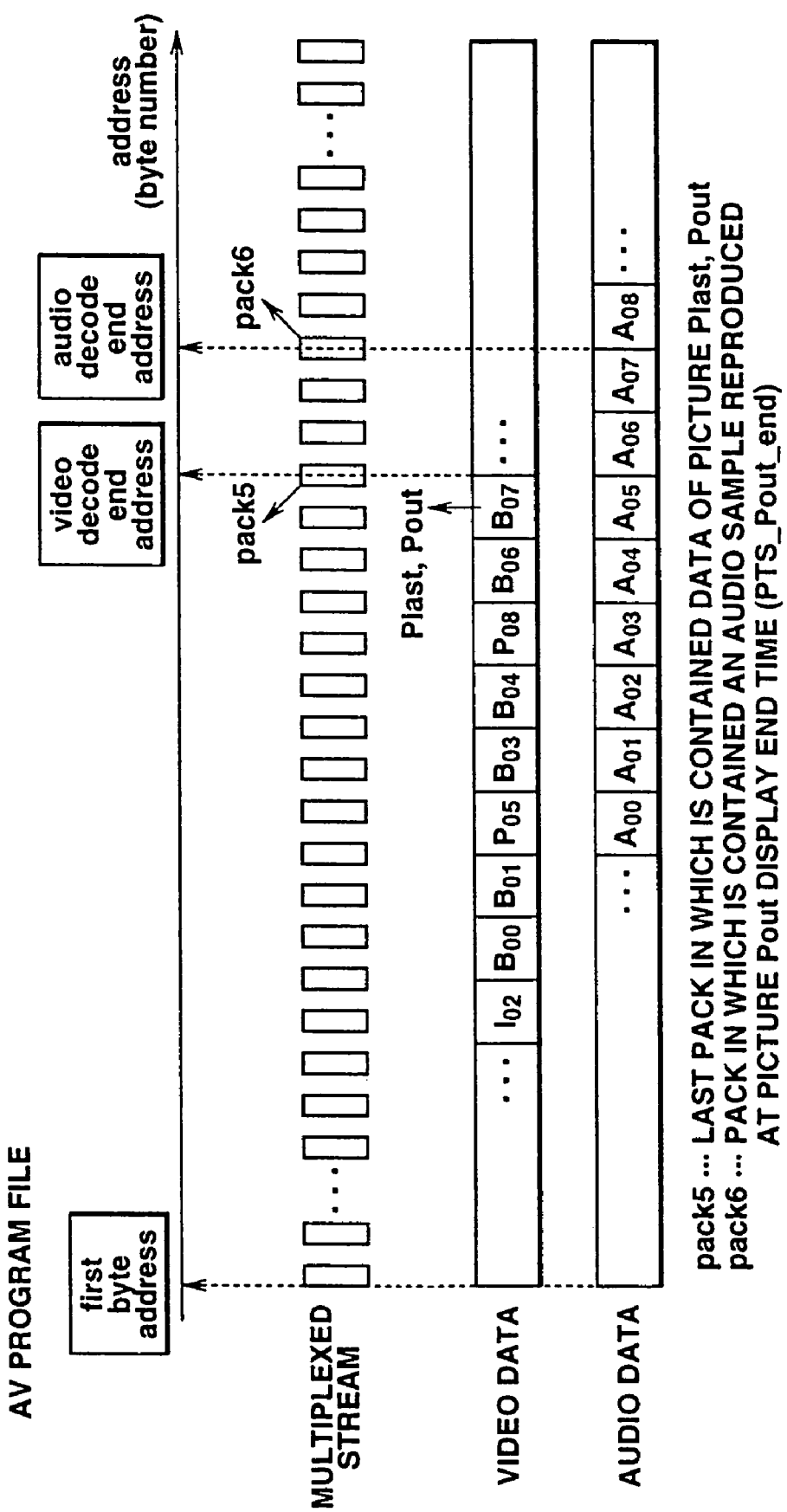
FIG. 7 shows the relation between the multiplexed stream of the AV program file containing the out-point side program and the byte address of the multiplexed stream.

The relation between a multiplexed stream recorded on the optical disc 2 on one hand and decode_start_address and decode_end_address on the AV program is explained. FIGS. 6 and 7 illustrate the relation between a multiplexed stream of an AV program file containing the in-point side program and byte addresses of the multiplexed stream and that between a multiplexed stream of an AV program file containing the out-point side program and byte addresses of the multiplexed stream. In FIGS. 6 and 7, the abscissa denotes the addresses in the AV program file.

Referring to FIG. 6, decode_start_address shown in the playback control information of the in-point side program can be specified for each of the video data and the audio data. It is noted that decode_start_address is shown as an offset quantity from first_byte_address as a leading-end address of an AV program file containing the in-point side program. Therefore, the package (pack 1) at a position of video_decode_start_address of video data represents the first package containing data of the leading-end picture Pfirst (In2 in the drawing) of the in-point side program. Pictures downstream of the leading-end picture of the in-point side program are stored in packages downstream of the package (pack 1) at this video_decode_start_address. For example, the in-point picture Pin ($I_{ns}$ in the drawing) is stored as from the package which is five packages ahead (pack 2). The package (pack 3) at audio_decode_start_address specifying decode_start_address of the audio data is the package containing the audio data reproduced at the display start timing (PTS_Pin) of the in-point picture Pin. Meanwhile, suffix subscripts (n4, n5 and so forth) specifying audio data in the drawing (indicated A in the drawing) indicate that the data in question is reproduced in synchronism with the picture specified by the suffix subscript bearing the same number. Meanwhile, since audio data are not subjected to predictive coding, in contradistinction from picture data, it is decoded from data specified in decode_start_address and outputted.

The decode_end_address, indicated in the playback control information of the out-point side program, can be specified by each of the video data and the audio data, as shown in FIG. 7. The decode_end_address is indicated by, for example, an offset from the first_byte_address which is the leading end address of the AV program file containing the out-point side program. Thus, the package at a position of video_decode_end_address, specifying decode_end_address of video data, represents the last package containing data of the last picture Plast ($B_{07}$ in the drawing) of the out-point side program. Since the last picture Plast of the out-point side program coincides with the out-point picture Pout, data of the out-point picture Pout is stored up to the package (pack 5) at a position of video_decode_end_address. Also, a package (pack 6) at a position of audio_decode_end_address specifying the decode_end_address of the audio data represents a package containing audio data reproduced at a display end time (PTS_Pout_end) of the out-point picture Pout.

Figure 8:
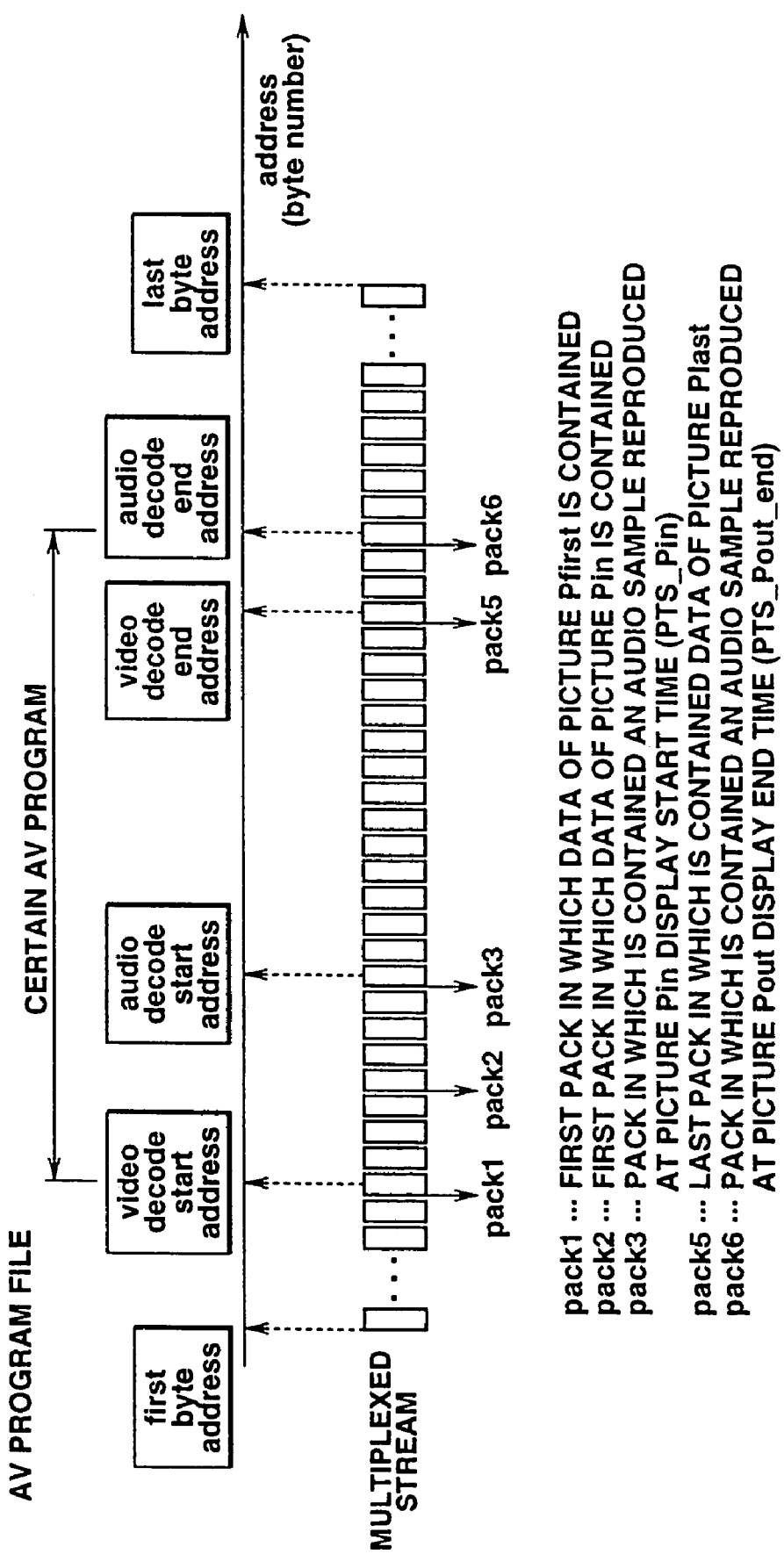
FIG. 8 shows the relation between the byte address of a multiplexed stream recorded on an optical disc on one hand and the decoding starting position (decode_start_address) and the decoding end position (decode_end_address) of a certain AV program.

FIG. 8 shows the relation between the byte address of the multiplexed stream recorded on the optical disc 2 on one hand and the decode_start_address and the decode_end_address of a certain AV program on the other hand. The abscissa in FIG. 8 stands for addresses in the AV program file.

An AV program is prescribed from a series of video data from video decode_start address to video decode_end address and from a series of audio data from audio_decode_start_address to audio_decode_address associated with the series of video data. The video and audio data recorded on the optical disc 2 are reproduced on the AV program basis.

Figures 9, 10:
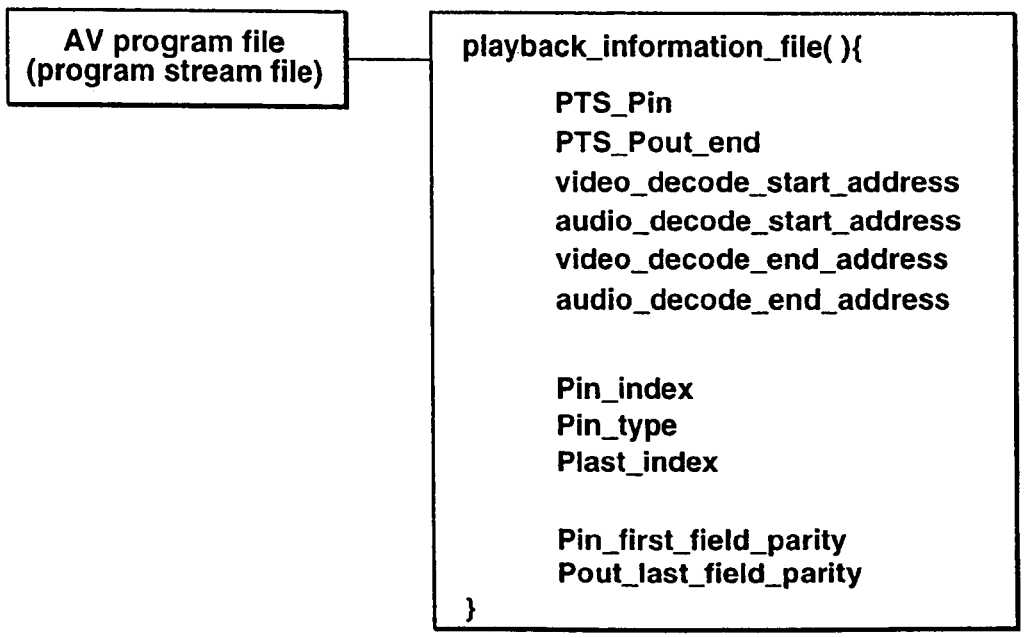
FIG. 9 shows an illustrative description of an AV program file recorded on an optical disc.
FIG. 10 shows an illustrative description of the reproduction control in recorded on an optical disc.

Each package constituting the multiplexed stream recorded on the optical disc 2 is stored in the AV program file. In the AV program file, a loop is formed by a "do~while" sentence, as shown in FIG. 9. In a "pack" stated in this "do~while" sentence are described "package header" and "PES_packet". In the "PES_packet" are stated "pack_header", "PTS", "DTS" and "packet_payload". In this "packet_payload" are stored video data or audio data.

On the optical disc 2 are recorded, along with the AV program file, the playback control information file (playback_information_file), stating the playback control information, as shown in FIG. 10. This playback control information file is recorded from one AV program to another. That is, a sole item of the playback control information is recorded for each AV program.

By recording the AV program file and the playback control information on the optical disc 2 and by reading out the AV program file and the playback control information from the optical disc 2, it is possible to read out plural AV programs to reproduce the read-out program by seamless skipping reproduction.

By the user newly formulating the playback control information file or changing the existing playback control information, it is possible to formulate a new AV program to edit the video program already recorded on the optical disc 2. The playback control information is generated by the playback control information encoding unit 12 responsive to an actuating input by a user and is recorded as the playback control information file of the optical disc 2. By preparing the new playback control information file in this manner, the video program can be re-edited easily without decoding or encoding the video and audio data.

The decoding device 10 of the optical disc recording/reproducing apparatus is explained in further detail.

Figure 11:
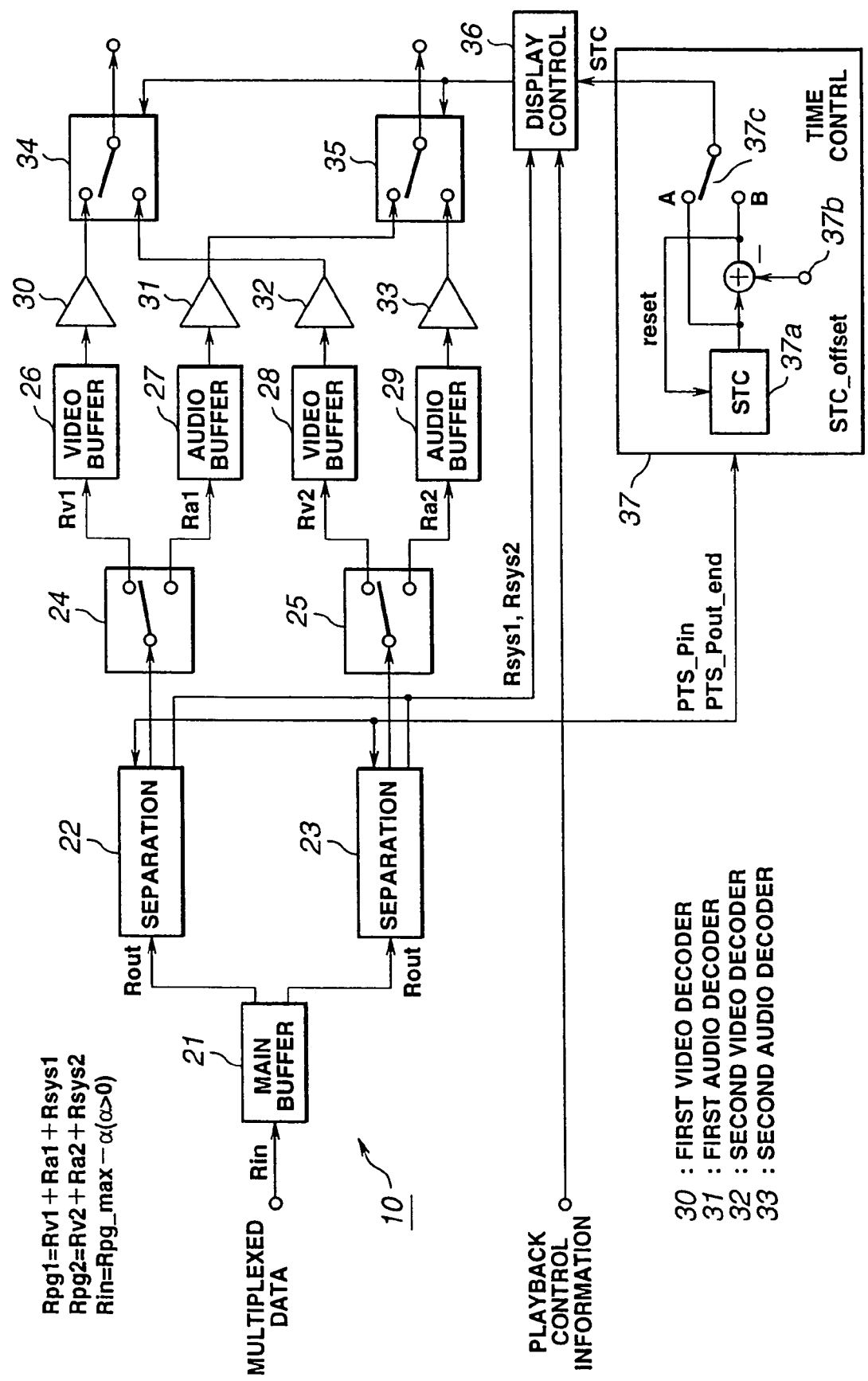
FIG. 11 is a block diagram of a decoding device of a recording/reproducing apparatus according to the first embodiment of the present invention.

Referring to FIG. 11, the decoding device 10 includes a main buffer 21 for temporarily storing multiplexed data sent from a buffer 6 (FIG. 3), a first separation unit 22 for extracting a bitstream of the out-point side program from the main buffer 21 during skipping reproduction and a second separation unit 23 for extracting a bitstream of the in-point side program from the main buffer 21 during skipping reproduction. The decoding device 10 also includes a first switching unit 24 for time-divisionally switching between bitstreams of the AV program extracted by the first separation unit 22 for separation into a video bitstream and an audio bitstream, and a second switching unit 25 for time-divisionally switching between bitstreams of the AV program extracted by the second separation unit 23 for separation into a video bitstream and an audio bitstream.

The decoding device 10 also includes a first video buffer 26 for storage of a video bitstream, separated by the first switching unit 24, a first audio buffer 27 for storage of an audio bitstream, separated by the first switching unit 24, and a second audio buffer 29 for storage of an audio bitstream, separated by the second switching unit 25. The decoding device 10 also includes a second audio buffer 29 for storing an audio bitstream separated by the second switching unit 25, a first video decoding unit 30 for extracting and decoding an audio bitstream stored in the first video buffer 26 and a first audio decoding unit 31 for extracting and decoding an audio bitstream stored in the first audio buffer 27. The decoding device 10 also includes a second video decoding unit 32 for extracting and decoding a video bitstream stored in the second video buffer 28 and a second audio decoding unit 33 for extracting and decoding an audio bitstream stored in the second audio buffer 29.

The decoding device 10 also includes a picture switching outputting unit 34 for switching between video data decoded by the first video decoding unit 30 and by the second video decoding unit 32 for outputting the selected decoded video data to an external equipment and a speech switching outputting unit 35 for switching between audio data decoded by the first audio decoding unit 31 and by the second audio decoding unit 33 for outputting the selected decoded video data to an external equipment. The decoding device 10 finally includes a display controller 36 for controlling the picture switching outputting unit 34 and the speech switching outputting unit 35 for controlling the output timing of the video and audio data and a timing controller 37 for generating system time clocks (STC) as reference synchronization signals for the device 10.

The main buffer 21 is fed with a bitstream of video data and audio data multiplexed on the package basis from the buffer 6 (FIG. 3) at a bitrate Rin. This bitstream is data encoded for compression in accordance with the MPEG 2 system. The main buffer 21 stores a bitstream which is the multiplexed version of these video and audio data. This bitstream is transiently stored and subsequently extracted to the first separation unit 22 or the second separation unit 23 at a predetermined timing. The writing in the main buffer 21 is discontinued when it is written to its full capacity.

During normal reproduction, other than skipping reproduction, video data and audio data of an AV program are stored in the main buffer 21. During skipping reproduction, two AV programs, that is the out-point side program and the in-point side program, are read out from the optical disc 2 so as to be stored in the main buffer 21.

The first separation unit 22 and the second separation unit 23 extract bitstreams of the multiplexed video and audio data from the main buffer 21 at a bitrate Rout. During the normal reproduction, one of the first separation unit 22 and the second separation unit 23 is operating, with the other being at a standstill. During skipping reproduction, the first separation unit 22 extracts only video data and audio data of the out-point side program of the two AV programs stored in the main buffer 21, while the second separation unit 23 extracts only video data and audio data of the in-point side program of the two AV programs stored in the main buffer 21. The first separation unit 22 and the second separation unit 23 extract the video data and audio data during skipping reproduction based on the playback control information supplied from the playback controller 8 (FIG. 3). This extraction is performed on the basis of an index (P_last_index) of the past picture Plast of the playback control information of the out-point side program and an index (P_in_index) of the in-point picture Pin of the playback control information of the in-point side program. Of course, it is possible for the first separation unit 22 to extract the in-point side program and for the second separation unit 23 to extract the out-point side program to execute the subsequent operation, while it is also possible to interchange AV programs processed by the respective separation units for each skipping reproduction.

The first separation unit 22 sends the extracted out-point side program to the first switching unit 24, while the second separation unit 23 sends the extracted in-point side program to the second switching unit 25. The first separation unit 22 and the second separation unit 23 also extract system headers contained in the multiplexed data to send the extracted system header to the display controller 36.

The first switching unit 24 and the second switching unit 25 separate multiplexed bitstream of vide and audio data into a bitstream only of video data and another bitstream only of audio data. The bitstream of the out-point side program, separated by the first switching unit 24, is sent to the first video buffer 26. The audio bit stream of the out-point side program, separated by the first switching unit 24, is sent to the first audio buffer 27. The bitstream of the in-point side program, separated by the second switching unit 25, is sent to the second video buffer 28. The audio bit stream of the out-point side program, separated by the second switching unit 25, is sent to the second audio buffer 29.

The first video buffer 26 and the second video buffer 28 temporarily store the video bitstreams sent from the first switching unit 24 and the second switching unit 25, respectively. The video bitstream, stored in the first video buffer 26, is extracted to the first video decoding unit 30 every predetermined data volume at a preset timing. The video bitstream, stored in the second video buffer 28, is extracted to the second video decoding unit 32 every predetermined data volume at a preset timing.

The first audio buffer 27 and the second audio buffer 29 temporarily store audio bitstreams sent from the first switching unit 24 and the second switching unit 25, respectively. The audio bitstream, stored in the first audio buffer 27, is extracted to the first audio decoding unit 31 at a predetermined timing every preset data volume. The audio bitstream, stored in the first audio buffer 29, is extracted to the second audio decoding unit 33 at a predetermined timing every preset data volume.

The first video decoding unit 30 and the second video decoding unit 32 decode the video bitstream, encoded for compression in accordance with the MPEG 2 system, to generate digital picture data. The first video decoding unit 30 and the second video decoding unit 32 decode the respective pictures in accordance with the decoding time stamp (DTS) for decoding affixed to each picture. Picture data decoded by the first video decoding unit 30 and the second video decoding unit 32 are sent to the picture switching outputting unit 34.

The first audio decoding unit 31 and the second audio decoding unit 33 decode the audio bitstream, encoded for compression in accordance with MPEG 2 system, to generate digital speech data. The digital speech data, decoded by the first and second audio decoding units 31, 33, are sent to the speech switching outputting unit 35.

The picture switching outputting unit 34 selects one of the picture data decoded by the first video decoding unit 30 or the picture data decoded by the second video decoding unit 32, in order to output the selected picture data to an external equipment. This picture switching outputting unit 34 outputs each picture when the STC outputted by the timing controller 37 coincides with the time management information, that is presentation time stamp (PTS) of the playback output, affixed to each picture. Also, the picture switching outputting unit 34 sets its switch from the side of the first video decoding unit 30 to the side of the second video decoding unit 32 during skipping reproduction at a display changeover timing between the out-point picture of the out-point side program and the in-point picture of the in-point side program. If the first video decoding unit 30 is decoding the video bitstream of the in-point side program and the second video decoding unit 32 is decoding the video bitstream of the out-point side program, the picture switching outputting unit 34 of course sets its switch from the side of the second video decoding unit 32 to the side of the first video decoding unit 30.

The speech switching outputting unit 35 selects one of the speech data decoded by the first audio decoding unit 31 and the speech data decoded by the second audio decoding unit 33 to output the selected speech data to the external equipment. This speech switching outputting unit 35 outputs speech data in synchronism with the picture data outputted by the picture switching outputting unit 34. During skipping reproduction, this speech switching outputting unit 35 sets its switch from the side of the first audio decoding unit 31 to the side of the second audio decoding unit 33 at a display switching timing between the out-point picture of the out-point side program and the in-point picture of the in-point side program. Similarly to the picture switching outputting unit 34, the speech switching outputting unit 35 sets its switch from the side of the second audio decoding unit 33 to the side of the first audio decoding unit 31 if the first audio decoding unit 31 and the second audio decoding unit 33 are decoding the audio bitstream of the in-point side program and the audio bitstream of the out-point side program, respectively.

The display controller 36 controls the output timing of the picture and speech data of the picture switching outputting unit 34 and the speech switching outputting unit 35 based on the playback control information sent from the playback controller 8 (FIG. 3) and from the timing controller 37. The display controller 36 also controls the switching of the picture switching outputting unit 34 and the speech switching outputting unit 35 based on this playback control information and the STC.

The timing controller 37 generates the STC as the reference synchronization signals of the decoding device 10. The timing controller 37 sends this STC to the first video decoding unit 30, second video decoding unit 32, first audio decoding unit 31 and to the second audio decoding unit 33. Each decoding unit decodes the video and audio data at a timing derived from the STC. The timing controller 37 furnishes this STC to the display controller 36, which then controls the picture switching outputting unit 34 and the speech switching outputting unit 35 at a timing derived from STC to output picture and audio data to change over the switch state.

This timing controller 37 also switches the STC, based on PTS_Pin and PTS_Pout_end of the playback control information, at the time of switching from the out-point side program to the in-point side program during skipping reproduction.

Specifically, this timing controller 37 switches the STC as follows:

The timing controller 37 can be realized by a hardware structure comprised of an STC generator 37a, generating the STC, a subtractor 37b for subtracting a preset offset (STC_offset) from the STC generated by the STC generator 37a and a switch 37c, as shown in FIG. 11. To a terminal A and a terminal B of the switch 37c, the STC generated by the STC generator 37a is directly entered and the STC from which is subtracted an offset value by the subtractor 37b, are entered, respectively. The input STC is outputted on switching between these terminals A and B. The STC generator 37a generates the STC set on a system clock reference (SCR) of the out-point side program. The SCR is the system time reference value or standard value. At this time, the switch 37c has been set to the side of the terminal A and directly outputs the STC as set on the SCR of the out-point side program. When next the STC is PTS_Pout_end of the out-point side program, the switch 37c is set to the side of the terminal B to output the STC less a preset offset value (STC_offset). This offset value (STC_offset) is the PTS_Pout_end of the playback control information of the out-point side program less PTS_Pin of the playback control information of the in-point side program. The STC generated at the same time as the switch 37c is switched to its terminal B is reset to an output value of the subtractor 37b. When the output value of the STC generator 37a is reset, the switch 37c is set to the side of the terminal A to output an STC reset to the value of the SCR of the out-point side program.

By switching the STC as described above at the time of skipping reproduction, it is possible for the timing controller 37 to realize the seamless skipping reproduction.

The bitrate of the bitstream supplied to the main buffer 21 and the bitrate of the bitstream read out from the main buffer 21 are assumed to be Rin and Rout, respectively. The bitrate of the video bitstream sent out from the first separation unit 22, the bitrate of the system header sent out from the first separation unit 22 and the bitrate of the system header sent out from the first separation unit 22 are assumed to be Rv1, Ra1 and Rsys1, respectively. Also, the bitrate of the bitstream sent from the second separation unit 23, the bitrate of the audio bitstream sent from the second separation unit 23 and the bitrate of the system header sent form the second separation unit 23 are assumed to be Rv2, Ra2 and Rsys2, respectively. The sum of Rv1, Ra1 and Rsys1 and the sum of Rv2, Ra2 and Rsys2 are assumed to be a first program bitrate Rpg1 and a second program bitrate Rpg2, respectively. The maximum value of Rpg1 and Rpg2 is assumed to be the maximum program bitrate Rpg_max.

If the respective bitrates are defined as described above, the bitrate Rin of the bitstream sent to the main buffer 21 and the maximum program bitrate Rpg_max are related to each other by the following equation:

$$Rin = Rpg\_max + \alpha \quad (A>0) \qquad (1).$$

The processing during skipping reproduction of the decoding device 10 is explained with reference to the flowchart shown in FIGS. 12 to 14.

Figure 12:
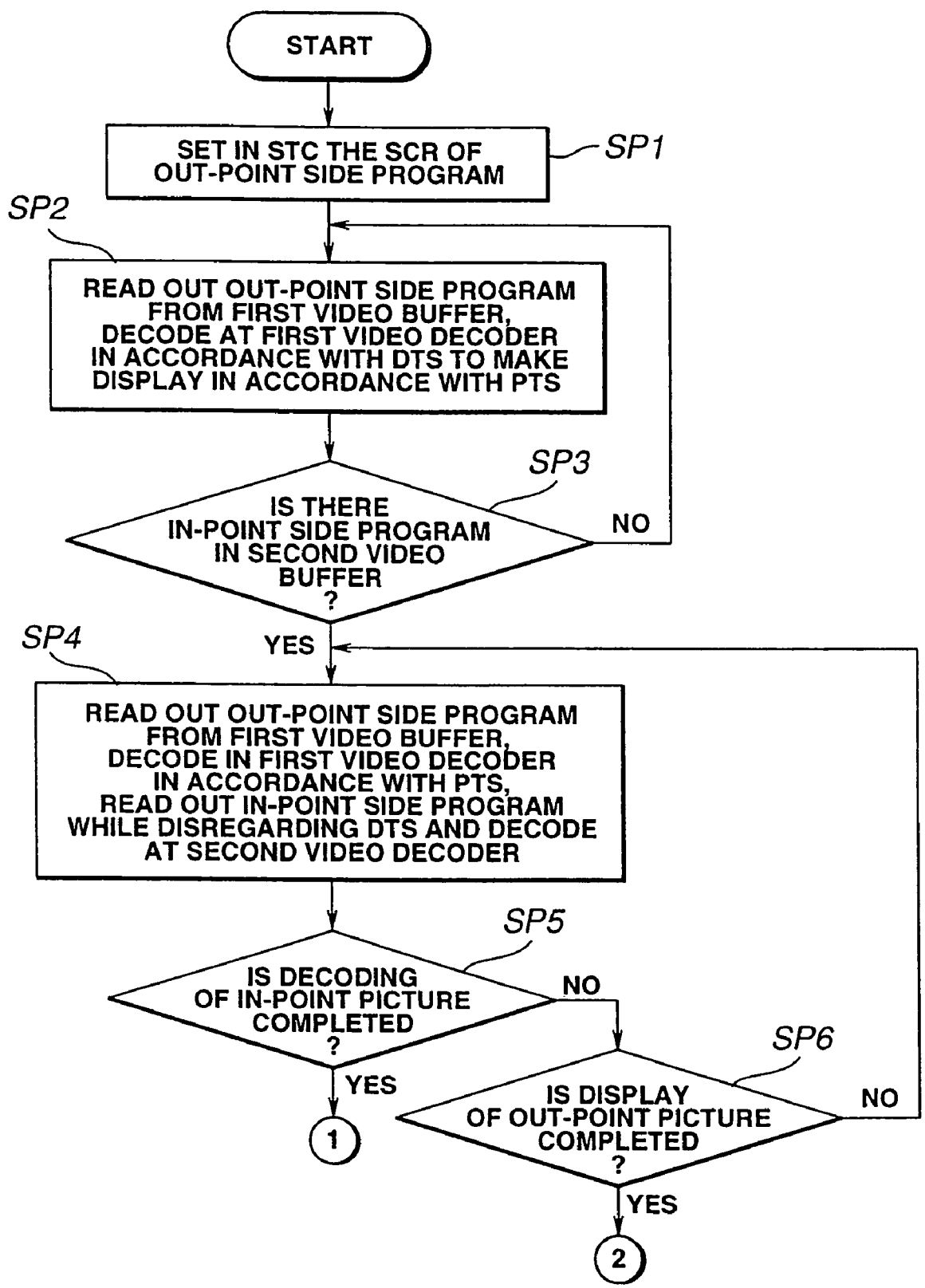
FIG. 12 is a flowchart showing decoding and outputting processing of a decoding device of an optical disc recording and/or reproducing apparatus according to the first embodiment of the present invention.

On starting the skipping reproduction, the timing controller 37 sets the system time clock (STC) to the system time reference (STR) of the out-point side program at step SP1 in FIG. 12.

At the next step SP2, the first video decoding unit 30 reads out a picture of the out-point side program from the first video buffer 26 to decode each picture of the out-point side program in accordance with the decoding time stamp (DTS). The display controller 36 controls the picture switching outputting unit 34 to display the decoded pictures in accordance with the presentation time stamp (PTS) of the pictures in question.

At the next step SP3, it is checked whether or not the in-point side program has been stored in the second video buffer 28. If the negative result is obtained at this step SP3, that is if the in-point side program is not stored in the second video buffer 28, processing reverts to step ST2 to repeat the processing of steps SP2 and SP3. If an affirmative result is obtained at this step SP3, that is if the in-point side program has been stored in the second video buffer 28, processing transfers to step SP4.

At this step SP4, the first video decoding unit 30 reads out the pictures of the out-point side program from the first video buffer 26 to decode the pictures of the out-point side program in accordance with the decoding time stamp (DTS). The display controller 36 controls the picture switching outputting unit 34 to display the decoded picture in accordance with the presentation time stamp (PTS) of the picture in question. Simultaneously, the second video decoding unit 32 reads out the picture of the in-point side program from the second video buffer 28 to decode the pictures of the in-point side program in negligence of the DTS.

At the next step SP5, it is checked whether or not the decoding of the in-point picture of the in-point side program by the second video decoding unit 32 has come to a close. If the negative result is obtained at step SP5, that is if the decoding of the in-point picture by the second video decoding unit 32 has not come to a close, processing transfers to step SP6. If the affirmative result is obtained at step SP5, that is if the decoding of the in-point picture by the second video decoding unit 32 has come to a close, processing transfers to step SP10 shown in FIG. 13.

At step SP6, the value of STC and PTS_Pout_end shown in the playback control information of the out-point side program are compared to each other to check whether or not the display of the out-point picture of the out-point side program has come to a close. If, at this step SP6, STC is not coincident with PTS_Pout_end to give a negative result, that is if display of the out-point picture has not come to a close, processing reverts to step SP4 to repeat the processing of steps SP4 to SP6. If the affirmative result is obtained at this step SP6, that is if display of the out-point picture has come to a close, processing transfers to step SP20 shown in FIG. 14.

The fact that the affirmative result has been obtained at this step SP5 means that decoding of the in-point picture of the in-point side program has come to a close before display of the pictures of the out-point side program has come to a close in its entirety, that is that seamless skipping reproduction is possible from the out-point side program to the in-point side program.

Conversely, the fact that the affirmative result has been obtained at the above step SP5 is that display of the out-point picture of the out-point side program has come to a close before completion of the decoding of the in-point picture of the in-point side program comes to a close, that is that decoding of the in-point picture Pin has not come to a close even although the display of the out-point picture Pout has already come to a close, that is that seamless skipping reproduction cannot be made from the out-point side program to the in-point side program.

The processing during skipping reproduction by the decoding device 10 is hereinafter separately explained for a case in which skipping reproduction is possible and for a case in which skipping reproduction is not possible.

First, the processing for the case in which skipping reproduction is possible is explained.

Figure 13:
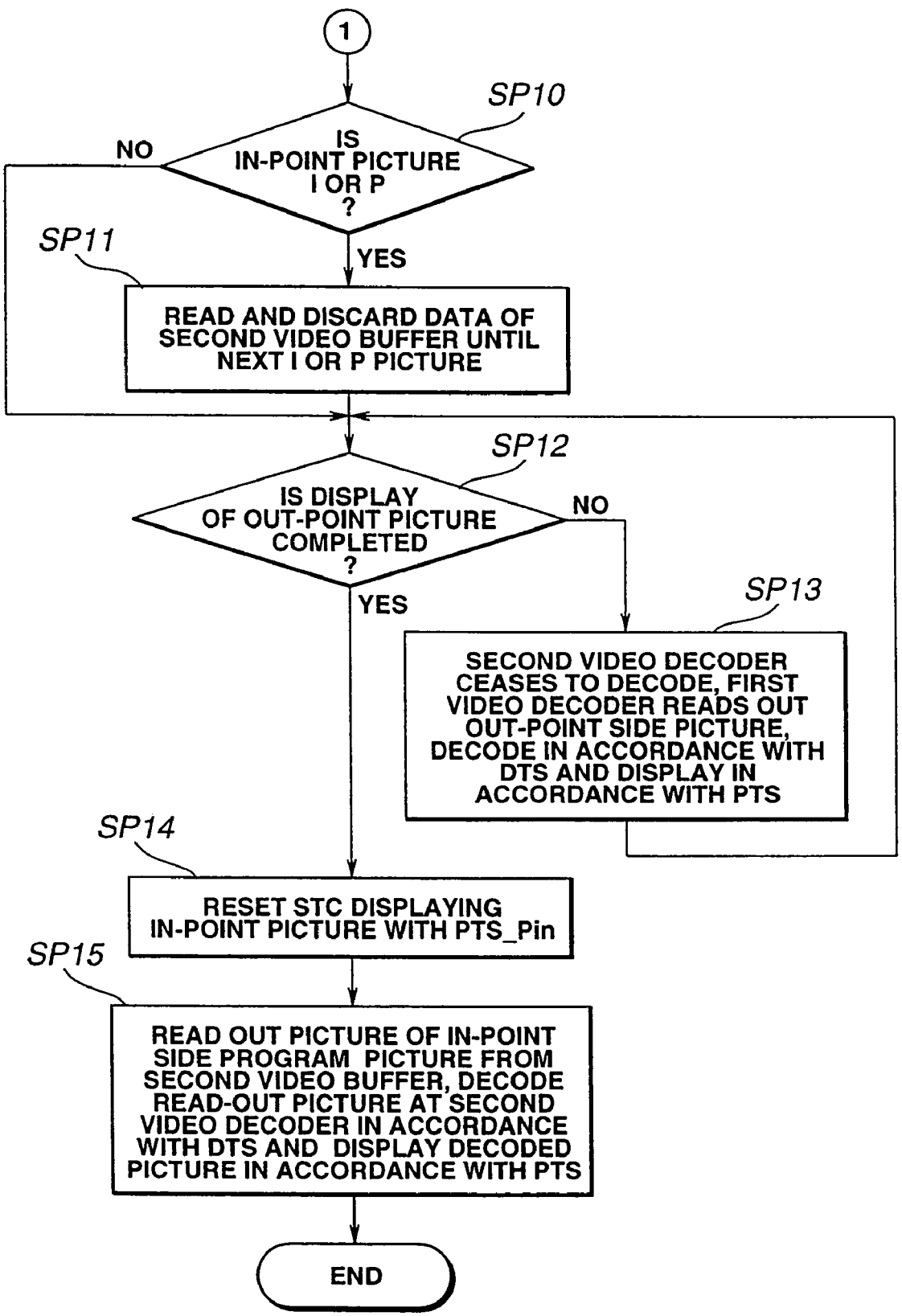
FIG. 13 is a flowchart, consecutive to FIG. 12, for decoding and outputting processing of a decoding device of an optical disc recording and/or reproducing apparatus according to the first embodiment for a case in which seamless reproduction is possible.

At step SP10 shown in FIG. 13, it is checked whether the picture type of the in-point picture is an I-picture or a P-picture, based on P_in_type shown in the playback control information. If the result of check at this step SP10 is negative, that is if the in-point picture is a B-picture, processing transfers to step SP12. If the result of check at this step SP10 is affirmative, that is if the in-point picture is an I- or P-picture, processing transfers to step SP11.

At step SP11, the second video decoding unit 32 reads out and discards the B-pictures stored in the second video buffer 28 from the in-point picture up to the next I- or P-picture. Then, processing transfers from step SP11 to step SP12.

At step SP12, the value of STC is compared to PTS_Pout_end indicated in the playback control information of the out-point side program in order to check whether or not the display of the out-point picture of the out-point side program has come to a close. If STC is not coincident at this step SP12 such that a negative result is produced, that is if the display of the out-point picture has not come to a close, processing transfers to step. SP13. If STC is coincident at this step SP12 such that an affirmative result is produced, that is if the display of the out-point picture has come to a close, processing transfers to step SP14.

At step SP13, the first video decoding unit 30 reads out the picture of the out-point side program from the first video buffer 26 to decode the pictures of the out-point side program in accordance with the decoding time stamp (DTS). The display controller 36 controls the picture switching outputting unit 34 to display the decoded picture in accordance with the presentation time stamp (PTS) of the picture in question. The operation of the second video decoding unit 32 decoding the in-point side program is halted. The processing reverts from this step SP13 to step SP12 to repeat the processing.

At step SP14, the timing controller 37 resets the value of the STC displaying the in-point picture to a value of PTS_in of the in-point side program simultaneously with the end of display of the out-point picture, that is when the STC is PTS_Pout_end.

At the next step SP15, the second video decoding unit 32 reads out the picture of the in-point side program from the second video buffer 28 to decode the picture in accordance with the decoding time stamp (DTS) of each picture. The display controller 36 controls the picture switching outputting unit 34 to display the decoded picture in accordance with the presentation time stamp (PTS) of the picture in question.

By the above processing, the decoding device 10 can perform skipping reproduction from the out-point side program to the in-point side program.

The processing in case skipping reproduction in skipping reproduction is not possible is hereinafter explained.

Figure 14:
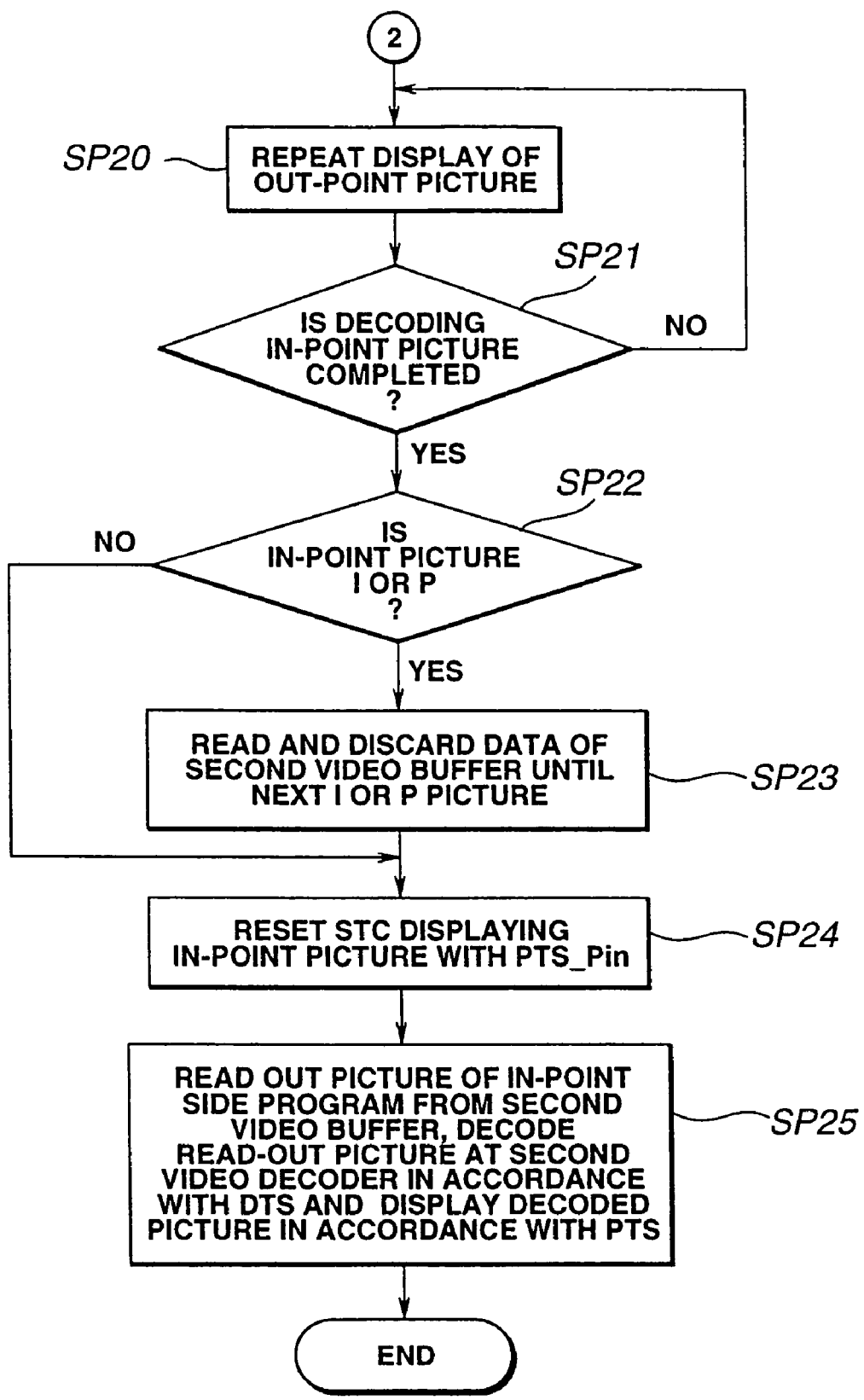
FIG. 14 is a flowchart, consecutive to FIG. 12, for decoding and outputting processing of a decoding device of an optical disc recording and/or reproducing apparatus according to the first embodiment for a case in which seamless reproduction is not possible.

At step SP20 shown in FIG. 14, the out-point picture is re-displayed.

At the next step SP21, it is checked whether or not decoding of the in-point picture has come to a close. If a negative result is obtained at this step SP21, that is if the decoding of the in-point picture has not come to a close, processing reverts to step SP20 to re-display the out-point picture Pout. If an affirmative result is obtained at this step SP21, that is if the decoding of the in-point picture has come to a close, processing reverts to step SP22. That is, the decoding device 10 causes the out-point picture to be repeatedly displayed until completion of decoding of the in-point picture to maintain continuity of the playback picture under a state in which skipping reproduction is not possible.

At step SP22, it is checked whether or not the picture type of the in-point picture is an I- or P-picture based on P_in_type shown in the playback control information. If a negative result is obtained at this step SP22, that is if the in-point picture is the B-picture, processing transfers to step SP24. If an affirmative result is obtained at this step SP22, that is if the in-point picture is the I- or P-picture, processing transfers to step SP23.

At step SP23, the second video decoding unit 32 reads and discards the B-picture stored in the second video buffer 28 from the in-point picture up to the next I- or P-picture. Then, processing transfers from step SP23 to step SP24.

At step SP24, the timing controller 37 resets the value of the STC representing the in-point picture to a value of the PTS_in of the in-point side program.

At the next step SP25, the second video decoding unit 32 reads out pictures of the in-point side program from the second video buffer 28 to decode the pictures of the in-point side program in accordance with the decoding time stamp (DTS). The display controller 36 controls the picture switching outputting unit 34 to display the decoded picture in accordance with the presentation time stamp (PTS) for the picture in question.

By the above processing, the decoding device 10 can perform skipping reproduction from the out-point side program to the in-point side program.

Thus, the decoding device 10 can decide, during skipping reproduction, whether or not seamless reproduction can be upheld and, if skipping reproduction can be upheld, the decoding device 10 can switch STC to display the picture without any extraneous feeling. If skipping reproduction is not possible, it is possible to prohibit interruption in display.

The decoding and display timing in the decoding device 10 is hereinafter explained taking an instance in which the out-point side program is reproduced up to $B_{o7}$ as shown in FIG. 15A and reproduction is then skipped to reproduce the in-point side program as from its $B_{n5}$.

The first video decoding unit 30 sequentially decodes the out-point side program as from time point $t_{-9}$ to terminate decoding of $B_{o7}$ (last picture Plast) at time point $t_{-1}$ to complete the decoding of the out-point side program, as shown in FIG. 15B. The second video decoding unit 32 sequentially decodes the in-point side program as from time point $t_{-6}$ to complete decoding up to $B_{n4}$ at time point $t_0$, as shown in FIG. 15D. As for the pictures from $I_{n2}$ to $B_{n4}$, only I- and P-pictures are decoded, it being unnecessary to decode the B-picture. The reason is that pictures from $I_{n2}$ to $B_{n4}$ are not displayed, while only I- and P-pictures during this interval are required for decoding $P_{n5}$ (in-point picture).

The decoding device 10 displays the decoded out-point side program until time $t_0$ in its PTS. At a time point $t_0$ when the display of the out-point picture Pout comes to a close, the STC is reset to the value of PTS_Pin, whilst the decoded in-point side program is sequentially displayed in accordance with the PTS of the respective pictures, as shown in FIG. 15E.

By this decoding and display, the decoding device 10 can continuously display the out-point picture and the in-point picture as shown in FIG. 15F to effect seamless reproduction of the out-point side program and the in-point side program.

Referring to FIG. 16, transition in the bit occupying volumes of the main buffer 21, first video buffer 26 and the second video buffer 28 is explained.

FIG. 16A shows the bit occupying volume of the multiplexed data in the main buffer 21. The bit occupying volume ranges from MB_size as the capacity of the main buffer 21 to 0. FIG. 16B shows the bit occupying volume of the video bitstream of the out-point side program in the first video buffer 26. This bit occupying volume ranges from VB1_size as the capacity of the first video buffer 26 to 0. Similarly, FIG. 16C shows the bit occupying volume of the video bitstream of the in-point side program in the second video buffer 28. This bit occupying volume ranges from VB2_size as the capacity of the second video buffer 28 to 0.

The term T1 shows the state of the first video decoding unit 30 decoding the out-point side program. At this time, the output bitrate of the main buffer 21 is increased at a rate of Rin−Rpg1 until the main buffer 21 is charged to its capacity. For Rpg1=Rpg_max, the increasing rate is minimum. In such case, the increasing rate of the bit occupying volume is shown by the following equation (2):

$$Rin - Rpg\_max = (Rpg\_max + \alpha) - Rpg\_max = \alpha \quad (2).$$

The term T2 is the state the main buffer 21 is charged to its capacity and, similarly to the term T1, denotes the state the first video decoding unit 30 is decoding the out-point side program. The output bitrate of the main buffer 21 is Rpg1.

The term T3 is a state the first video decoding unit 30 is decoding the out-point side program and the second video decoding unit 32 is decoding the in-point side program. At this time, the output bitrate from the main buffer 21 is Rpg1+Rpg2, with the bit occupying volume of the multiplexed data in the main buffer 21 decreasing at a rate of Rpg1−Rpg2−Rin. The decreasing rate is maximum for Rpg1=Rpg2=Rpg_max. The decreasing rate of the bit occupying volume at this time is indicated by the equation (3):

$$Rpg1 + Rpg2 - Rin = 2X\,Rpg\_max - (Rpg\_max + \alpha) \quad (3)$$

$$= Rpg\_max - \alpha.$$

Skipping reproduction is performed across the terms T3 and T4.

The term T4 denotes the state the second video decoding unit 32 is decoding the in-point side program. At this time, the output bitrate from the main buffer 21 is Rpg2, with the bit occupying volume of multiplexed data in the main buffer 21 increasing at a rate of Rin−Rpg2 until the main buffer 21 is charged to its full capacity. The increasing rate is minimum for Rpg=Rpg_max, in which case the bit increasing rate is indicated by the equation (4):

$$Rin - Rpg\_max = (Rpg\_max + \alpha) - Rpg\_max = \alpha \quad (4).$$

The term T5 denotes the state the main buffer 21 is charged to its full capacity and, similarly to the term T4, is the state the second video decoding unit 32 is decoding the in-point side program. The output bitrate from the main buffer 21 is Rpg2.

The transition of the bit occupying volume as indicated for terms T1 to T3 is repeated every skipping reproduction.

The time lengths of the terms T1 and T3 are explained.

The time length of the term T1 denotes the time which elapses since start of supply of the in-point side program to the second video buffer 28 until completion of decoding of the in-point picture Pin in a state in which the first video decoding unit 30 and the second video decoding unit 32 are decoding the out-point side program and the in-point side program simultaneously. If the number of pictures to be decoded from the leading picture Pfirst to the in-point picture Pin is Ndec, the time length of the term T3 is given by the following equation (5):

$$T3 = \sum_{i=0}^{Ndec} (2 + rff[i])/(2 \times frame\_rate) + decode\_start\_up\_delay. \quad (5)$$

If GOP length is N and the interval of the P-pictures is M, the maximum value of the number of pictures Ndec to be decoded from the leading picture Pfirst to the in-point picture Pin is given by the following equation (6):

$$Ndec = N + M - 1 \quad (6).$$

From the above equations (5) and (6), the maximum value T3_max of the term T3 is given by the following equation (7):

$$T3\_max = \sum_{i=0}^{N+M-1} (2 + rff[i])/(2 \times frame\_rate) + decode\_start\_up\_delay. \quad (7)$$

It is noted that decode_start_up_delay=1.75 mbit/Rpg_max. If the i'th picture is a B-picture, rff[i] is a value of repeat_first_field of the picture, whereas, if the i"th picture is an I- or P-picture, rff[i] is a value of repeat_first_field of the previous I- or P-picture.

During the T3 period, two programs, namely the out-point side program and the in-point side program, are outputted from the main buffer 21 at a rate of 2*Rpg_max at the maximum. The main buffer 21 is required to have the capacity of supplying the two programs, namely the out-point side program and the in-point side program during the period of T3_max without underflowing. That is, the capacity MB_size of the main buffer 21 is given by the following equation (8):

$$MB\_size = T3\_maxX(2X\,Rpg\_max - Rin) \quad (8)$$

$$= T3\_maxX(Rpg\_max - \alpha).$$

The time length of the term T1 is the time which elapses since the bit occupying volume of the main buffer 21 is 0 until it is MB_size in the state the first video decoding unit 30 is decoding the out-point side program. The term T1 is given by the following equation (9):

$$T1 = MB\_size/((Rin - Rpg\_max) \quad (9)$$

$$= MB\_size/\alpha.$$

If skipping reproduction is repeated on end, there is the necessary minimum time since the in-point picture until the next out-point picture, thus imposing limitation on the positions of the in-point picture and the out-point picture. The reason is that, for skipping reproduction, the main buffer 21 needs to be charged to its full capacity. That is, the necessary minimum time for skipping reproduction from the in-point picture to the out-point picture is given by the following equation (10):

$$Lmin = T1 \quad (10).$$

For skipping reproduction, the user specifies the out-point picture and the in-point picture in advance. The optical disc recording/reproducing apparatus 1 performs skipping reproduction in accordance with the out-point picture and the in-point picture set in advance. That is, the operating input unit 11 generates the control information responsive to the out-point picture and the in-point picture specified by the user. The playback controller 8 is responsive to this control information to control the various parts to execute skipping reproduction.

When the user specifies the out-point picture and the in-point picture, the playback controller 8 checks in advance whether or not, if the skipping reproduction is executed with the out-point picture and the in-point picture as specified by the user, seamless reproduction is possible. The playback controller 8 then indicates the results of decision on the decision information display unit 17. The method for discriminating the possibility of seamless reproduction is hereinafter explained.

If the bitrate of the out-point side program is Rpg_out(t) and the bitrate of the in-point picture is Rpg_in(t), the bit occupying volume MB_bit in the main buffer 21 necessary for starting the decoding of the in-point side program is given by the equation (11):

$$MB\_bit = T3 \times (Rpg\_in(t) + Rpg\_out(t) - Rin) \quad (11).$$

The bit storage time L, which is the time (domain T1 in FIG. 16A) necessary for the bit occupying volume in the main buffer 21 to be stored from 0 to MB_bit, in case only the out-point side program is being decoded, is given by the equation (12):

$$L = MB\_bit / (Rin - Rpg\_out(t)) \quad (12).$$

If, in the out-point side program, shown in FIG. 4, the PTS of the out-point picture Pout is PTS_Pout, and PTS of the in-point picture previous_Pin is PTS_previous_Pin, the inter-skip time Lout_in, which is the time difference between the out-point picture Pout and the previous in-point picture previous_Pin, is given by the equation (13):

$$Lout\_in = (PTS\_Pout - PTS\_previous\_Pin) \times 90 \, KHz \quad (13).$$

Foe seamless reproduction during skipping reproduction, the inter-skip time Lout_in needs to be longer than the bit storage time L. That is, the following equation (14):

$$Lout\_in \geq L \quad (14)$$

needs to be met.

Conversely, if the inter-skip time Lout_in is less than the bit storage time L, the main buffer 21 is subjected to underflow during the domain T3 shown in FIG. 16A. Therefore, the decoding of the in-point picture Pin cannot be completed until the display end time PTS_Pout_end of the out-point picture Pout, so that seamless reproduction is not possible.

The controller 8 checks the possibility of seamless reproduction using the above equation (14) to display the result of check on the decision information display unit 17.

In the optical disc recording/reproducing apparatus according to the first embodiment of the present invention, as described above, the out-point side program and the in-point side program are decoded in parallel by the two decoding units. The out-point picture, display of which is terminated at PTS_Pout_end, and the in-point picture Pin, display of which is started at PTS_Pin, are continuously outputted, while the STC is reset from PTS_Pout_end to PTS_Pin at the changeover timing from the out-point picture to the in-point picture. This enables the present optical disc recording/reproducing apparatus 1 to effect seamless skipping reproduction as continuity is upheld before and after the switching point.

It is also possible with the present optical disc recording/reproducing apparatus to check whether or not skipping reproduction is possible as seamless reproduction.

Second Embodiment

An optical disc recording/reproducing apparatus according to a second embodiment of the present invention is hereinafter explained. In this second embodiment, only the structure of the decoding device has been modified from that of the decoding device 10 of the above-described first embodiment. That is, the present optical disc recording/reproducing apparatus is the same as the apparatus of the first embodiment except the structure of the decoding device 10. Therefore, only a decoding device associated with this decoding device 10 is explained in detail. The component parts which are the same as those of the decoding device 10 are depicted by the same reference numerals and are not explained specifically.

The decoding device of the optical disc recording/reproducing apparatus of the second embodiment of the present invention is explained in detail.

Figure 17:
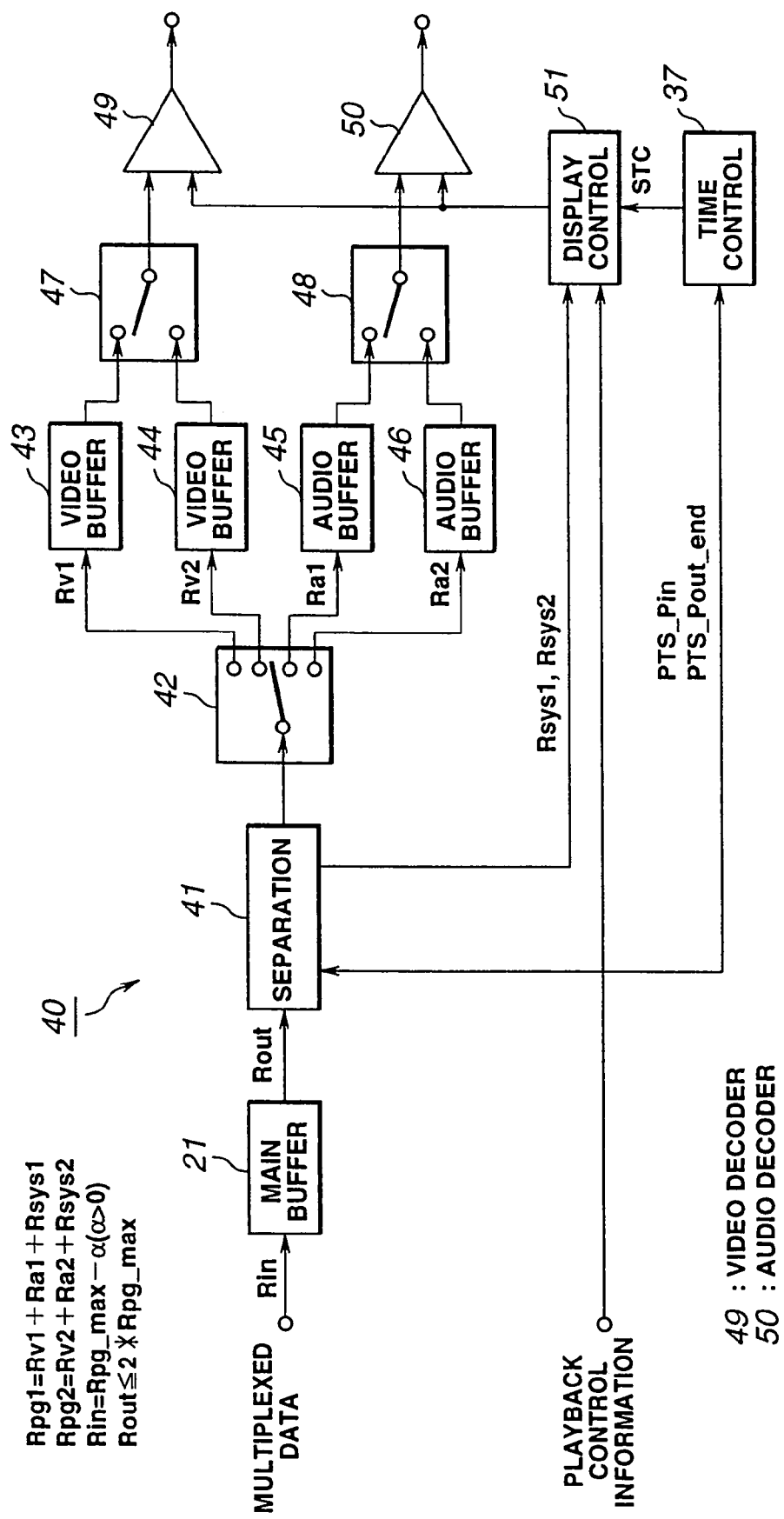
FIG. 17 is a block diagram of a decoding device of the optical disc recording/reproducing apparatus according to a second embodiment of the present invention.

FIG. 17 shows the block diagram of the decoding device used in the present optical disc recording/reproducing apparatus of the second embodiment. A decoding device 40, shown in FIG. 17, is used in place of the decoding device 10 of the optical disc recording/reproducing of the first embodiment shown in FIG. 3.

The decoding device 40 includes a main buffer 21 for transient storage of multiplexed data composed of video data and audio data supplied from the buffer 6 (FIG. 3), a separation unit 41 for extracting a bitstream stored in the main buffer 21 to separate the bitstream into a bitstream of the out-point side program and a bitstream of the in-point side program during skipping reproduction, and a switching unit 42 for time-divisionally switching between the bitstreams of the AV program extracted by the separation unit 41 for separation into the video bitstream and the audio bitstream.

The decoding device 40 also includes a first video buffer 43 for storing the video bitstream of the out-point side program during skipping reproduction, and a second video buffer 44 for storing the video bitstream of the in-point side program during skipping reproduction. The decoding device 40 also includes a first audio buffer 45 for storage of the audio bitstream of the out-point side program during skipping reproduction and a second audio buffer 46 for storage of the audio bitstream of the in-point side program during skipping reproduction. The decoding device 40 also includes a picture switching unit 47 for switching between the video bitstream stored in the first video buffer 43 and the video bitstream stored in the second video buffer 44, and a speech switching unit 48 for switching between the audio bitstream stored in the first audio buffer 45 and the audio bitstream stored in the second audio buffer 46.

The decoding device 40 also includes a video decoding unit 49 switched by the picture switching unit 47 for decoding the input video bitstream, and an audio decoding unit 50 switched by the speech switching unit 48 for decoding an input audio bitstream. The decoding device 40 finally includes a display controller 51 for controlling the output timing of the video and audio data and a time controller 37 for generating system time clocks (STC) as the reference synchronization signal of the device.

The main buffer 21 is fed with bitstreams of the video data and audio data multiplexed on the package basis from the buffer 6 (FIG. 3) at a bitrate Rin. This bitstream is transiently stored in the main buffer 21 so as to be then extracted to the separation unit 41 at a preset timing. The writing in the main buffer 21 is halted when it is charged to its full capacity.

During normal reproduction, there are stored in this main buffer 21 the video data and the audio data of a sole AV program. During skipping reproduction, the two AV programs, namely the out-point side program and the in-point side program, are read out from the optical disc 2 so as to be stored in the main buffer 21.

The separation unit 41 extracts the bitstreams of the multiplexed video and audio data at a bitrate Rout from the main buffer 21. The separation unit 41 extracts data of the out-point side program and data of the in-point side program, during skipping reproduction, as it separates the two data. At this time, the separation unit 41 extracts video and audio data at the time of skipping reproduction based on the playback control information supplied from the playback controller 8 (FIG. 3). For example, the video and audio data are extracted based on the index P_last_index of the last picture Plast of the playback control information of the out-point side program and the index P-in-index of the in-point picture Pin of the playback control information of the in-point side program. The separation unit 41 sends the extracted data to the switching unit 42. The separation unit 41 also extracts the system header contained in the multiplexed data of the in-point side program and the out-point side program to send the system header to the display controller 51.

The switching unit 42 time-divisionally separates bitstreams of the video and audio data multiplexed in each of the out-point side program and the in-point side program to provide a bitstream only of video data and a bitstream only of the audio data. The video bitstream of the out-point side program, separated by the switching unit 42, is sent to the first video buffer 43. The video bitstream of the in-point side program, separated by the switching unit 42, is sent to the second video buffer 44. The audio bitstream of the out-point side program, separated by the switching unit 42, is sent to the first audio buffer 45. The audio bitstream of the in-point side program, separated by the switching unit 42, is sent to the second audio buffer 46.

The first video buffer 43 and the second video buffer 44 temporarily store the video bitstreams supplied from the switching unit 42. The picture switching unit 47 switches between the video bitstream stored in the first video buffer 43 and the video bitstream stored in the second video buffer 44 to extract the selected video bitstream to the video decoding unit 49 at predetermined timing on the predetermined data volume basis.

The first audio buffer 45 and the second audio buffer 46 temporarily store the audio bitstream sent from the switching unit 42. The speech switching unit 48 switches between the audio bitstream stored in the first audio buffer 45 and the audio bitstream stored in the second audio buffer 46 to extract the selected audio bitstream to the audio decoding unit 50 at a timing synchronized with the video decoding timing.

The video decoding unit 49 decodes the video bitstream encoded for compression by the MPEG 2 system to generate digital picture data. This video decoding unit 49 is adapted to decode each picture at a speed higher than the video display speed. For example, the video decoding unit 49 has a decoding speed twice the minimum decoding speed necessary for real-time display of video data supplied in real-time. During normal reproduction, the video decoding unit 49 decodes each picture at a normal decoding speed in accordance with the time management information (decoding time stamp DTS) for decoding affixed to each picture. On the other hand, this video decoding unit 49 switches between the video data of the out-point side program stored in the first video buffer 43 and video data of the in-point side program stored in the second video buffer 44 during skipping reproduction to read out the so-selected video data. The video decoding unit 49 alternately decodes during skipping reproduction the out-point side program and the in-point side program on the predetermined data volume basis at a decoding speed twice the usual decoding speed in negligence of the DTS. The data volumes at which to switch between the out-point side program and the in-point side program may be of any suitable value. The video decoding unit 49 switches between the out-point side program and the in-point side program on the picture or macro-block basis. The digital picture data, decoded by this video decoding unit 49, is sent to outside under control by the display controller 51.

Figure 18:
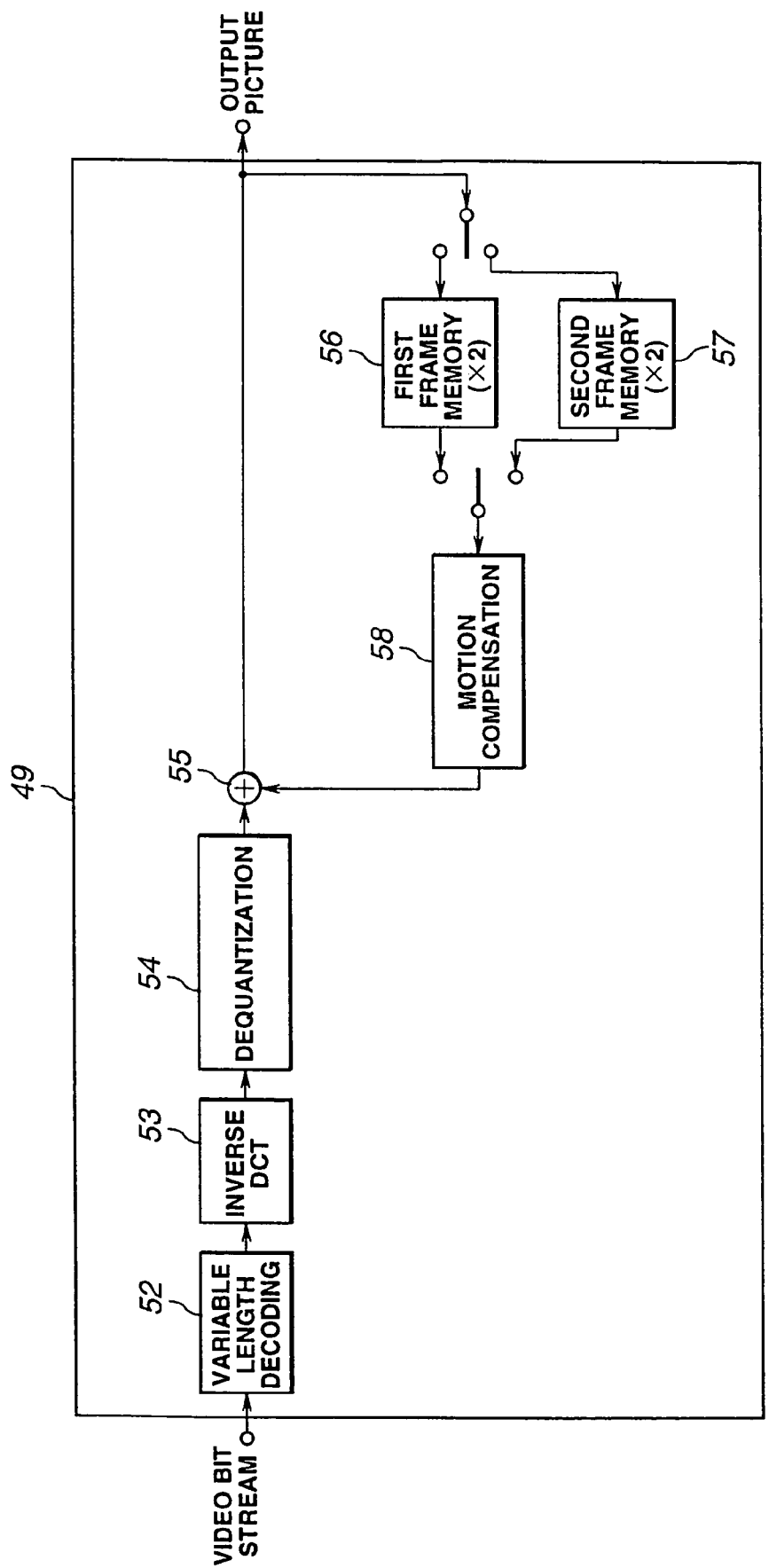
FIG. 18 is a block diagram of a video decoding portion of the decoding device of the optical disc recording/reproducing apparatus according to the second embodiment of the present invention.

FIG. 18 shows a block diagram of the video decoding unit 49.

The video decoding unit 49 includes a variable length decoding circuit 52 for variable-length decoding an input video bitstream, an inverse DCT (inverse discrete cosine transform) circuit 53 for IDCTing the variable length decoded video bitstream and a dequantization circuit 54 for dequantizing the IDCTed video bitstream. The video decoding unit 49 also includes an addition circuit 55 for adding an output picture of the dequantization circuit 54 and a motion-compensated reference picture to each other, a first frame memory 56 for transiently storing an output picture, a second frame memory 57 for transiently storing an output picture and a motion-compensation circuit 58 for motion-compensating pictures stored in the first and second frame memories 56, 57 for generating a reference picture.

The variable length decoding circuit 52, IDCT circuit 53, dequantization circuit 54 and the motion-compensation circuit 58 can perform processing at a speed twice the usual processing speed. Each of the first and second frame memories 56, 57 includes a frame memory for forward prediction and a frame memory for backward prediction. The first frame memory 56 stores each picture of the out-point side program, for example, during skipping reproduction. The second frame memory 57 stores each picture of the out-point side program, for example, during skipping reproduction. During operation, the variable length decoding circuit 52, IDCT circuit 53, dequantization circuit 54 and the motion-compensation circuit 58 time-divisionally switch between the out-point side program and the in-point side program. Depending on the timing, the motion-compensation circuit 58 switches between the first frame memory 56 and the second frame memory 57 for picture extraction and motion compensation.

The audio decoding unit 50 decodes an audio bitstream encoded for compression in accordance with MPEG 2 system to generate digital speech data. The digital speech data, decoded by the audio decoding unit 50, is sent to outside under control by the display controller 51.

The display controller 51 controls the output timing of picture data and audio data of the video decoding unit 49 and the audio decoding unit 50 based n the playback control information sent from the playback controller 8 and the STC sent from the timing controller 37.

Specifically, the display controller 51 outputs each picture decoded by the video decoding unit 49 when the STC generated by the timing controller 37 coincides with the time management information (presentation time stamp PTS) of the playback output affixed to each picture. During skipping reproduction, the display controller 51 switches the output picture from the out-point side program to the in-point side program at a display switching timing between the out-point picture of the out-point side program and the in-point picture of the in-point side program.

The display controller 51 also outputs speech data in synchronism with picture data outputted by the video decoding unit 49. During skipping reproduction, the display controller 51 switches output audio data from the out-point side program to the in-point side program at a display switching timing between an out-point picture of the out-point side program and the in-point picture of the in-point side program.

The bitrate of the bitstream supplied to the main buffer 21 and that of the bitstream read out from the main buffer 21 are assumed to be Rin and Rout, respectively. The bitrate of the video bitstream sent to the first video buffer 43 and that of the video bitstream sent to the second video buffer 44 are assumed to be Rv1 and Rv2, respectively. The bitrate of the audio bitstream sent to the first audio buffer 45 and that of the audio bitstream sent to the second audio buffer 46 are assumed to be Ra1 and Ra2, respectively. The bitrates of the system header sent from the separation unit 41 are assumed to be Rsys1 and Rsys2. The sum of Rv1, Ra1 and Rsys1 and the sum of Rv2, Ra2 and Rsys2 are assumed to be a first program bit rate Rpg1 and a second program bit rate Rpg2, respectively. The maximum value of Rpg1 and Rpg2 is assumed to be the maximum program bitrate Rpg_max.

If the respective bitrates are defined as above, the following relation:

$$Rin = Rpg\_max + \alpha \ (A \geq 0)$$

$$Rout \leq 2 \times Rpg\_max \quad (15)$$

holds between the bitrate Rin of the bitstream sent to the main buffer 21 and the maximum program bitrate Rpg_max.

The processing executed by the decoding device 40 during skipping reproduction is hereinafter explained with reference to a flowchart shown in FIGS. 19 to 21.

Figure 19:
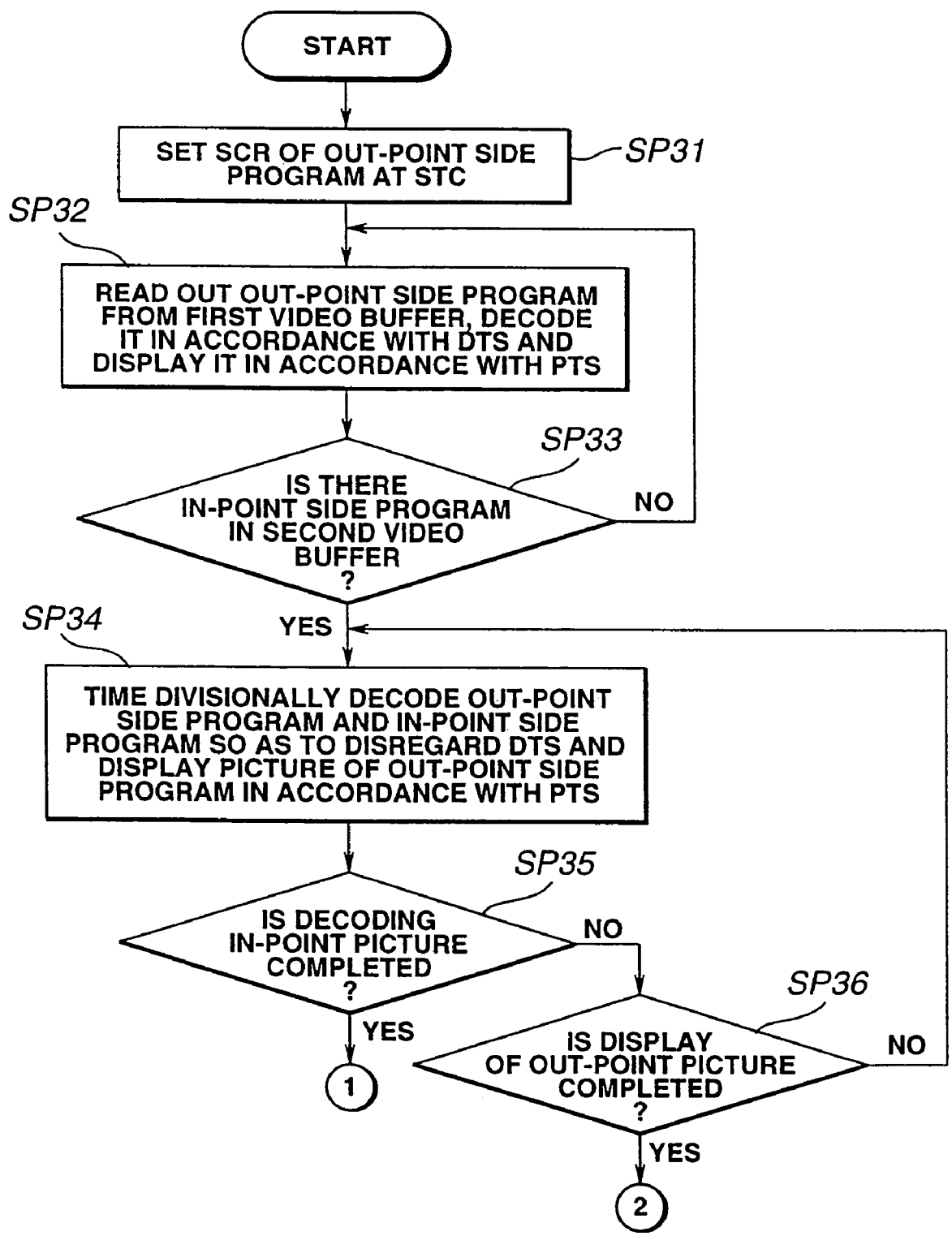
FIG. 19 is a flowchart showing decoding and outputting processing of the decoding device of the optical disc recording/reproducing apparatus according to the second embodiment of the present invention.

If skipping reproduction is started, the timing controller 37 sets the system time clock STC to the system clock reference (SCR) of the out-point side program at step SP31 in FIG. 19.

At the next step SP32, the video decoding unit 49 reads out pictures of the out-point side program from the first video buffer 43 to decode the pictures of the out-point side program in accordance with the decoding time stamp (DTS). The display controller 51 controls the video decoding unit 49 to display the decoded pictures in accordance with the presentation time stamp PTS of the pictures in question. At this time, the video decoding unit 49 performs the decoding at a speed equal to the picture display speed.

At the next step SP33, it is checked whether or not the in-point side program has been stored in the second video buffer 44. If the result of check of this step SP33 is negative, that is if the in-point side program has not been stored in the second video buffer 44, processing transfers to step SP32 to repeat the processing of the steps SP32 to SP33. If the result of check of this step SP33 is affirmative, that is if the in-point side program has been stored in the second video buffer 44, processing transfers to step SP34.

At step SP34, the video decoding unit 49 reads out pictures of the out-point side program from the first video buffer 43, while reading out pictures of the in-point side program from the second video buffer 44, in order to decode the pictures of the out-point side program and the in-point side program in negligence of the decoding time stamp (DTS). At this time, the video decoding unit 49 performs decoding at a double speed, that is at a speed twice the picture display speed, while alternately decoding the out-point side program and the in-point side program on the predetermined data volume basis. The data decoding volume basis for alternate decoding may be arbitrary, such that decoding may be made on switching between the out-point side program and the in-point side program on the macro-block basis or on the picture basis. The display controller 51 controls the video decoding unit 49 to display the decoded out-point side program in accordance with the presentation time stamp PTS of the pictures in question.

At the next step SP35, it is checked whether or not decoding of the of the in-point picture of the in-point side program has come to a close. If the result of check of step SP35 is negative, that is if decoding of the in-point picture by the video decoding unit 49 has not come to a close, processing transfers to step SP36. If the result of check of step SP35 is affirmative, that is if decoding of the in-point picture by the video decoding unit 49 has come to a close, processing transfers to step SP40.

At step SP36, the value of STC is compared to PTS_Pout_end indicated in the out-point side program to check whether or not display of the out-point pictures of the out-point side program has come to a close. If STC is not coincident with PTS_Pout_end, such that the result of check of step SP36 is negative, that is if display of the out-point pictures has not come to a close, processing reverts to step SP34 to repeat the processing of steps SP34 to 36. If the result of check of step SP36 is affirmative, that is if the display of the out-point side program has come to a close, processing transfers to step SP50 shown in FIG. 21.

The fact that an affirmative result has been obtained at step SP35 means that decoding of the in-point picture of the in-point side program has come to a close before display of the pictures of the out-point side program has come to a close in its entirety, that is that seamless skipping reproduction from the out-point side program to the in-point side program is possible.

Conversely, the fact that an affirmative result has been obtained at step SP36 means that decoding of the out-point pictures of the out-point side program has come to a close before completion of the in-point picture of the in-point side program, that is that decoding of the in-point picture Pin has not come to a close even although the display of the out-point pictures Pout has come to a close, in other words, that seamless skipping reproduction from the out-point side program to the in-point side program is not possible.

The processing during skipping reproduction of the decoding device 40 is hereinafter explained separately for a case in which skipping reproduction is possible and for a case in which skipping reproduction is not possible.

First, the processing in which skipping reproduction is possible is explained.

Figure 20:
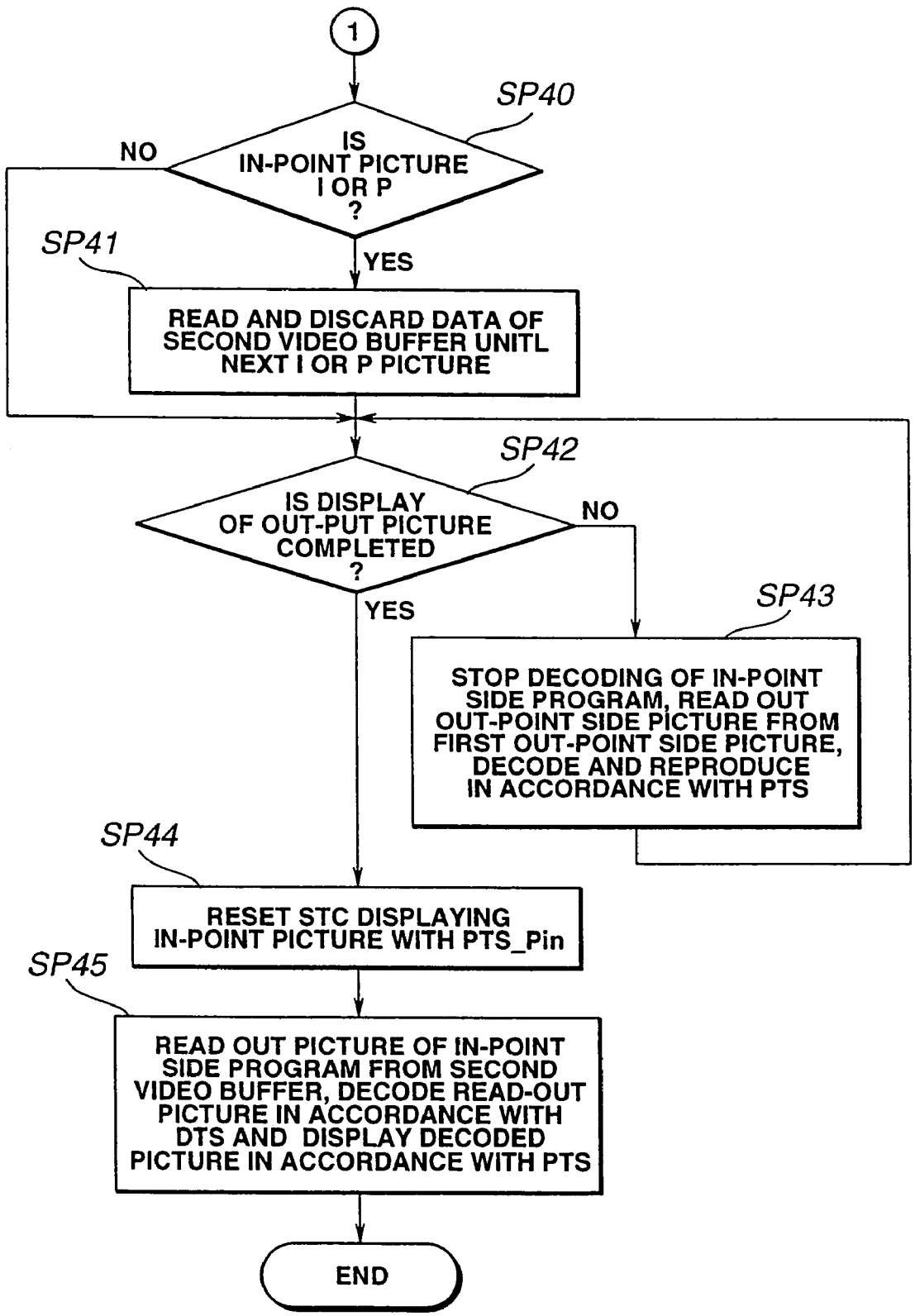
FIG. 20 is a flowchart consecutive to FIG. 19 for illustrating the decoding and outputting processing of the decoding device of the decoding device of the optical disc recording/reproducing apparatus according to the second embodiment of the present invention in case seamless reproduction is possible.

At step S40 in FIG. 20, it is checked whether or not the picture of an in-point picture is an I-picture or a P-picture. This check can be made on the basis of P_in_type indicated in the playback control information. If the result of check at this step SP40 is negative, that is, if the in-point picture is a B-picture, processing transfers to step SP42. If the result of check at this step SP40 is affirmative, that is, if the in-point picture is an I-picture or a P-picture, processing transfers to step SP41.

At step SP41, the video decoding unit 32 reads out and discards B-pictures from the in-point picture to the next I- or P-picture stored in the second video buffer 44. After this step SP41, processing transfers to step SP42.

At step SP42, the value of the STC is compared to PTS_Pout_end indicated in the playback control information of the out-point side program to check whether or not display of the out-point pictures of the out-point side program has come to a close. If, at this step SP42, STC is not coincident with PTS_Pout_end, such that a negative result is obtained, that is if the display of the out-point pictures has not come to a close, processing transfers to step SP43. If, at this step SP42, STC is coincident with PTS_Pout_end, such that an affirmative result is obtained, that is if the display of the out-point pictures has come to a close, processing transfers to step SP44.

At step SP43, the video decoding unit 49 reads out pictures of the out-point side program from the first video buffer 43 to decode the pictures of the out-point side program in accordance with the decoding time stamp DTS. Simultaneously, the display controller 51 controls the video decoding unit 49 to display the decoded pictures in accordance with the presentation time stamp PTS of the pictures in question. After this step SP43, processing reverts to step SP42 to repeat the processing.

At step SP44, at the same time as display of the out-point pictures is terminated, that is when the STC is equal to PTS_Pout_end, the timing controller 37 resets the value of the STC displaying the in-point picture to a value of PTS_in of the in-point side program.

At the next step SP45, the video decoding unit 49 reads out pictures of the in-point side program from the second video buffer 44 to decode the pictures in accordance with the decoding time stamp DTS of each picture. The display controller 51 controls the video decoding unit 49 to display the decoded pictures in accordance with the presentation time stamp PTS of the pictures in question. The decoding operation at this time is executed at the normal decoding speed.

By the above processing, the decoding device 40 can perform skipping reproduction from the out-point side program to the in-point side program.

The processing in case seamless reproduction in skipping reproduction is not possible is now explained.

Figure 21:
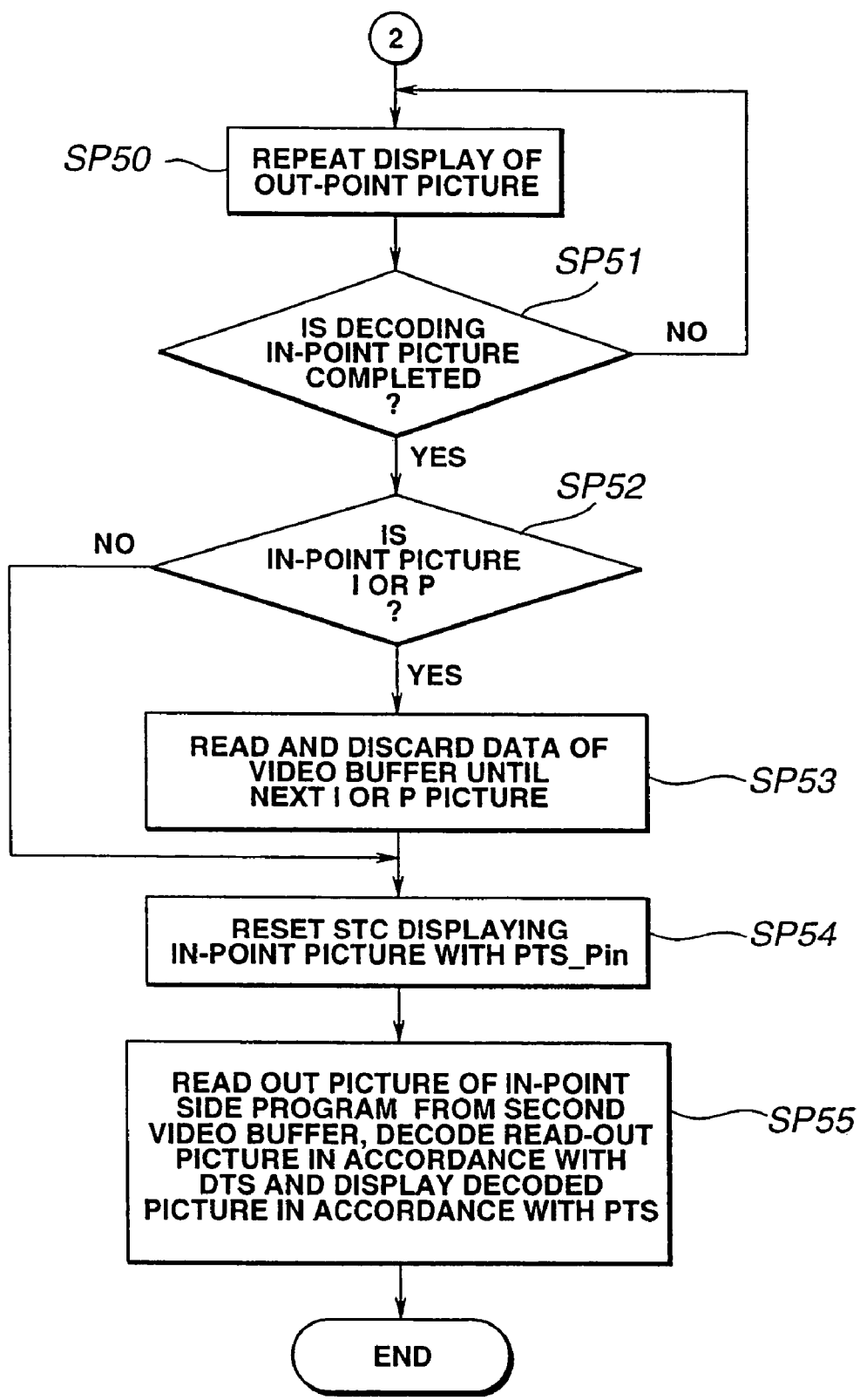
FIG. 21 is a flowchart consecutive to FIG. 19 for illustrating the decoding and outputting processing of the decoding device of the decoding device of the optical disc recording/reproducing apparatus according to the second embodiment of the present invention in case seamless reproduction is not possible.

At step SP50, shown in FIG. 21, an out-point picture is re-displayed.

At the next step SP51, it is checked whether or not decoding of the in-point picture has come to a close. If the result of check of this step SP51 is negative, that is if the decoding of the in-point picture has not come to a close, processing reverts to step SP50 to re-display the out-point picture Pout. If the result of check of this step SP51 is affirmative, that is if the decoding of the in-point picture has come to a close, processing reverts to step SP52. Thus, the decoding device 40 repeatedly displays the out-point picture until end of decoding of the in-point picture to uphold the continuity of the reproduced picture in case seamless reproduction is not possible.

At step SP52, it is checked whether or not the picture type of the in-point picture is an I-picture or a P-picture. This check can be made based on P_in_type indicated in the playback control information. If the result of check at this step SP52 is negative, that is if the in-point picture is a B-picture, processing transfers to step SP54. If the result of check at this step SP52 is affirmative, that is if the in-point picture is an I-picture or a P-picture, processing transfers to step SP53.

At step SP53, the video decoding unit 49 reads and discards B-pictures from the in-point picture to the next I- or P-picture stored in the second video buffer 44. After this step SP53, processing transfers to step SP54.

At step SP54, the timing controller 37 resets the value of the STC displaying the in-point picture to a value of PTS_in of the in-point side program.

At the next step SP55, the video decoding unit 49 reads out and discards a pictures of the in-point side program from the second video buffer 44 to decode the pictures of the in-point side program in accordance with the decoding time stamp DTS. The display controller 51 controls the video decoding unit 49 to display the decoded pictures in accordance with the presentation time stamp PTS of the pictures in question.

By the above processing, the decoding device 40 can perform skipping reproduction from the out-point side program to the in-point side program.

Thus, the decoding device 40 judges whether or not seamless reproduction can be upheld during skipping reproduction. If seamless reproduction is possible, the STC can be switched to display the pictures without producing extraneous feeling, whereas, even if seamless reproduction is not possible, there is no fear of display interruption.

Figure 22:
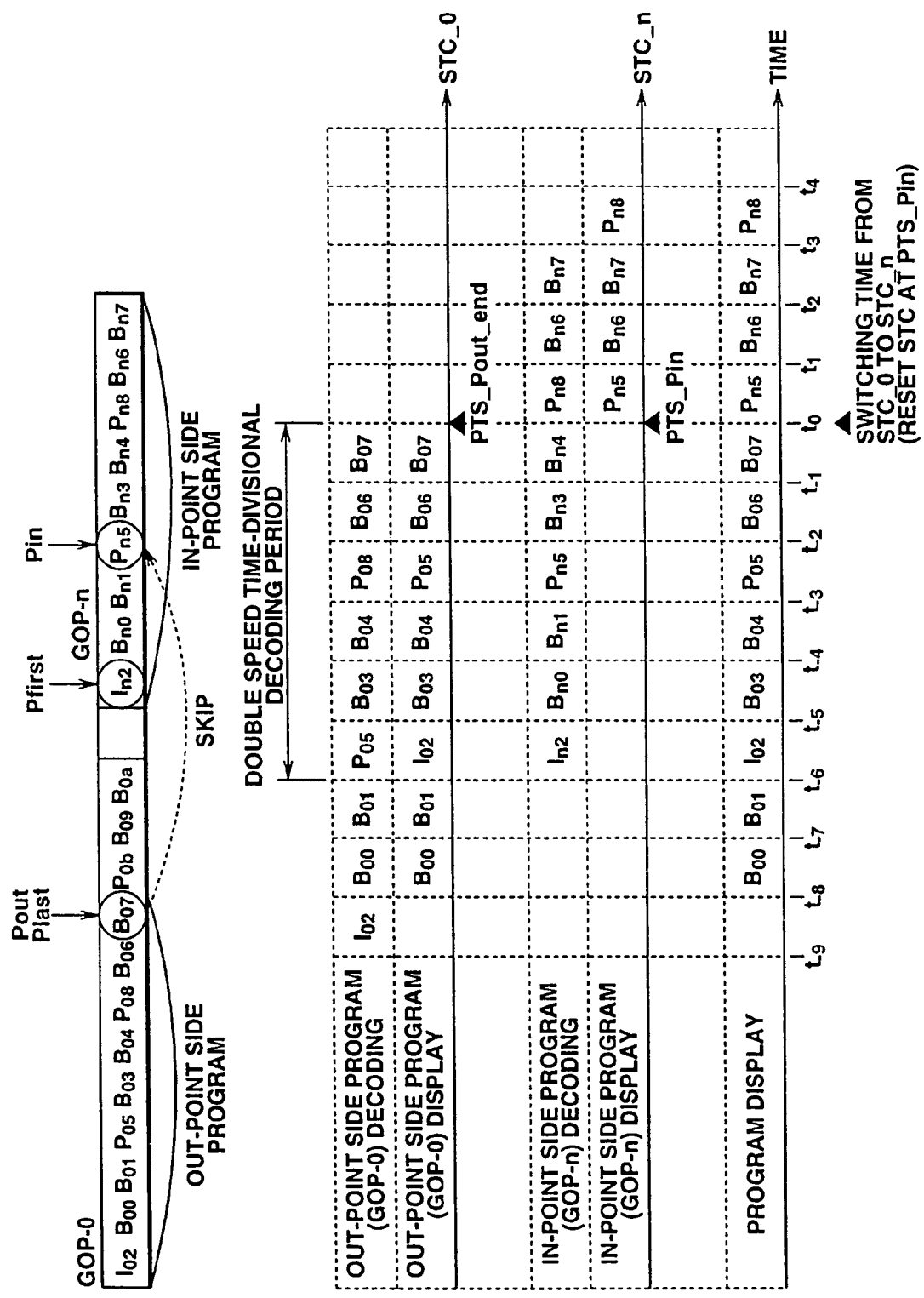
FIG. 22A illustrates an instance of picture sequence of the out-point side program and the in-point side program for illustrating the decoding and display timing of the optical disc recording/reproducing apparatus according to the first embodiment of the present invention.
FIG. 22B shows the decoding timing of the out-point side program shown in FIG. 22A.
FIG. 22C shows the display timing of the out-point side program shown in FIG. 22A.
FIG. 22D shows the decoding timing of the in-point side program shown in FIG. 22A.
FIG. 22E shows the display timing of the in-point side program shown in FIG. 22A.
FIG. 22F shows the display timing of the out-point side program and the in-point side program shown in FIG. 22A.

The timing of decoding and display in the decoding device 40 is now explained taking an example of reproducing the pictures of the out-point side program, up to $B_{o7}$, then skipping the reproduction and reproducing the pictures of the out-point side program from $P_{n5}$, as shown in FIG. 22A.

The video decoding unit 49 sequentially decodes the pictures of the out-point side program as from time point $t_{-9}$, as shown in FIG. 22B. When $B_{o7}$ (last picture Plast) has been decoded at time $t_{-1}$, decoding of the out-point side program is terminated. The video decoding unit 49 then sequentially decodes the in-point side program from time point $t_{-6}$, as shown in FIG. 22D, to complete the decoding up to $B_{n4}$ at time to. It is noted that the video decoding unit 49 operates at a double speed during the time of decoding both the out-point side program and the in-point side program simultaneously, that is since time point $t_{-6}$ until time point $t_{-0}$, by way of reproducing the out-point side program and the in-point side program alternately every preset data volume. It is noted however that only I- and P-pictures need to be decoded during the time from $I_{n2}$ until $B_{n4}$ of the in-point side program, while there is no necessity of decoding the B-pictures. The reason is that no pictures are displayed from $I_{n2}$ up to $B_{n4}$, while only the I- and P-pictures during this time interval are needed for decoding the in-point picture Pn5.

The v49 displays the decoded out-point side program until time point $t_0$ in accordance with its PTS, as shown in FIG. 22C. At the time point $t_0$ when the display of the out-point picture Pout comes to a close, the STC is reset to the value of PTS_Pin, while the decoded in-point side program is sequentially displayed in accordance with the PTS of each picture, as shown in FIG. 22E.

By this decoding and display, the decoding device 40 can continuously display the out-point picture and the in-point picture in succession, as shown in FIG. 22F, to seamlessly reproduce the out-point side program and the in-point side program.

Figure 23:
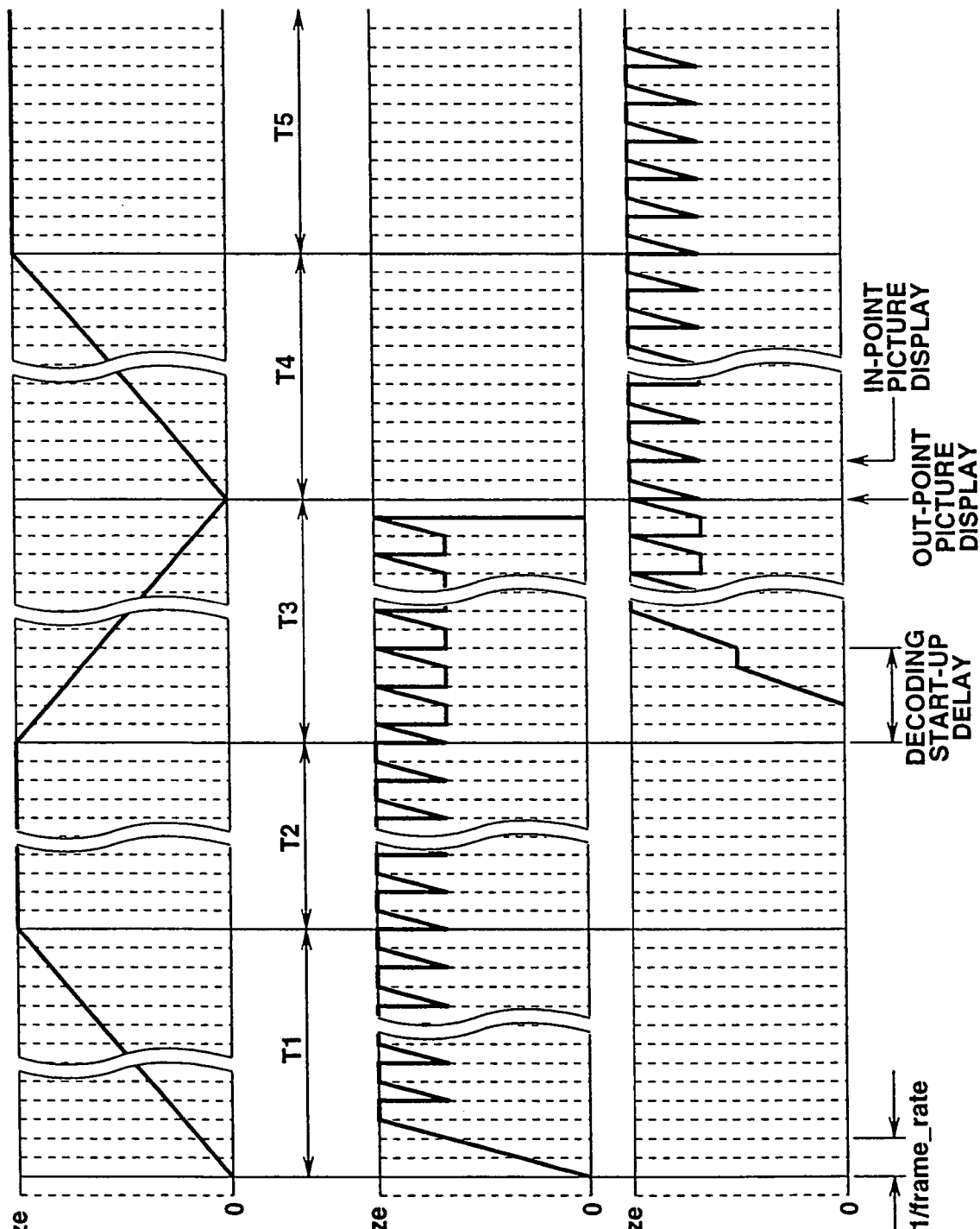
FIG. 23A illustrates the amount of bits occupying a main buffer of the decoding device of the recording/reproducing apparatus of an optical disc of the second embodiment of the present invention.
FIG. 23B illustrates the amount of bits occupying the first video buffer of the decoding device of the recording/reproducing apparatus of an optical disc of the second embodiment of the present invention.
FIG. 23C illustrates the amount of bits occupying the second video buffer of the decoding device of the recording/reproducing apparatus of an optical disc of the second embodiment of the present invention.

The transition of the bit occupying volumes of the main buffer 21, first video buffer 43 and the second video buffer 44 during skipping reproduction is explained with reference to FIG. 23.

FIG. 23A shows the bit occupying volume of multiplexed data in the main buffer 21. This bit occupying volume is varied from MB_size as the capacity of the main buffer 21 to 0. FIG. 23B shows the bit occupying volume of the video bitstream of the out-point side program in the first video buffer 43. This bit occupying volume is varied from VB1_size as the capacity of the first video buffer 43 to 0. Similarly, FIG. 23C shows the bit occupying volume of the video bitstream of the in-point side program in the second video buffer 44. This bit occupying volume is varied from VB2_size as the capacity of the second video buffer 44 to 0.

The term T1 indicates a state in which the video decoding unit 49 is decoding the out-point side program at the normal decoding speed. At this time, the output bitrate of the main buffer 21 is Rpg1, with the bit occupying volume of the multiplexed data in the main buffer 21 increasing at a rate of Rin−Rpg1 until the main buffer 21 is charged to its full capacity. The increasing rate of the bit occupying volume is minimum for Rpg1=Rpg_max and is represented by the equation (16):

$$Rin - Rpg\_max = (Rpg\_max + \alpha) - Rpg\_max = \alpha \qquad (16).$$

The term T2 denotes the state in which the main buffer 21 has been charged to its capacity and, similarly to the term T1, denotes the state in which the video decoding unit 49 is decoding the out-point side program at the normal decoding speed. The output bitrate from the main buffer 21 is Rpg1.

The term T3 denotes a state in which the video decoding unit 49 is decoding the out-point side program and the in-point side program at a double speed. At this time, the output bitrate from the main buffer 21 is Rpg1+Rpg2, with the bit occupying volume of the multiplexed data in the main buffer 21 decreasing at a rate of Rpg1+Rpg_max. The bit occupying volume decreasing rate is maximum for Rpg1=Rpg2=Rpg_max. The bit occupying volume decreasing rate in this case is given by the equation (17):

$$Rpg1+Rpg2-Rin=2\times Rpg\_max-(Rpg\_max+\alpha)=Rpg\_max-\alpha \quad (17)$$

Skipping occurs since the term T3 until the term T4.

The term T4 denotes the state in which the video decoding unit 49 is decoding the in-point side program at the normal decoding speed. At this time, the output bitrate of the main buffer 21 is Rpg2, with the multiplexed data bit occupying volume in the main buffer 21 increasing at a rate of Rin−Rpg2 until the main buffer 21 is charged to its full capacity. The increasing rate is minimum for Rpg2=Rpg_max, in which case the increasing rate of the bit occupying volume is given by the equation (18):

$$Rin-Rpg\_max=(Rpg\_max+\alpha)-Rpg\_max=\alpha \quad (18).$$

The term T5 denotes a state in which the main buffer 21 has been charged to its full capacity and, similarly to the term T4, denotes the state n which the video decoding unit 49 is decoding the in-point side program at a normal decoding speed. The output bitrate from the main buffer 21 is Rpg2.

The transition of the bit occupying volume during the terms T1 to T3 is repeated every skipping reproduction.

The time length of the terms T1 and T3 is explained.

The time length of the term T3 denotes the time which elapses since start of supply of the out-point side program to the second video buffer 44 until end of decoding of the in-point picture Pin in a state in which the video decoding unit 49 is decoding the out-point side program and the in-point side program simultaneously. If the number of pictures decoded as from the leading picture Pfirst up to the in-point picture Pin is Ndec, the time length of the term T3 is given by the equation (19):

$$T3 = \sum_{i=0}^{N+M-1} (2+rff[i])/(2\times frame\_rate) + decode\_start\_up\_delay. \quad (19)$$

If the GOP length is N and the intervals of P-pictures is M, the maximum value of the number of pictures Ndec to be decoded from the leading picture Pfirst up to the in-point picture Pin is given by the following equation (20):

$$Ndec=N+M-1 \quad (20).$$

From the above equations (19) and (20), the maximum value of the term T3 T3_max is given by the equation (21):

$$T3\_max = \sum_{i=0}^{N+M-1} (2+rff[i])/(2\times frame\_rate) + decode\_start\_up\_delay. \quad (21)$$

It is noted that decode_start_up_delay=1.75 mbit/Rpg_max. If the i'th picture is a B-picture, rff[i] is a value of repeat_first_field of the picture. If the i'th picture is an I-picture or a P-picture, rff[i] is a value of repeat_first_field of the previous I- or P-picture.

During the T3 period, two programs, namely the out-point side program and the in-point side program, are outputted from the main buffer 21 at a rate of 2*Rpg_max at the maximum. The main buffer 21 is required to have such a capacity as to supply the out-point side program and the in-point side program without underflowing during the period of T3_max. That is, the capacity MB_size of the main buffer 21 is given by the following equation (22):

$$MB\_size=T3\_Max\times(2\times Rpg\_max-Rin)=T3\_max\times(Rpg\_max-\alpha) \quad (22).$$

The time length of the term T1 is the time which elapses until the bit occupying volume of the main buffer 21 is varied from 0 to MB_size in a state in which the video decoding unit 49 is decoding the out-point side program or the in-point side program at the normal decoding speed, and is given by the equation (23):

$$T1 = MB\_size/(Rin-Rpg\_max)=MB\_size/\alpha \quad (23).$$

If skipping reproduction is to be repeated on end, there is a necessary minimum time length from the in-point picture to the next out-point picture, so that limitations are imposed on the positions of the in-point picture and the out-point picture. The reason is that the main buffer 21 needs to be charged to its full capacity to perform skipping reproduction. That is, the minimum necessary time Lmin for skipping reproduction from the in-point picture to the next out-point picture is given by the equation (24):

$$Lmin=T1 \quad (24).$$

In the optical disc recording/reproducing apparatus of the present second embodiment, the out-point side program and the in-point side program are time-divisionally decoded by a sole decoding unit at a double speed in order to output on end an out-point picture whose display is completed at PTS_Pout_end and the in-point picture which starts to be displayed at PTS_Pin, whilst the STC is reset from PTS_Pout_end to PTS_Pin at a switching timing from the out-point picture to the in-point picture. This enables the present optical disc recording/reproducing apparatus 1 to effect seamless skipping reproduction as continuity is upheld before and after the switching point.

In the optical disc recording/reproducing apparatus of the present second embodiment, advance decision of possibility of seamless reproduction can be made as in the above-described optical disc recording/reproducing apparatus of the first embodiment.

In the above-described first embodiment, there is shown an example in which the out-point side program and the in-point side program are processed in parallel using two decoding units, whereas, in the second embodiment, there is shown an example in which the out-point side program and the in-point side program are processed in parallel using a sole decoding unit which performs time-divisional processing at a double decoding speed. The present invention, however, is not limited to this system and may be applied to such a decoding device in which the above-described first and second embodiments are combined such as to process the out-point side program and the in-point side program in parallel. For example, although a number of internal processing units are provided in a decoding device adapted for decoding encoded data of the MPEG system, it is also possible to effect IDCT by two processing units and to effect the variable length decoding time-divisionally by a sole processing unit.

Third Embodiment

A recording/reproducing apparatus for an optical disc according to a third embodiment of the present invention is hereinafter explained. In this third embodiment, similarly to the second embodiment, only the structure of the decoding device is modified from that of the decoding device 10 of the above-described first embodiment. That is, the present optical disc recording/reproducing apparatus is the same as the apparatus of the first embodiment except the structure of the decoding device 10. Therefore, only a decoding device associated with this decoding device 10 is explained in detail. The component parts which are the same as those of the decoding device 10 of the first embodiment and the decoding device 40 of the second embodiment are depicted by the same reference numerals and are not explained specifically.

The decoding device of the optical disc recording/reproducing apparatus of the third embodiment of the present invention is explained in detail.

Figure 24:
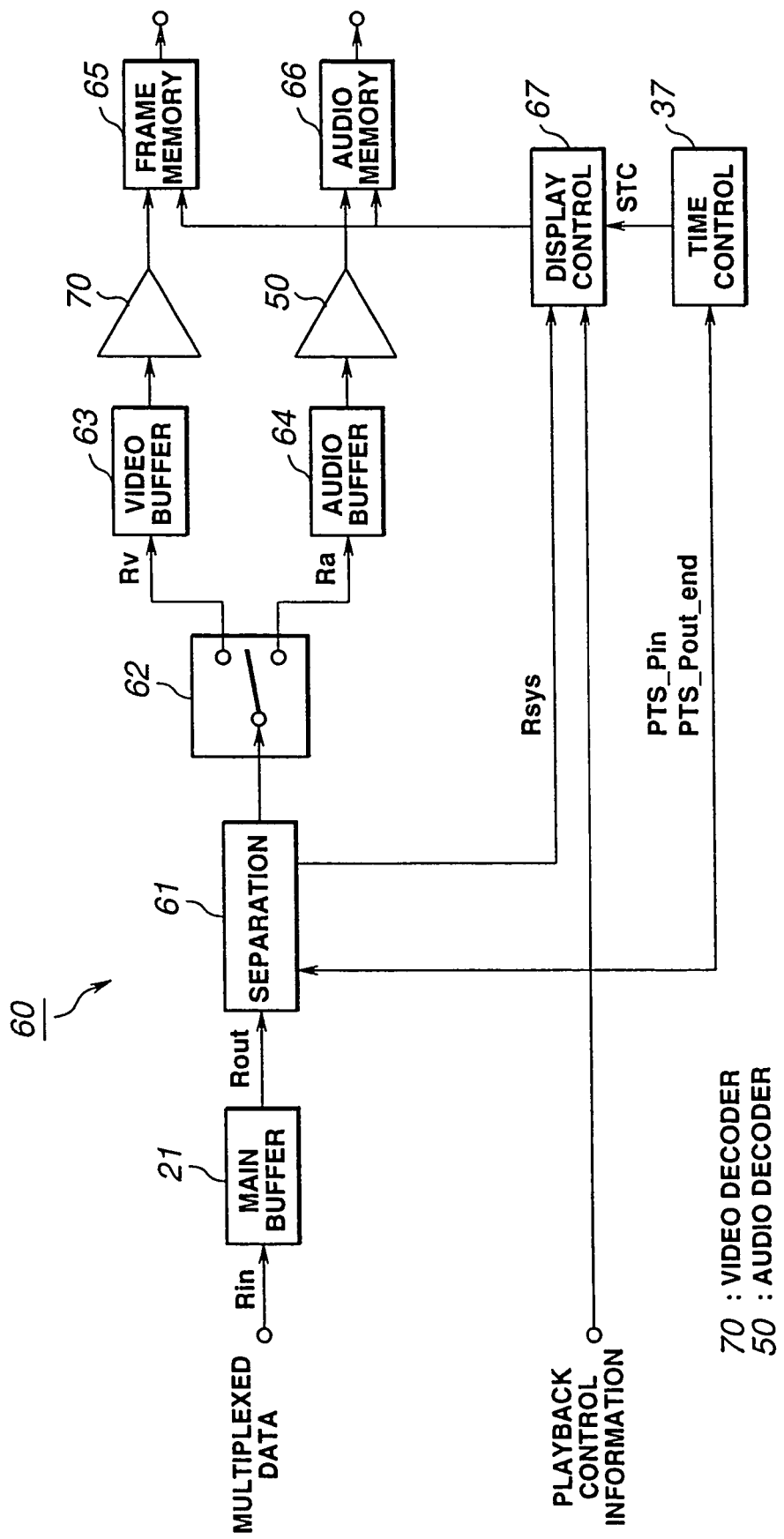
FIG. 24 is a block diagram of a decoding device of the optical disc recording/reproducing apparatus according to a third embodiment of the present invention.

FIG. 24 shows a block diagram of a decoding device applied to the optical disc recording/reproducing apparatus of the present third embodiment. A decoding device 60 shown in FIG. 24 is used in place of the decoding device 10 of the first embodiment of the recording/reproducing apparatus shown in FIG. 3.

Referring to FIG. 24, the decoding device 60 includes a main buffer 21 for temporarily storing multiplexed data made up of video data and audio data sent from the buffer 6 (FIG. 3), and a separation unit 61 for extracting the bitstream stored in the main buffer 21 to separate a bitstream of the out-point side program and a bitstream of the in-point side program during skipping reproduction. The decoding device 60 also includes a switching unit 62 for time-divisionally switching between the bitstreams of the AV program extracted by the separation unit 61 for separation into the video bitstream and the audio bitstream.

The decoding device 60 also includes a video buffer 63 for storing a video bitstream and an audio buffer 64 for storing an audio bitstream.

The decoding device 60 additionally includes a video decoding unit 70 for extracting and decoding a video bitstream stored in the video buffer 63, an audio decoding unit 50 for extracting and decoding an audio bitstream stored in the audio buffer 64, a display controller 67 for controlling the output timing of the video and audio data and a timing controller 37 for generating system time clocks as the reference synchronization signal of the present system.

The main buffer 21 is fed from the buffer 6 (FIG. 3) with a bitstream of video and audio data multiplexed on the package basis at a bitrate of Rin. This bitstream is temporarily stored in the main buffer 21 and subsequently extracted by the separation unit 61 at a preset timing. The writing in the main buffer 21 is halted when it is charged to its capacity.

In this main buffer 21 are stored video and audio data of a sole AV program during normal reproduction. During skipping reproduction, the two AV programs, namely the out-point side program and the in-point side program, are read out from the optical disc 2 so as to be stored in the main buffer 21.

The separation unit 61 extracts the bitstream of the multiplexed video and audio data from the main buffer 21 at a bitrate of Rout. During skipping reproduction, the separation unit 61 extracts data of the out-point side program stored in the main buffer 21 and subsequently extracts data of the in-point side program. At this time, the separation unit 61 extracts the video and audio data during skipping reproduction based on the playback control information sent from the playback controller 8 (FIG. 3). This extraction is executed on the basis of the index (P_last index) of the last picture Plast of the playback control information of the out-point side program or the index (P_in_index) of the in-point picture Pin of the playback control information of the in-point side program. The separation unit 61 sends the extracted data to the switching unit 62. The separation unit 61 also extracts the system header contained in the multiplexed data of the out-point side program and the in-point side program to send this system header to the display controller 67.

The switching unit 62 time-divisionally separates the bitstream of the video and audio data multiplexed in the out-point side program and in the in-point side program to provide a bitstream only of video data and a bitstream only of audio data. The video bitstream of the out-point side program and the video bitstream of the in-point side program, separated by the switching unit 62, are sent to the video buffer 63. The audio bitstream of the out-point side program and the audio bitstream of the in-point side program, separated by the switching unit 62, are sent to the audio decoding unit 50.

The video buffer 63 transiently stores the audio bitstream sent from the switching unit 62. The video bitstream stored in the video buffer 63 is extracted to the video decoding unit 70 at a preset timing.

The audio buffer 64 transiently stores the video bitstream sent from the switching unit 62. The audio bitstream stored in the audio buffer 64 is extracted to the audio decoding unit 50 in synchronism with the video decoding timing.

The video decoding unit 70 decodes the video bitstream encoded for compression in accordance with MPEG 2 system to generate digital picture data. This video decoding unit 70 decodes the pictures at a speed faster than the picture display speed. This video decoding unit 10 has a decoding speed twice the minimum decoding speed necessary for real-time display of video data supplied in real-time. During normal reproduction, this video decoding unit 70 decodes the pictures at a normal decoding speed in accordance with the decoding time stamp DTS affixed to each picture. On the other hand, during skipping reproduction, the video decoding unit 70 decodes the out-point side program and the in-point side program at a decoding speed twice the usual decoding speed in negligence of the DTS. The digital picture data, decoded by this video decoding unit 70, is stored in a frame memory 65.

The audio decoding unit 50 decodes the audio bitstream encoded for compression in accordance with the MPEG 2 system to generate digital speech data. The digital speech data, decoded by the audio decoding unit 50, is stored in an audio memory 66. Similarly to the video decoding unit 70, the audio decoding unit 50 is designed to decode audio data at a speed faster than the speech output speed.

The frame memory 65 is a memory for transient storage of the decoded pictures on the picture basis. Specifically, this frame memory 65 has the function of storing a picture which has been decoded but which has not as yet been displayed in case the video decoding unit 70 executes decoding at a speed faster than the usual display speed.

The audio memory 66 transiently stores decoded audio data. Specifically, this audio memory 66 has the function of storing speech data which has been decoded but which has not as yet been displayed in case the audio decoding unit 67 executes decoding at a speed faster than the usual speech outputting speed.

The display controller 67 controls the output timing of each picture decoded by the video decoding unit 70 and speech data decoded by the audio decoding unit 50 based on the playback control information supplied from the playback controller 8 (FIG. 3) and the STC sent from the timing controller 37.

Specifically, the display controller 67 outputs each picture decoded by the video decoding unit 70 when the STC generated by the timing controller 37 coincides with the presentation time stamp PTS (temporal management information) of the playback output affixed to each picture. During skipping reproduction, this display controller 67 switches an output picture from the out-point side program to the in-point side program at a display switching timing between the out-point picture of the out-point side program and the in-point picture of the in-point side program.

The display controller 67 also outputs speech data in synchronism with picture data outputted by the video decoding unit 70. The display controller 67 also switches output audio data from the out-point side program to the in-point side program at a display switching timing between the out-point picture of the out-point side program and the in-point picture of the in-point side program.

The bitrate of the bitstream supplied from the main buffer 21 and that of the bitstream read out from the main buffer 21 are assumed to be Rin and Rout, respectively. The bitrate of the video bitstream sent to the video buffer 63, that of the audio bitstream sent to the audio buffer 64 and that of the system header sent from the separation unit 61 are assumed to be Rv, Ra and Rsys, respectively. The sum of Rv, Ra and Rsys is assumed to be the program bitrate Rpg and the maximum value of Rpg is assumed to be Rpg_max.

If the respective bitrates are defined as above, the following relation:

$$R\text{in} = R\text{pg\_max} + \alpha \ (\alpha > 0)$$

$$R\text{out} \leq 2 \times R\text{pg\_max} \quad (25)$$

holds, where Rin is the bitrate of the bitstream sent to the main buffer 21 and Rpg_max is the maximum bitrate, respectively, and $\alpha$ takes account of delay time on startup of the video decoding unit 70.

The processing during skipping reproduction of the decoding device 60 is now explained with reference to the flowchart of FIGS. 25 to 27.

Figure 25:
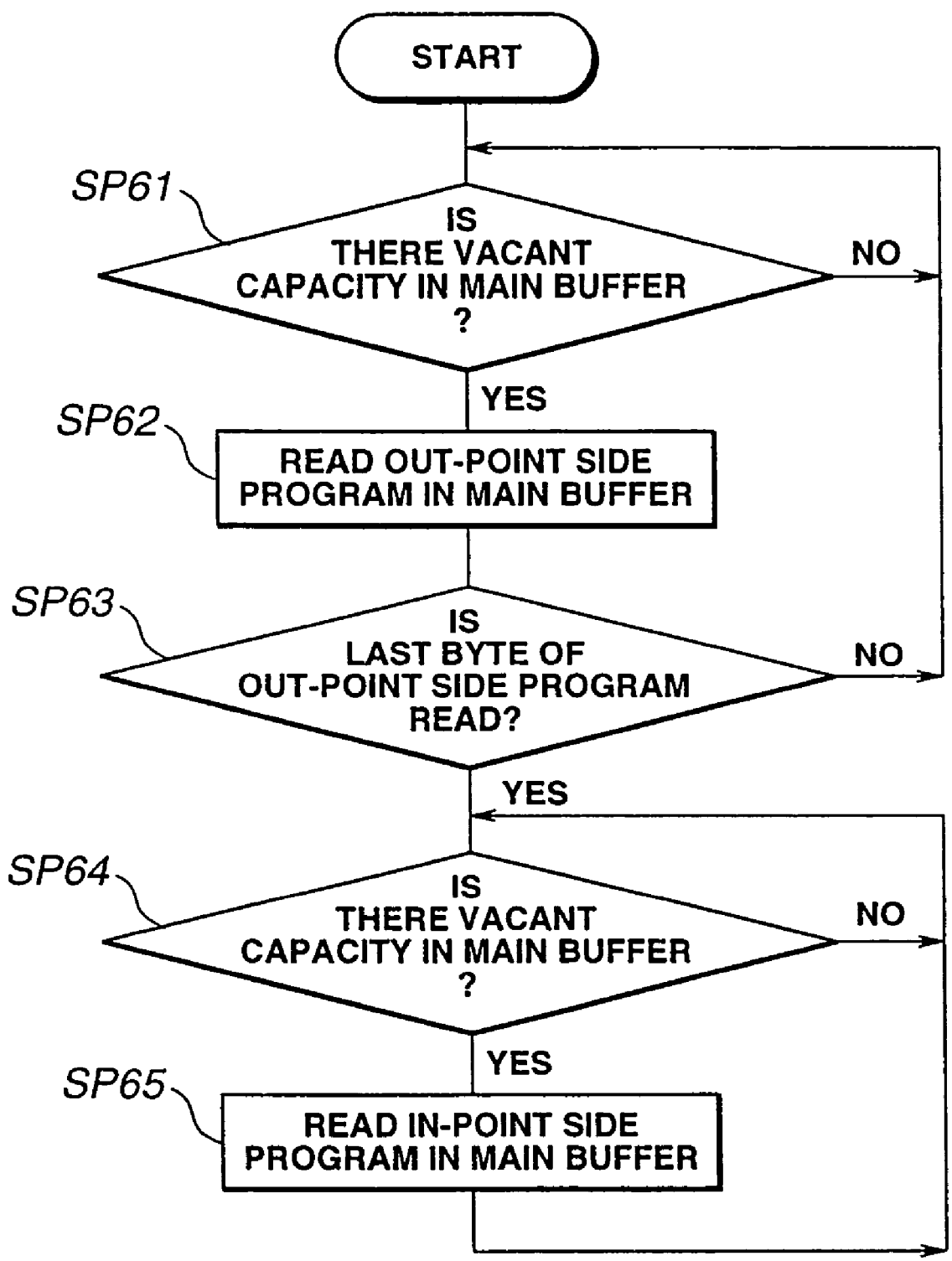
FIG. 25 is a flowchart showing data reading processing into the main buffer of the decoding device of the optical disc recording/reproducing apparatus according to the third embodiment of the present invention.

FIG. 25 shows the contents of the reading of a datastream of the main buffer 21 at the time of skipping from the out-point side program to the in-point side program. It is noted that this reading processing of the main buffer 21 is controlled by a buffer manager, not shown.

First, at step SP61, it is checked whether or not there is any available vacant area in the main buffer 21. The processing is at a standstill at this step SP61 until a vacant area in the main buffer 21 is available.

If there is produced any available vacant area in the main buffer 21, the out-point side program is read into the main buffer 21 at the next step SP62.

At the next step SP63, it is checked whether or not the last byte of the out-point side program has been read. If the last byte of the out-point side program has not been read, the processing as from step SP61 is repeated. If it is determined at this step SP63 that the last byte of the out-point side program has been read, processing transfers to step SP64.

At step SP64, it is checked whether or not there is any available vacant area in the main buffer 21. The processing is at a standstill at this step SP64 until a vacant area in the main buffer 21 is available.

If there is produced any available vacant area in the main buffer 21, the in-point side program is read into the main buffer 21.

The processing comes to a close when the in-point side program is read in its entirety. If the decoding device 10 repeats the processing of skipping reproduction, the processing as from the step SP61 is repeated.

By the above processing form step SP61 to step SP65, the decoding device 60 can read-in data into the main buffer 21 at the time of skipping reproduction.

Figure 26:
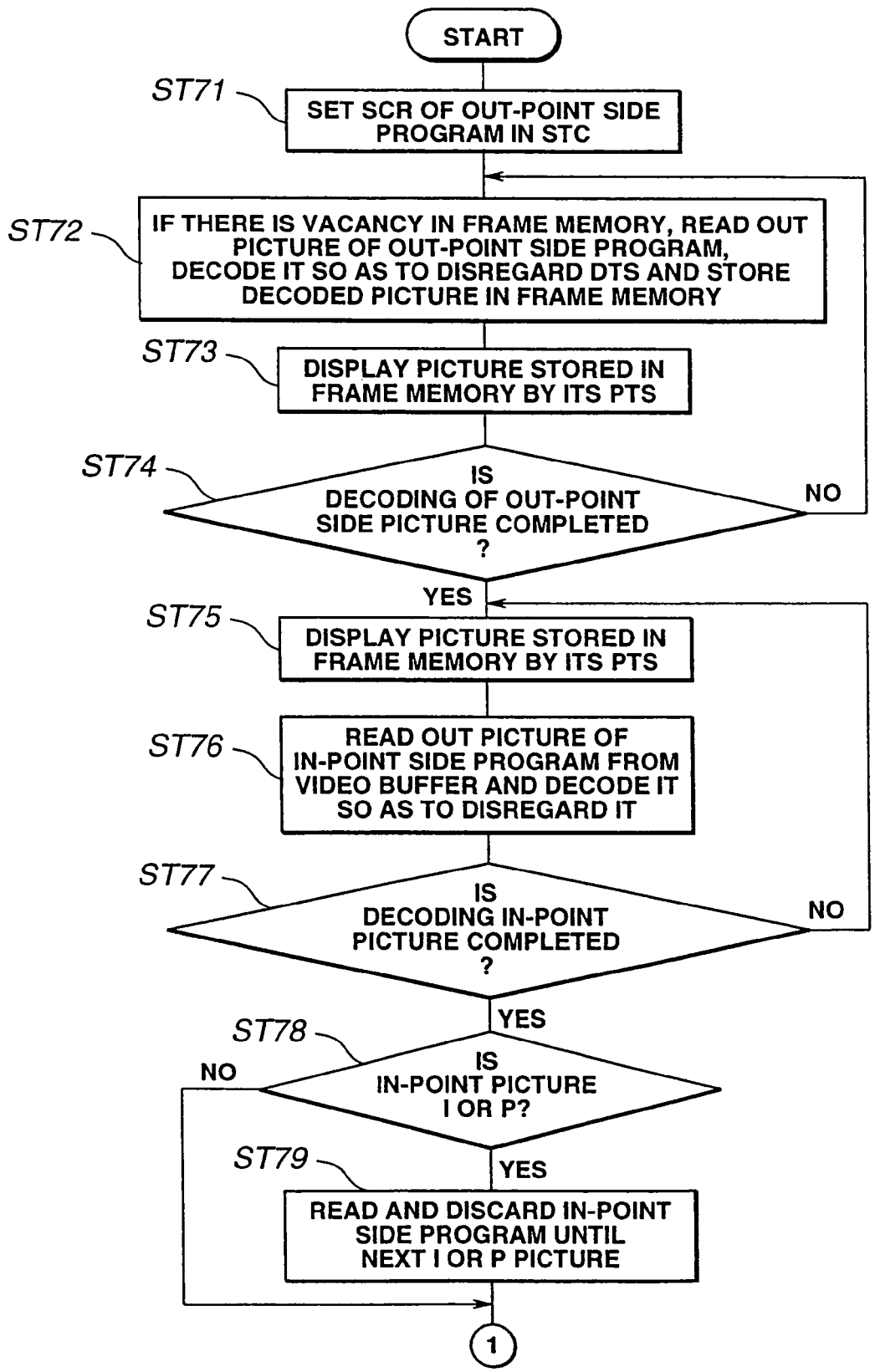
FIG. 26 is a flowchart consecutive to FIG. 19 for illustrating the decoding and outputting processing of the decoding device of the decoding device of the optical disc recording/reproducing apparatus according to the third embodiment of the present invention in case seamless reproduction is possible.
Figure 27:
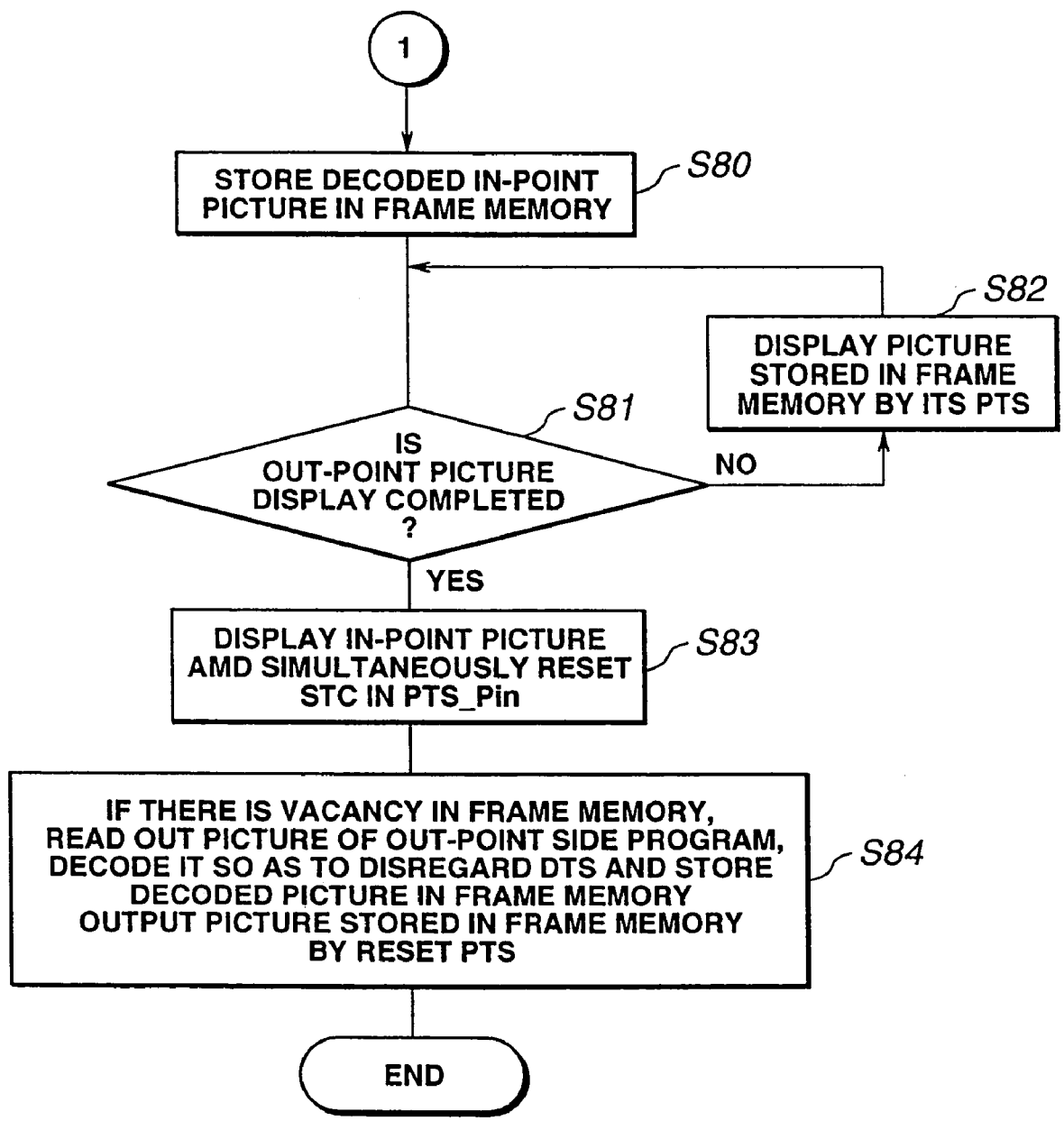
FIG. 27 is a flowchart consecutive to FIG. 26 for illustrating the decoding and outputting processing of the decoding device of the optical disc recording/reproducing apparatus according to the third embodiment of the present invention.

FIGS. 26 and 27 show the contents of decoding and outputting processing by the decoding device 60.

When the skipping reproduction processing is started, the timing controller 37 sets the STC (system time clock) to the SCR (system clock reference) of the out-point side program at step SP71 shown in FIG. 26.

At the next step SP72, if there is any available vacant area available in the frame memory 65, the video decoding unit 70 reads out pictures of the out-point side program from the video buffer 63 to decode the pictures at e.g., a double decoding speed, in negligence of the decoding time stamp (DTS) of each picture, to store the decoded picture in the frame memory 65.

At the next step SP73, the display controller 67 displays the pictures of the out-point side program, decoded by the video decoding unit 70, in accordance with its DTS.

At the next step SP74, it is checked whether or not decoding of the out-point picture of the out-point side program has come to a close. If decoding of the out-point picture of the out-point side program has not come to a close, processing as from step SP72 is repeated. If, at this step SP74, it is found that the decoding of the out-point picture of the out-point side program has come to a close, processing transfers to step SP75.

At this step SP75, the display controller 67 causes each picture of the out-point side program decoded by the video decoding unit 70 to be displayed in accordance with its DTS.

At step SP76, the video decoding unit 70 reads out the pictures of the in-point side program from the video buffer 63 to decode the read-out pictures at e.g., a double decoding speed in negligence of the DTS of each picture.

At the next step SP77, it is checked whether or not decoding of the in-point side program has come to a close. If it is determined that the decoding of the in-point picture has come to a close, processing transfers to step SP78.

At step SP78, it is determined whether or not the picture type of the in-point picture is an I-picture or a P-picture. This decision is given based on P-in-type indicated in the playback control information. If the in-point picture is the I- or P-picture, the video decoding unit 70 reads and discards the in-point side program stored in the video buffer 63 up to the next I- or P-picture before processing transfers to step SP80 shown in FIG. 27. If the in-point picture is not an I-picture nor a P-picture, processing directly transfers to step SP80 shown in FIG. 27.

At step SP80, shown in FIG. 27, the decoded in-point picture is stored in the frame memory 65.

At the next step SP81, it is checked whether or not the STC is equal to PTS_Pout_end, that is whether or not display of the out-point picture has come to a close.

If the STC is not PTS_Pout_end, the display controller 67 continues to output each picture of the decoded out-point side program in accordance with its PTS. The processing of this step SP82 is continued until the STC is equal to PTS_Pout_end.

If the STC is equal to PTS_Pout_end, the in-point picture decoded by the video decoding unit 70 is displayed at step SP83, at the same time as the STC is reset in PTS_Pin.

At the next step SP84, if there is any available vacant area in the frame memory 65, the video decoding unit 70 decodes the in-point side program stored in the video buffer 63 at e.g., a double decoding speed, in negligence of the DTS stored in the video buffer 63, to store the decoded picture in this frame memory 65. Simultaneously, the display controller 67 displays at step SP84 each picture of the in-point side program decoded by the video decoding unit 70 in accordance with its PTS.

By the processing of from step SP71 to step SP84 as described above, the video decoding unit 70 can decode the out-point side program and the in-point side program at the time of skipping reproduction. On the other hand, by the processing of from step SP71 to step SP84, the display controller 67 can output the out-point side program and the in-point side program at the time of skipping reproduction.

In MPEG 2 system, 2-3 pull-down processing of repeatedly outputting a pre-set field on end is performed in consideration that the motion picture film is made up of 24 picture frames per second. From this, if 2-3 pull-down is not performed at the out-point picture, the PTS_Pout_end is equal to PTS_Pout plus one-frame time, whereas, if 2-3 pull-down is performed at the out-point picture, the PTS_Pout_end is equal to PTS_Pout plus three-field time.

Thus, by performing the processing shown in FIGS. 25 to 27, it is possible with the optical disc recording/reproducing apparatus to maintain continuity of the moving picture before and after skipping reproduction.

The decoding and display timing in the decoding device 60 is explained taking an example of reproducing the out-point side program shown in FIG. 28A up to $B_{o7}$, then skipping and reproducing the in-point side program from $P_{n5}$.

Referring to FIG. 28B, the video decoding unit 70 sequentially decodes the out-point side program as from time $t_{-9}$ to decode $B_{o7}$ (last picture Plast) at time point $t_{-3}$ to terminate the decoding of the out-point side program. The video decoding unit 70 sequentially decodes the in-point side program, since time point $t_{-3}$, to complete the decoding up to $B_{n4}$ at time $t_0$. The video decoding unit 70 operates at a double speed since time point $t_{-6}$ until time point $t_0$ to decode the out-point side program and the in-point side program. Specifically, the video decoding unit 70 decodes the pictures from $P_{o5}$ until $B_{o7}$ of the out-point side program since time point $t_{-6}$ until time point $t_{-3}$, while decoding pictures $I_{n2}$ to $B_{n5}$ of the in-point side program since time $t_{-3}$ until time to $t_0$ terminate the decoding before to $t_0$ complete decoding of $P_{n5}$ as the in-point picture. Meanwhile, as to pictures from $I_{n2}$ to $B_{n4}$ of the in-point side program, only I- and P-pictures are decoded, while it is unnecessary to decode the B-pictures. The reason is that the pictures from $I_{n2}$ up to $B_{n4}$ are not displayed and only I- and P-pictures are required for decoding $P_{n5}$ (in-point picture).

The video decoding unit 70 also displays the decoded out-point side program until time point $t_0$ in accordance with its PTS, as shown in FIG. 28C. At the time point $t_0$ when display of the out-point picture Pout comes to a close, the STC is reset to a value of PTS_Pin, while the decoded in-point side program is sequentially displayed in accordance with the PTS of each picture, as shown in FIG. 28E.

By decoding and display in this manner, the decoding device 60 can continuously display the out-point and in-point pictures to effect seamless reproduction of the out-point side program and the in-point side program, as shown in FIG. 28F.

The transition of the bit occupying volume of the main buffer 21 and the video buffer 63 during skipping reproduction is explained with reference to FIG. 29.

FIG. 29A shows the bit occupying volume of multiplexed data in the main buffer 21. This bit occupying volume is varied from MB_size as the capacity of the main buffer 21 to 0. FIG. 29B shows the bit occupying volume of the video bitstream of the video buffer 63. This bit occupying volume is varied from the capacity of the video buffer 63 to 0.

The term T1 denotes the state in which the video decoding unit 70 is decoding the out-point side program at a normal decoding speed. The output bitrate of the main buffer 21 is Rpg. The bit occupying volume of the main buffer 21 increases up to the full state at a rate of $\alpha(Rin-Rpg)$.

During the term T2, the out-point side program is decoded by the video decoding unit 70. At this time, the video decoding unit 70 performs decoding at a double decoding speed if there is any available vacant area in the frame memory 65. During the term T2, the maximum value of the output bitrate of the main buffer 21 is 2Rpg. The bit occupying volume of the main buffer 21 is decreased at a rate of Rpg–α. During the term T3, the out-point side program is decoded by the video decoding unit 70 at the normal decoding rate, as during the term T1. Thus, the maximum value of the output bitrate of the main buffer 21 during the term T3 is Rpg. The bit occupying volume of the main buffer 21 is increased at a rate of a until the full state is reached.

During the term T4, decoding of the in-point side program is started by the video decoding unit 70 at a double rate. Therefore, the maximum value of the output bitrate of the main buffer 21 during the term T4 is 2 Rpg. Thus, the bit occupying volume of the main buffer 21 is decreased at a rate of Rpg–α. If the decoding of the in-point picture comes to a close, the video decoding unit 70 is halted transiently.

During the term T5, the video decoding unit 70 decodes the in-point side program at a normal decoding speed. Therefore, the maximum value of the output bitrate of the main buffer 21 during the term T5 is Rpg. The bit occupying volume of the main buffer 21 is increased at a rate of α.

During the term T6, the video decoding unit 70 is decoding the in-point side program. If, at this time, there is any vacant available area in the frame memory 65, the video decoding unit 70 decodes the program at a double decoding speed. The maximum value of the output bitrate of the main buffer 21 during the term T6 is 2Rpg. The bit occupying volume of the main buffer 21 is decreased at a rate of Rpg–α.

During the term T7, the video decoding unit 70 decodes the in-point side program at a normal decoding speed, as during the term T1. Therefore, the maximum value of the output bitrate of the main buffer 21 during the term T6 is Rpg. The bit occupying volume of the main buffer 21 is increased at a rate of α until the full state is reached.

During the term T4, there is produced a pre-set delay time for decoding the initial picture by the video decoding unit 70. This delay time is assumed to be decode start-up delay (decode_start_up_delay).

Then, respective parameters required for seamless skipping reproduction are found in consideration of the bit occupying volumes, for example, of the respective memories.

For resetting the STC at time point $t_0$, the offset time STC_offset, applied to the STC, is set as shown by the equation (26):

$$STC\_offset = PTS\_Pout\_end - PTS\_Pin \tag{26}$$

The time length of T4 is the time since start of supply of the in-point side program to the VES buffer 13 until end of the in-point side program when the frame memory 65 is operating at a double speed. If N is the GOP length and M is an interval of the I- or P-pictures, the maximum value of T4 is given by the equation (27):

$$T4\_max = ((N+m-1)/frame\_rate)/2 + decode\_start\_up\_delay \tag{27}$$

Meanwhile, this decode_start_up_delay is 1.75 Mbit/(3Rpg).

If, for example, M=15 and M=3, the maximum value of T4 corresponds to a case in which the in-point picture is $B_1$ which is the first B-picture of the GOP. That is, in such case, the GOP directly previous to the GOP containing the in-point side program needs to be decoded in its entirety. In this case, the time length of T4 is given by the equation (28):

$$T4\_max = ((17)/frame\_rate)/2\_ + decode\_start\_up\_delay \tag{28}$$

The number of frames (Nf) required for the frame memory 65 depends on the time length of T4 and is represented by the equation (29):

$$Nf = T4\_max/frame\_rate \tag{29}$$

The time length of T29 or T60 is such time length during which 2Nf pictures are decoded at a double decoding speed and stored in the frame memory 65. The time length of T2 (or T6) is as shown by the following equation (30):

$$T2 = T6 = 2Nf/2frame\_rate = Nf/frame\_rate \tag{30}$$

The main buffer 21 is required to have a minimum capacity sufficient to read-in a bitstream such as to decode the in-point side program at a double decoding speed without underflowing of the in-point side program. Therefore, the capacity (MB_size) of the main buffer 21 is given b the following equation (31):

$$T\max = \max(T4\_max, T2)$$

$$MB\_size = T\max \times (2Rpg - Rin) = T\max \times (Rpg - \alpha) \tag{31}$$

The time length of T1 (also, T3 or T7), which is the time during which the bit occupying volume of the main buffer 21 reaches the full state from the zero state, is given by the following equation (32):

$$T1 = MB\_size/(Rin - Rpg) = MB\_size/\alpha \tag{32}$$

The minimum necessary time for continuous skipping reproduction from the in-point picture up to the out-point picture is the time as shown by the following equation (33):

$$L\min = T1 + T\max \tag{33}$$

With the above-described third embodiment of the recording/reproducing apparatus of the present invention, encoded data of the MPEG system are decoded by the video decoding unit 70 at a speed faster than the display speed, an out-point picture whose display is completed with PTS_Pout_end and an in-point picture which starts to be displayed with PTS_Pin are outputted continuously and the STC is reset from PTS_Pout_end to PTS_Pin at a switching timing from the out-point picture to the in-point picture. This enables the optical disc recording/reproducing apparatus to realize seamless skipping reproduction as continuity is upheld before and at back of the switching point.

What is claimed is:

1. A continuous reproduction possibility verifying apparatus for encoded data for use in reproducing a series of encoded data encoded using a predictive encoding system, comprising
    means for decoding pictures of said encoded data from a first display starting point picture of said encoded data to a first display terminating point picture of said encoded data designated as an out-point picture,
    means for skipping the encoded data from said first display terminating point picture to a second display starting point picture designated as an in-point picture, and decoding pictures from said second display starting point picture to a second display terminating point picture,
    means for verifying whether or not continuous display of said first display terminating point picture and said second display starting point picture is possible, based on the time difference between a display time point of said first display starting point picture and a display time point of said first display terminating point picture, and
    means for controlling the decoding and outputting of moving picture data by said decoding means based on a display starting time point of a display starting picture.

* * * * *